United States Patent [19]

Laughon et al.

[11] 4,421,487
[45] Dec. 20, 1983

[54] ELECTRONIC LEARNING AID AND GAME

[75] Inventors: Thomas C. Laughon; Michael I. Philpott, both of Lubbock, Tex.

[73] Assignee: Texas Instruments Incorporated, Dallas, Tex.

[21] Appl. No.: 309,619

[22] Filed: Oct. 7, 1981

Related U.S. Application Data

[62] Division of Ser. No. 55,081, Jul. 5, 1979, abandoned.

[51] Int. Cl.³ .......................... G09B 7/02; G09B 19/00
[52] U.S. Cl. .................................... 434/169; 273/237; 434/327
[58] Field of Search ............... 434/169, 178, 179, 201, 434/202, 227–232, 307, 323, 327, 335; 273/237, 138 A, 139; 364/410, 419

[56] References Cited

U.S. PATENT DOCUMENTS

| | | | |
|---|---|---|---|
| 3,371,321 | 2/1968 | Adams | 434/201 |
| 3,584,398 | 6/1971 | Meyer et al. | 434/201 |
| 3,894,346 | 7/1975 | Ward et al. | 434/228 |
| 4,055,907 | 11/1977 | Henson | 434/335 |
| 4,059,272 | 11/1977 | Pullman | 273/237 |
| 4,122,444 | 10/1978 | Kitajima et al. | 340/760 |
| 4,151,659 | 5/1979 | Lien et al. | 434/178 |
| 4,155,095 | 5/1979 | Kirschner et al. | 273/85 G |
| 4,156,928 | 5/1979 | Inose et al. | 273/237 |
| 4,160,242 | 7/1979 | Fowler et al. | 434/179 |
| 4,189,779 | 2/1980 | Brautingham | 434/169 |

*Primary Examiner*—Vance Y. Hum
*Attorney, Agent, or Firm*—William E. Hiller; Leo N. Heiting; Melvin Sharp

[57] ABSTRACT

An electronic handheld learning aid is disclosed. The learning aid is utilized to teach spelling and alphabetic skills. The learning aid randomly selects a word from memory storage and displays an appropriate number of blank spaces to the operator. The operator attempts to discern the word by entering proposed letters. The operator may also input a word for another operator to attempt to discern. Additional alphabetic format games and learning operations provide training and experience in literary skills. Scoring function and displayed reward phrases provide positive reinforcement of learned skills.

8 Claims, 20 Drawing Figures

ELECTRONIC LEARNING AID AND GAME

This is a division, of application Ser. No. 055,081, filed July 5, 1979, now abandoned.

BACKGROUND OF THE INVENTION

This invention relates to electronic learning aids and teaching machines. More particularly, this invention relates to electronic learning aids having application in the area of spelling and alphabetic skill training.

Electronic learning aids are known in the prior art. In particular, those areas which are readily adaptable to electronic display, such as the mathematical skills, are common. Examples include the Dataman Tm and Little Professor Tm devices manufactured by Texas Instruments Incorporated of Dallas, Tex. Devices which teach spelling or other language skills have, in the past, been more difficult to implement. One solution to the difficulty in implementing learning aids which teach spelling or alphabetic skills is described in U.S patent application Ser. No. 901,395, filed Apr. 28, 1978, abandoned in favor of continuation U.S. patent application Ser. No. 187,389, filed Sept. 15, 1980. In the electronic learning aid of the aforementioned continuation U.S. Patent Application, a synthetic speech device is utilized to overcome the difficulties associated with teaching alphabetic skills. However, certain alphabetic and literary skills can be taught by an electronic learning aid without the need for expensive sophisticated speech synthesis circuitry or bulky video displays.

It is, therefore, one object of this invention that the learning aid be portable and inexpensive to construct.

It is another object of this invention that the learning aid provide positive reinforcement for the operator thereof.

It was yet another object of the invention that the learning aid pose problems to the operator thereof.

It was still another object of this invention that the learning aid receive an input from the operator and inform the operator whether or not the input is correct.

The foregoing objects are achieved as is now described. The learning aid randomly selects a word from memory storage and displays an appropriate number of blank spaces to the operator. The operator attempts to discern the word by entering proposed letters, or the operator may input a word for another operator to attempt to discern. Additional alphabetic format games and learning operations provide training and experience in literary skill. Scoring functions and displayed reward phrases provide positive reinforcement of learned skills.

In the embodiment disclosed, the learning aid is preferably equipped with modes of operation which relate to teaching spelling and literary skilles. These modes are described in detail herein.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of illustrative embodiments thereof when read in conjunction with the accompanying drawings, wherein:

GENERAL DESCRIPTION

Figure 1:
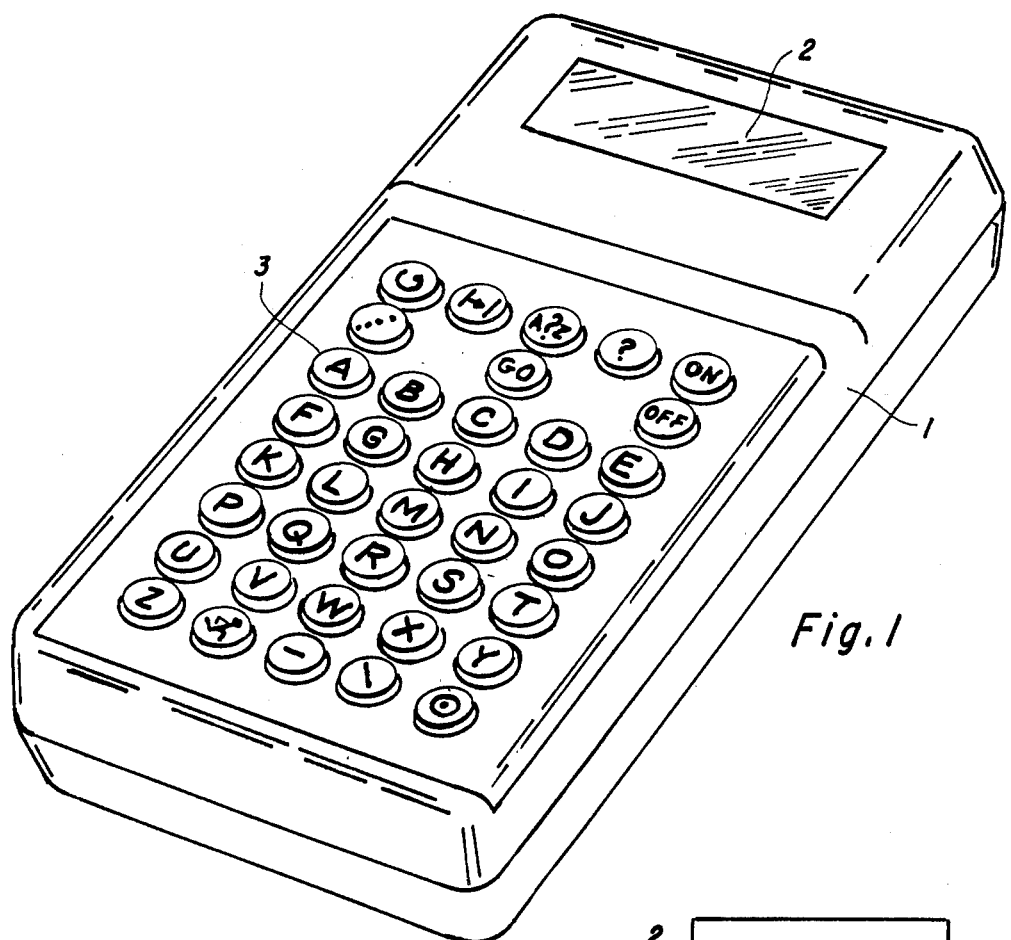
FIG. 1 depicts the learning aid.

FIG. 1 is a perspective view of the learning aid of the type which may embody the present invention. The learning aid includes a case 1 which encloses electronic circuitry, preferably implemented on integrated circuits (not shown in this Figure). The circuits are coupled to a display 2 and a keyboard 3. The display is preferably of a vacuum fluorescent type; however, it will be appreciated by those skilled in the art that other display means, such as arrays of light emitting devices, liquid crystal displays or gas discharge devices may be used, if desired. Also, in this embodiment, as a matter of design choice, the display has eight character positions. The keyboard 3 of the learning aid of this embodiment has 38 key switch positions, 26 of which are utilized to input the letters of the alphabet. Of the remaining 12 key switch positions, four are utilized for mode selection (on/mystery word, word challenge, letter guesser and crazy letter mode), another seven are utilized to control functions performed by the learning aid in its various modes of operation (level, erase, clue, replay, score, second player sub-mode and go) and the remaining key switch is the off-key.

The learning aid depicted in FIG. 1 may be battery powered or powered from a source of external electrical power, as desired. The case is preferably made of injection molded plastic and the keyboard switches may be provided by a 5×8 array of key switches of the type described in U.S. Pat. No. 4,005,293, if desired. Of course, other types of case materials or switches may be used.

MODES OF OPERATION

The learning aid of this embodiment has four modes of operation which will be subsequently described. It will be evident to those skilled in the art, however, that these modes of operation may be modified, reduced in number or expanded in capability. As a matter of design choice, the learning aid of this embodiment is provided with the following modes of operation.

The first mode, the mystery word mode, is automatically entered when the "on" key is depressed. In the mystery word mode, the operator may play an electronic version of an old children's game. A word is chosen at random from the non-volatile memory and the appropriate number of blank spaces is indicated on the display by dashes. The operator must attempt to discern the "mystery word" by guessing letters before exceeding the maximum number of incorrect guesses. The learning aid then generates and displays a numerical score based upon the number of incorrect guesses and the elapsed time required to guess the "mystery word." In the "second player" sub-mode, the learning aid will pose a "mystery word" to a second operator, and will subsequently display the numerical score obtained by the first operator and the second operator.

In the word challenge mode of operation, the operations are identical to the mystery word mode; however, rather than select a word from the non-volatile memory, the learning aid will accept an input word from an operator. The inputted word is then stored in memory and an appropriate number of blank spaces is displayed to a second operator of the learning aid. All scoring functions remain identical to mystery word mode. The word challenge mode of operation may also be played in the "second player" sub-mode.

In the letter guesser mode, the learning aid randomly selects a letter of the alphabet. The object of the game is for the operator to guess which letter is randomly selected by the learning aid in as few attempts as possible. After depressing the letter guesser key, the possible range in which the letter may lie is displayed by displaying the letter A in the left most portion of the display, and the letter Z in the right most portion of display 2. The operator then enters a guess by pressing the appropriate letter key, which guess is briefly displayed in the center of display 2. The guess is displayed for approximately one second and then the learning aid replaces one of the end limits (i.e., either the end limit in the left most portion of display 2 or at the right most portion of display 2) with the letter guessed, so that the randomly selected letter still lies within the range shown by the end limits. This sequence continues until the randomly selected letter is guessed. If the letter guessed lies outside the range of the end limits, the learning aid will not allow it to be entered. When the correct answer is entered, the number of guesses required is displayed.

Finally, in the crazy letter mode, the operator is tested on his ability to memorize and repeat a random sequence of alphabet letters. Depending upon the level of skill chosen by depressing the "level" key switch, the learning aid generates a random sequence of letters comprised of the letters A, B and C (level 1), A, B, C and D (level 2) and A,B, C, D and E (level 3). The length of the random sequence is incremented by one letter after each successful repetition of the previous sequence by the operator of the learning aid. The number of letters in the sequence at any given time is displayed prior to the beginning of the next sequence.

BLOCK DIAGRAM AND OPERATION

Figure 2:
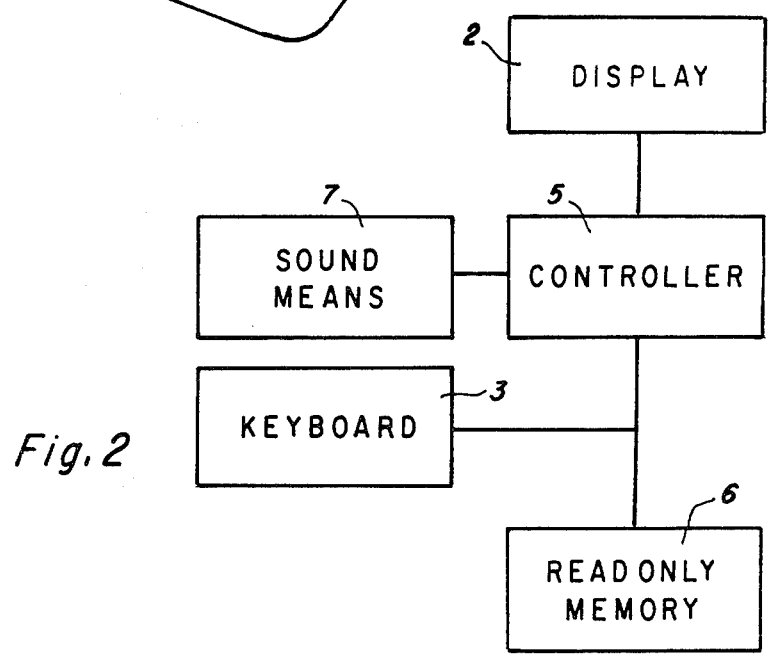
FIG. 2 depicts a logic block diagram of the learning aid.

Referring now to FIG. 2, there is depicted a logic block diagram of the learning aid of the present embodiment. The individual sections of the block diagram are well known to those skilled in the art, and the learning aid may be constructed utilizing pre-existing calculator chip type circuitry such as is described in U.S. Pat. Nos. 4,074,355 and 3,991,305. In the embodiment disclosed, the electronic portions of the learning aid were constructed utilizing one such calculator chip and one non-volatile read-only-memory chip.

Keyboard 3 may be a standard X-Y matrix keyboard such as is described in U.S. Pat. No. 4,005,293. Controller 5 may be implemented with a standard calculator chip circuit. Such an implementation is described in detail herein. Read-only-memory 6 is a standard, non-volatile read-only-memory such as fine wide application in calculator technology. Sound means 7 may be implemented utilizing a standard piezoelectric disc. Sound means 7 is utilized to provide reward and action sounds throughout all modes of operation. As previously discussed, display 2 may be implemented utilizing a vacuum fluorescent type display.

MYSTERY WORD MODE

In the mystery word mode of operation, the actuation of the "on/mystery word" key switch followed by the actuation of the "go" key switch causes controller 5 to randomly access read-only-memory 6 for a word. The word which is randomly accessed is temporarily stored in a memory within controller 5 and an appropriate number of blank spaces is displayed via display 2 to the operator of the learning aid. The operator of the learning aid then enters proposed letters via keyboard 3 and the proposed letters are compared with the randomly selected word stored in controller 5. If the letter entered by the operator is contained within the randomly selected word it is displayed in its appropriate position on display 2; however, if the letter entered by the operator is not contained within the randomly selected word the number of allowable incorrect guesses is decremented by one. If the operator is successful in correctly spelling the entire randomly selected word, controller 5 generates a numerical score based upon the number of incorrect guesses and the elapsed time required to discern the randomly selected word. The numerical score is then displayed to the operator via display 2. In the "second player" sub-mode, the operation is identical to the mystery word mode as described above, and two players may alternate attempting to guess which are the randomly selected words. Each player's score will subsequently be displayed via display 2.

WORD CHALLENGE MODE

In the word challenge mode, all operations are identical to the mystery word mode of operation except that the operator of the learning aid may enter a word via keyboard 3 which will be temporarily stored in the memory within controller 5. A second operator then attempts to discern the word entered by the first operator in the method described above.

LETTER GUESSER MODE

In the letter guesser mode of operation, controller 5 randomly selects a letter of the alphabet from read-only-memory 6. Controller 5 then causes display 2 to display the letter A in the leftmost portion of the display and the letter Z in the rightmost portion of the display. The operator then attempts to guess the randomly selected letter by entering a letter via keyboard 3. Controller 5 compares the letter entered by the operator at keyboard 3 with the randomly selected letter chosen from read-only-memory 6 and selectively exchanges one of the end boundaries with the letter entered by the operator so that the randomly selected letter still lies within the range shown by the end boundaries. This sequence continues until the randomly selected letter is guessed. When the correct answer is entered, the number of guesses required is displayed via display 2.

CRAZY LETTER MODE

In the crazy letter mode of operation, controller 5 randomly selects a letter of the alphabet from read-only-memory 6 and displays it momentarily via display 2. The operator of the learning aid then repeats the randomly selected letter by inputting the letter via keyboard 3. Controller 5 then compares the operator input via keyboard 3 with the randomly selected letter chosen from read-only-memory 6. If the comparison indicates the operator has correctly duplicated the letter randomly selected from read-only-memory 6, controller 5 repeats the first letter randomly selected from read-only-memory 6 momentarily and then momentarily displays a second letter randomly selected from read-only-memory 6. The operator must then repeat the sequence of randomly selected letters as displayed, via display 2, by inputting the letters at keyboard 3. This sequence is repeated and controller 5 will increment the number of letters in the random sequence by one letter each time the operator is successful in duplicating the sequence. The random sequence may be comprised of three, four or five letters, preferably in this embodiment; A, B, C, D or E. A counter circuit in controller 5 causes display 2 to display numerically the number of letters in the sequence at the conclusion of each successful duplication thereof by the operator of the learning aid.

CONTROLLER LOGIC DIAGRAMS

The controller used in the learning aid is preferably a microprocessor of the type described in U.S. Pat. No. 4,074,355, with modifications which are subsequently described. U.S. Pat. No. 4,074,355 is hereby incorporated herein by reference. It is to be understood, of course, that other microprocessors, as well as future microprocessors, may well find use in applications such as the speaking learning aid described herein.

The microprocessor of U.S. Pat. No. 4,074,355 is an improved version of an earlier microprocessor described in U.S. Pat. No. 3,991,305. One of the improvements concerned the elimination of digit driver devices so that arrays of light emitting diodes (LED's) forming a display could be driven directly from the microprocessor. As a matter of design choice, the display used with this learning aid is preferably a vacuum fluorescent (VF) display device. Those skilled in the art will appreciate that when LED's are directly driven, the display segments are preferably sequentially actuated while the display's common character position electrodes are selectively actuated according to information in a display register or memory. When VF displays are utilized, on the other hand, the common character position electrodes are preferably sequentially actuated while the segments are selectively actuated according to information in the display register or memory. Thus, the microprocessor of U.S. Pat. No. 4,074,355 is preferably altered to utilize digit scan similar to that used in U.S. Pat. No. 3,991,305.

The microprocessor of U.S. Pat. No. 4,074,355 is a four bit processor and to process alphanumeric information, additional bits are required. By using six bits, which can represent 26 or 64 unique codes, the twenty-six characters of the alphabet, ten numerals as well as several special characters may be handled with ease. In lieu of converting the microprocessor of U.S. Pat. No. 4,074,355 directly to a six bit processor, it was accomplished indirectly by software pairing the four bit words into eight bit bytes and transmitting six of those bits to the display decoder.

Figure 3A:
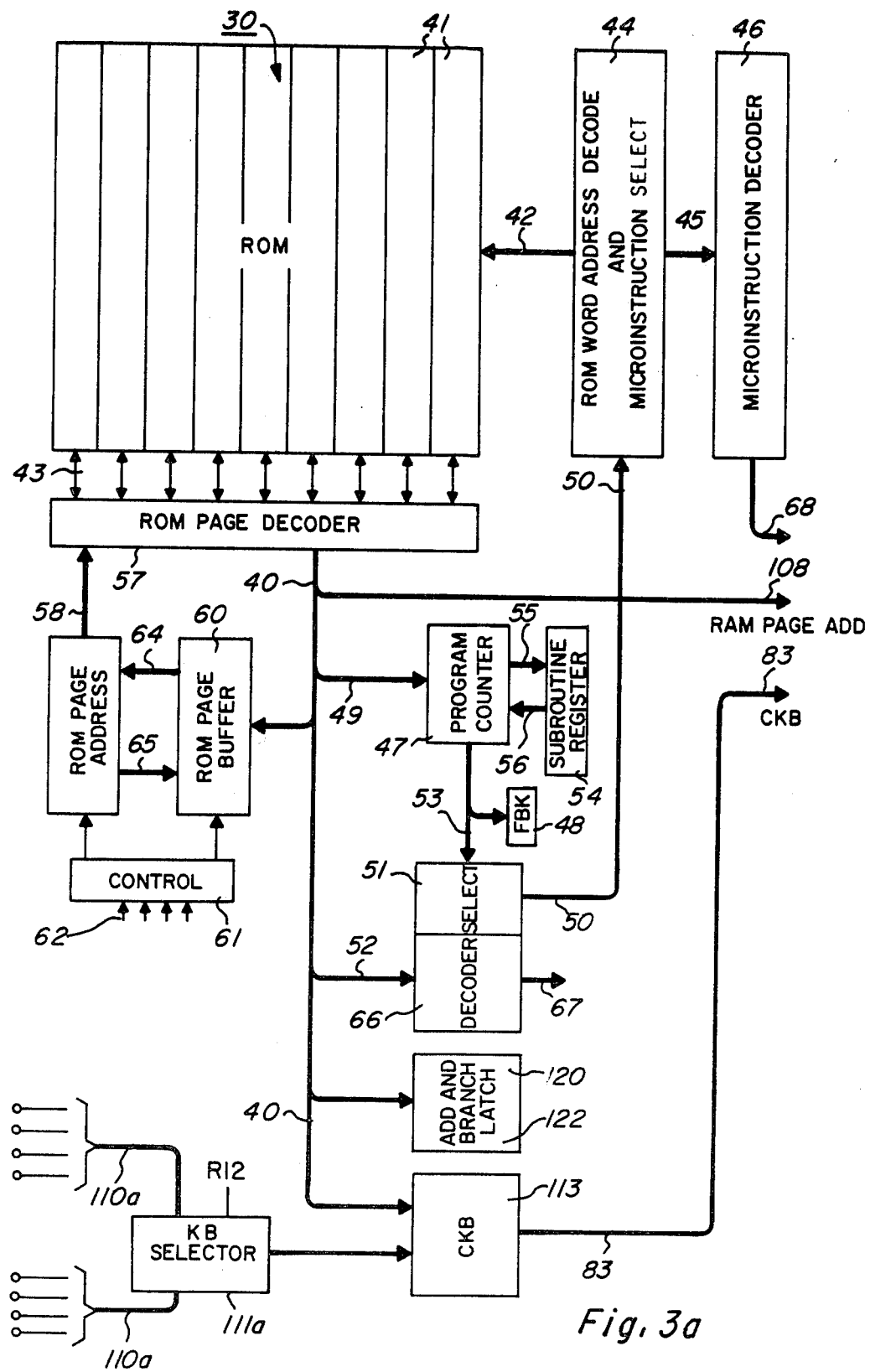
FIGS. 3a and b form a composite logic diagram of a microprocessor which may be utilized as a controller.
Figure 3B:
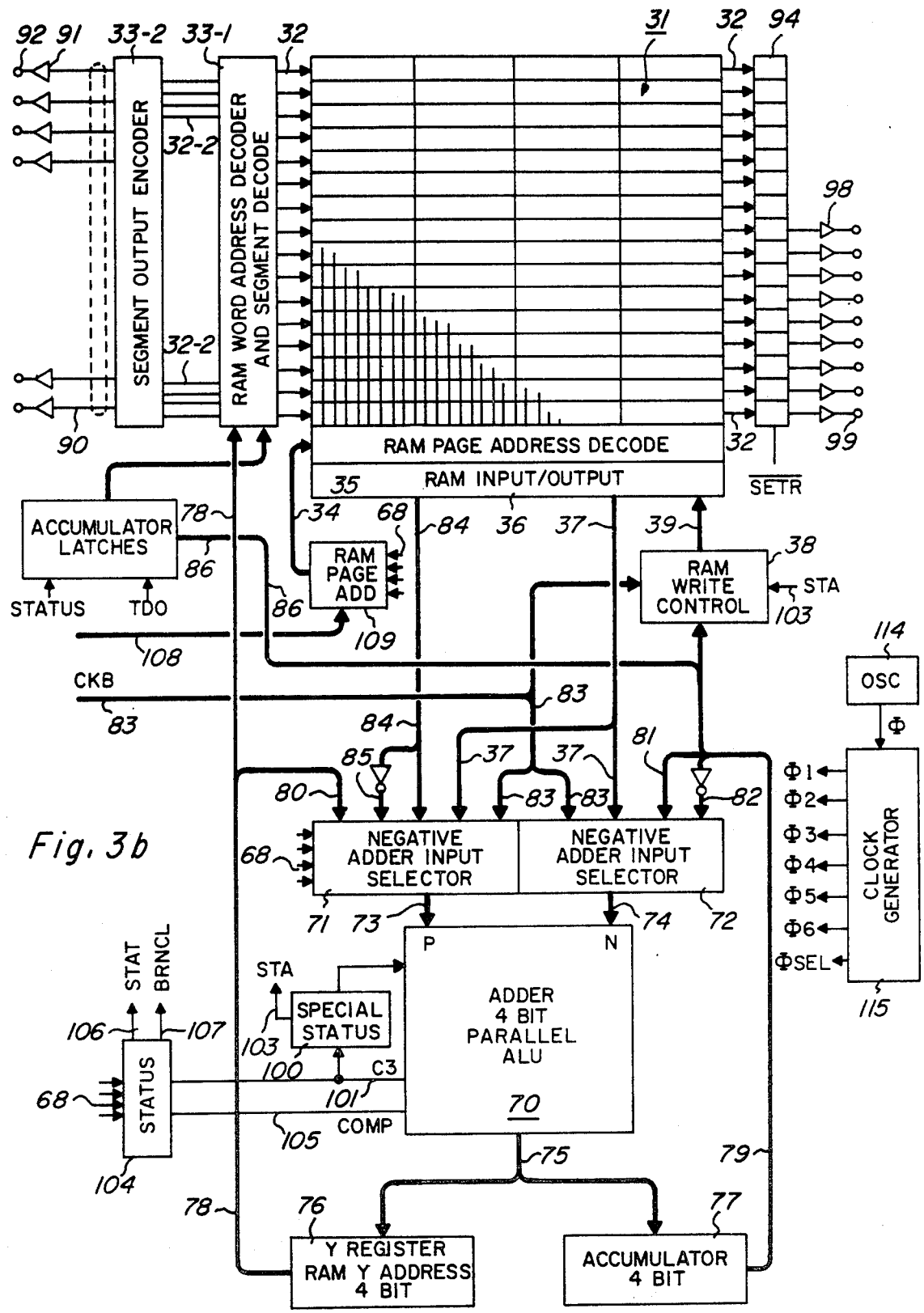

Referring now to FIGS. 3a-b, which form a composite block diagram of the microprocessor preferably used in the learning aid, it should be appreciated that this block diagram generally corresponds with the block diagram of FIGS. 7a and 7b of U.S. Pat. No. 4,074,355; several modifications to provide the aforementioned features of six bit operation and VF display cmpatability are also shown. The numbering shown in FIGS. 3a and 3b generally agrees with that of U.S. Pat. No. 4,074,355. The modificaions will now be described in detail.

Figure 4A:
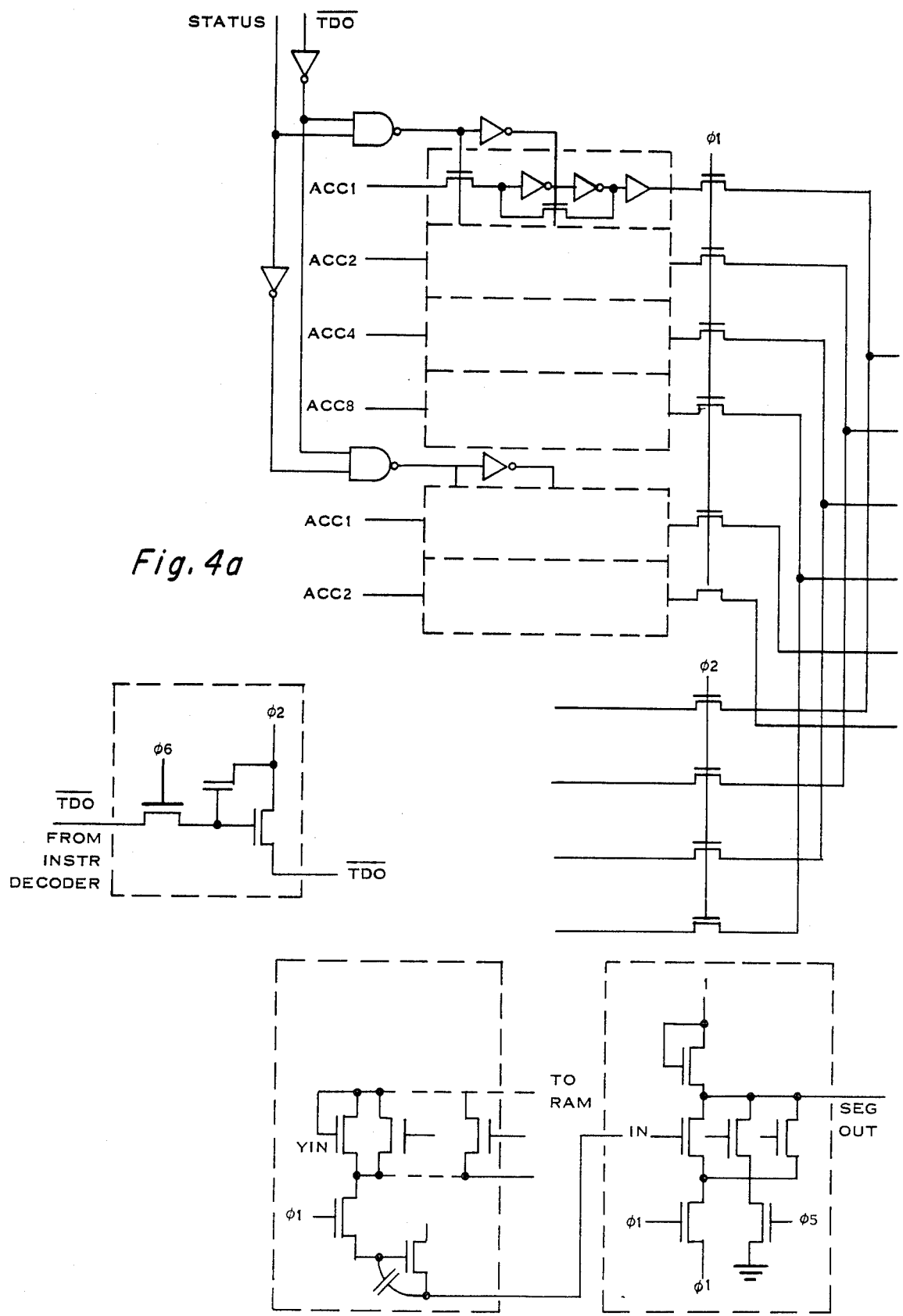
FIGS. 4a, b and c form a composite logic diagram of the segment decoder of the microprocessor.
Figure 4B:
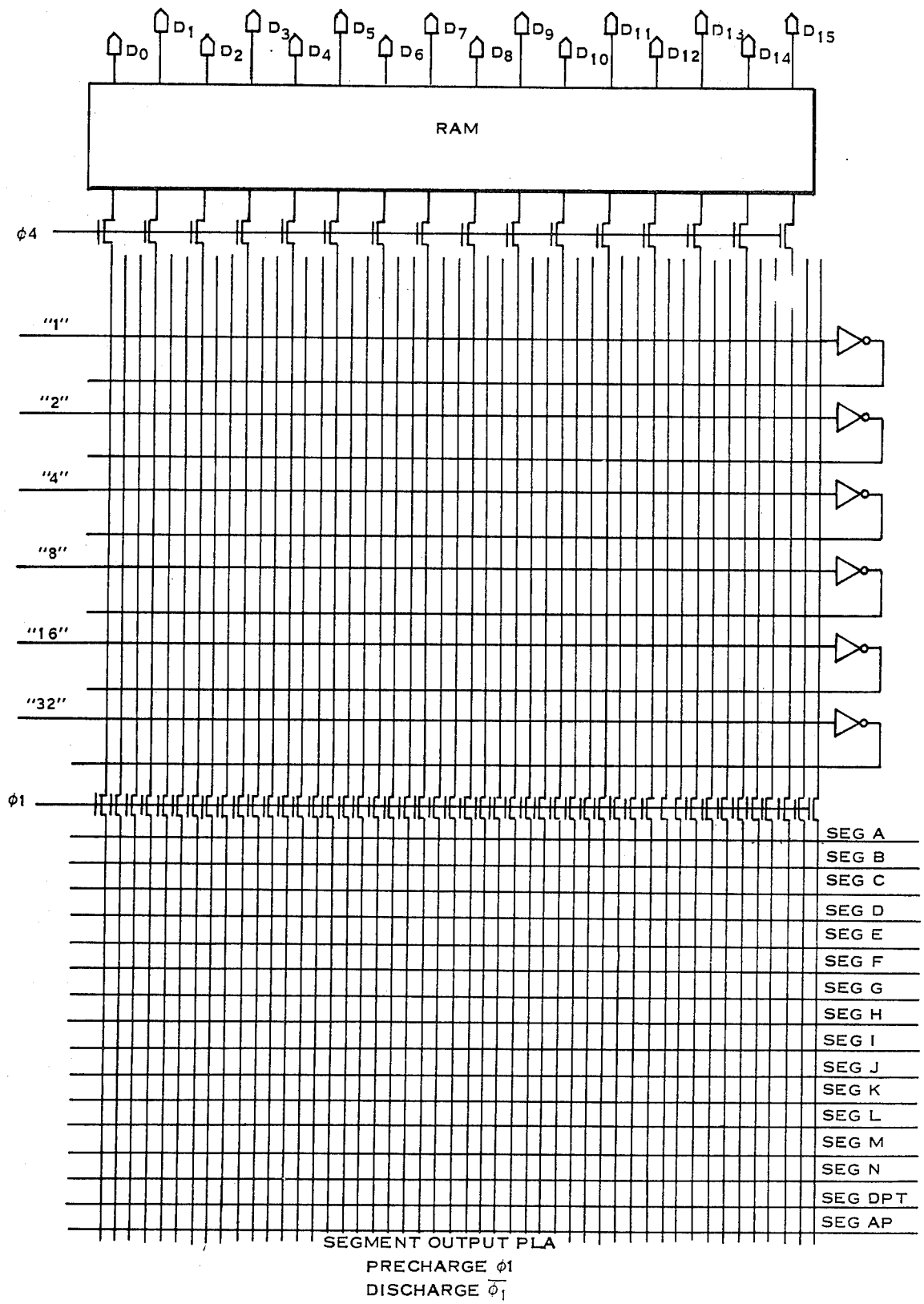
Figure 4C:
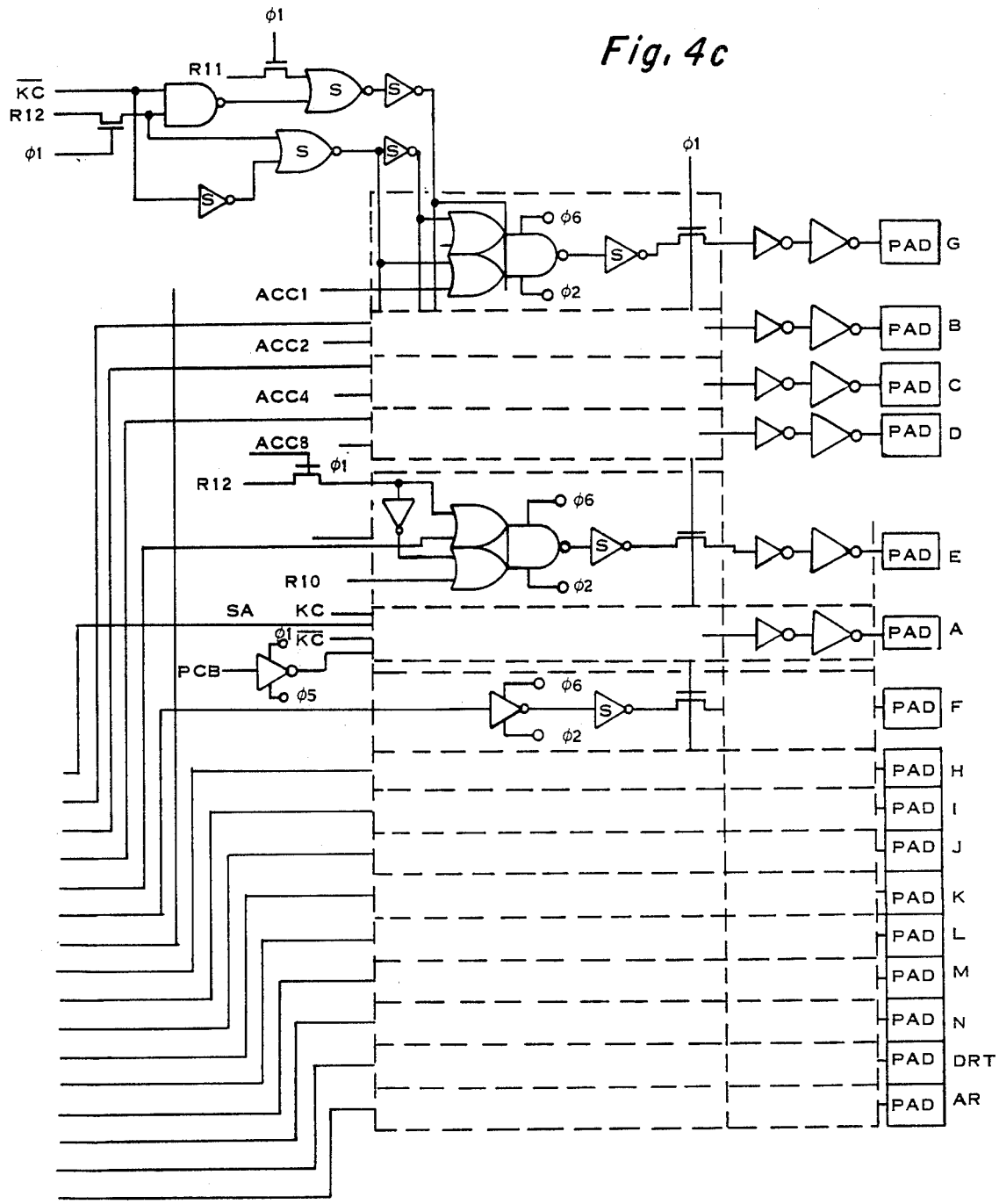

Referring now to the composite diagram formed by FIGS. 4a-c, which replace FIG. 13 of U.S. Pat. No. 4,074,355, there can be seen the segment decoder and RAM address decoder 33-1 (FIG. 3b) which decodes RAMY for addressing RAM 31 or ACC1-ACC8 for decoding segment information. Decoder 33-1 generally corresponds to decoder 33 in the aforementioned U.S. patent. The segment information is re-encoded into particular segment line information in output section 32-2 and outputted on bus 90 to segment drivers 91. Six bits of data from the processor's four bit accumulator 77 are decoded in decoder 33-1 as is now described. First, four bits on bus 86 are latched into accumulator latches 87-1 through 87-8 on a TDO (Transfer Data Out) instruction when status is a logical one. Then, two bits on bus 86 (from lines 86-1 and 86-2) are latched into accumulator latches 87-16 and 86-32, respectively, on another TDO instruction when status is a logical zero. Then the six bits in latches 87-1 through 87-32 are decoded in decoder 33-1. Segment drivers 91 may preferably be of one of three types, 91A, 91B or 91C as shown on FIGS. 4a-c. The 91A type drivers permit the data on ACC1-ACC8 to be communicated externally via pins SEG G, SEG B, SEG C and SEG D. The 91B type driver coupled to pin SEG E permits the contents of digit register 94-10 to be communicated externally when digit register 94-12 is set. The 91B type driver coupled to pin SEG A permits the contents of the program counter to be outputted during test operations.

Figure 5:
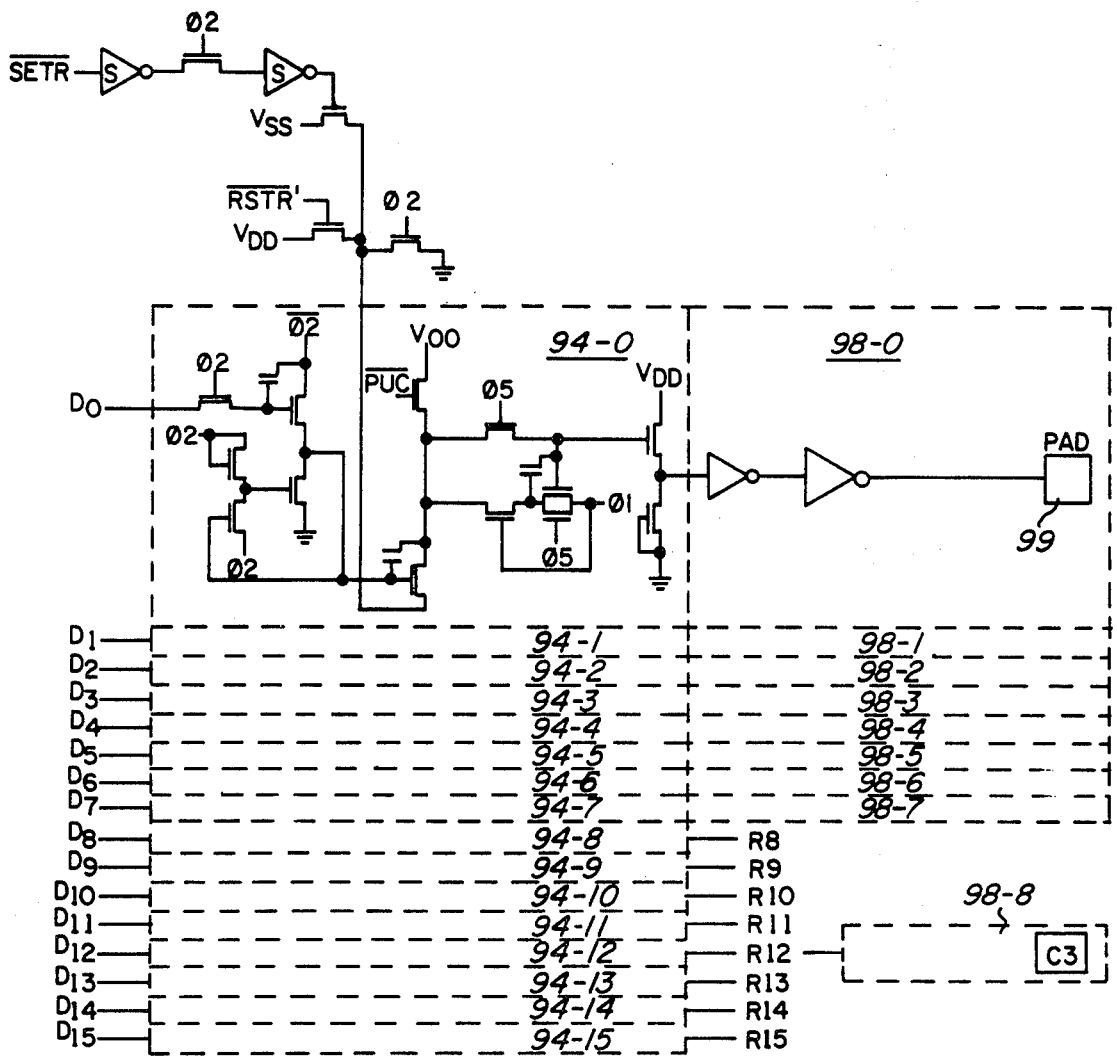
FIG. 5 depicts the digit output buffers and digit registers of the microprocessor.
Figure 6:
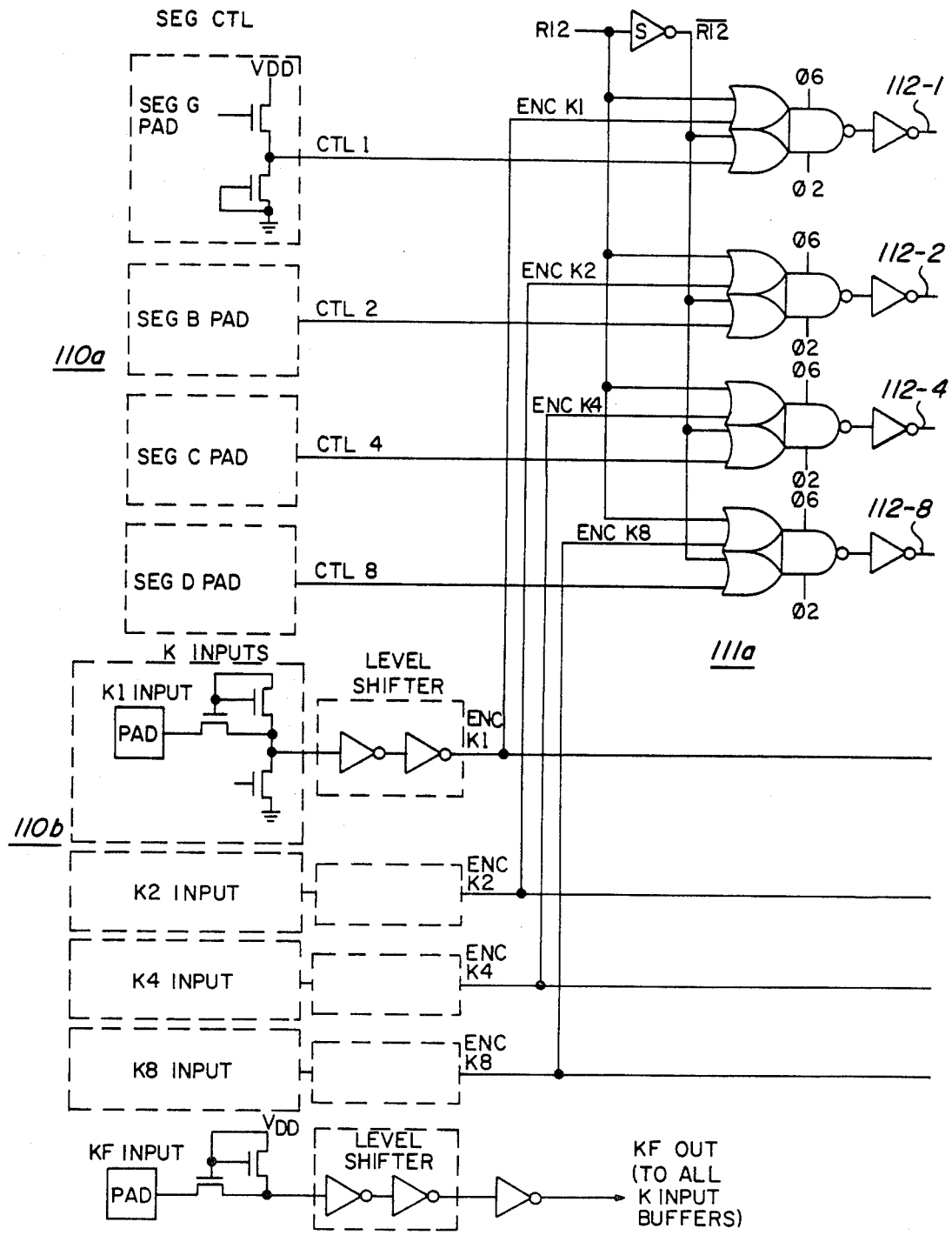
FIG. 6 depicts the KB selector circuit of the microprocessor.

The digit buffer registers and TDO latches of FIG. 14 of U.S. Pat. No. 4,074,355 are also preferably replaced with the digit buffer registers of FIG. 5 herein, inasmuch as (1) the DDIG signal is no longer used and (2) the digit latches (elements 97 in U.S. Pat. No. 4,074,355) are no longer used. For simplicity's sake, only one of the digit outbut buffer registers 94 is shown in detail. Further, since in this embodiment of the learning aid, display 2 preferably has eight character positions, eight output buffers 98-0 through 98-7 connect $D_0$-$D_7$ to the common electrodes of display 2 via registers 94-0- through 94-7 as shown in FIG. 5.

In Table I (which comprises Tables I-0 through I-15) is listed the set of instructions which may be stored in the main read-only-memory 30 of FIGS. 3a-b to be provided to controller 5. Referring now to Table I, there are several columns of data which are, reading from left to right: Address; Instruction; Branch Line; Line and Source Statement which includes Name, Title and Comments. In U.S. Pat. No. 4,074,355, it can be seen that main read-only-memory 30 is addressed with a seven bit address in program counter 47 and a four bit address in buffer 60. The address in buffer 60 is referred to as a page address in the main read-only-memory. The instructions listed on Table I-0 correspond to page zero in the microprocessor while the instructions listed in Table I-1 are those on page one and so forth through to the instructions in Table I-15 which are stored on page fifteen in the microprocessor.

The program counter 47 of the aforementioned microprocessor is comprised of a feedback shift register and therefore counts in a pseudorandom fashion. Thus, the addresses in the left-hand column of Table I, which are expressed as a hexadecimal number, exhibit such pseudorandomness. If the instruction starting at page zero were read out sequentially from the starting position in the program counter (00), then the instructions would be read out in the order shown in Table I. In the "Line" column is listed a sequentially increasing decimal number associated with each source statement and its instruction and a program counter address as well as those lines in which only comments appear. The line number starts at line 4 merely for reasons of convenience not important here. When an instruction requiring either a branch or call is to be performed, the address to which the program counter will jump and the page number to which the buffer will jump, if required, is reflected by the binary code comprising the instruction or instructions performing the branch or call. For sake of convenience, however, the branch line column indicates the line number in Table I, to which the branch or call will be made. For example, the instruction on line 9 (page 0, Program Counter Address 1F is a branch instruction, with a branch address of 110011010 (1A in hexadecimal). To facilitate finding the 1A address in the program counter, the branch line column directs the reader to line 251 where the 1A address is located.

READ-ONLY-MEMORY LOGIC DIAGRAM

Figure 7:
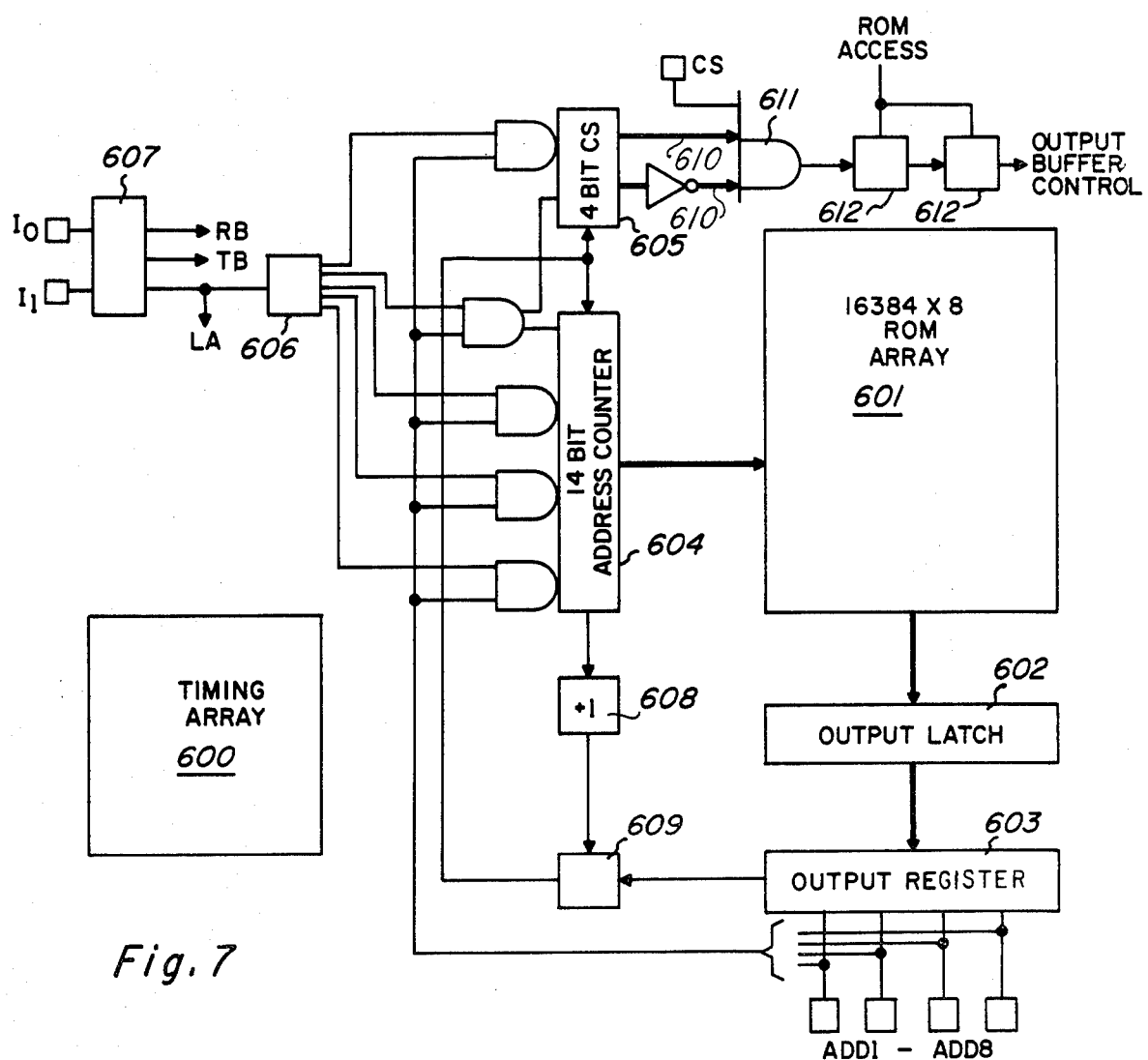
FIG. 7 is a block diagram of the read-only-memory.
Figure 8A:
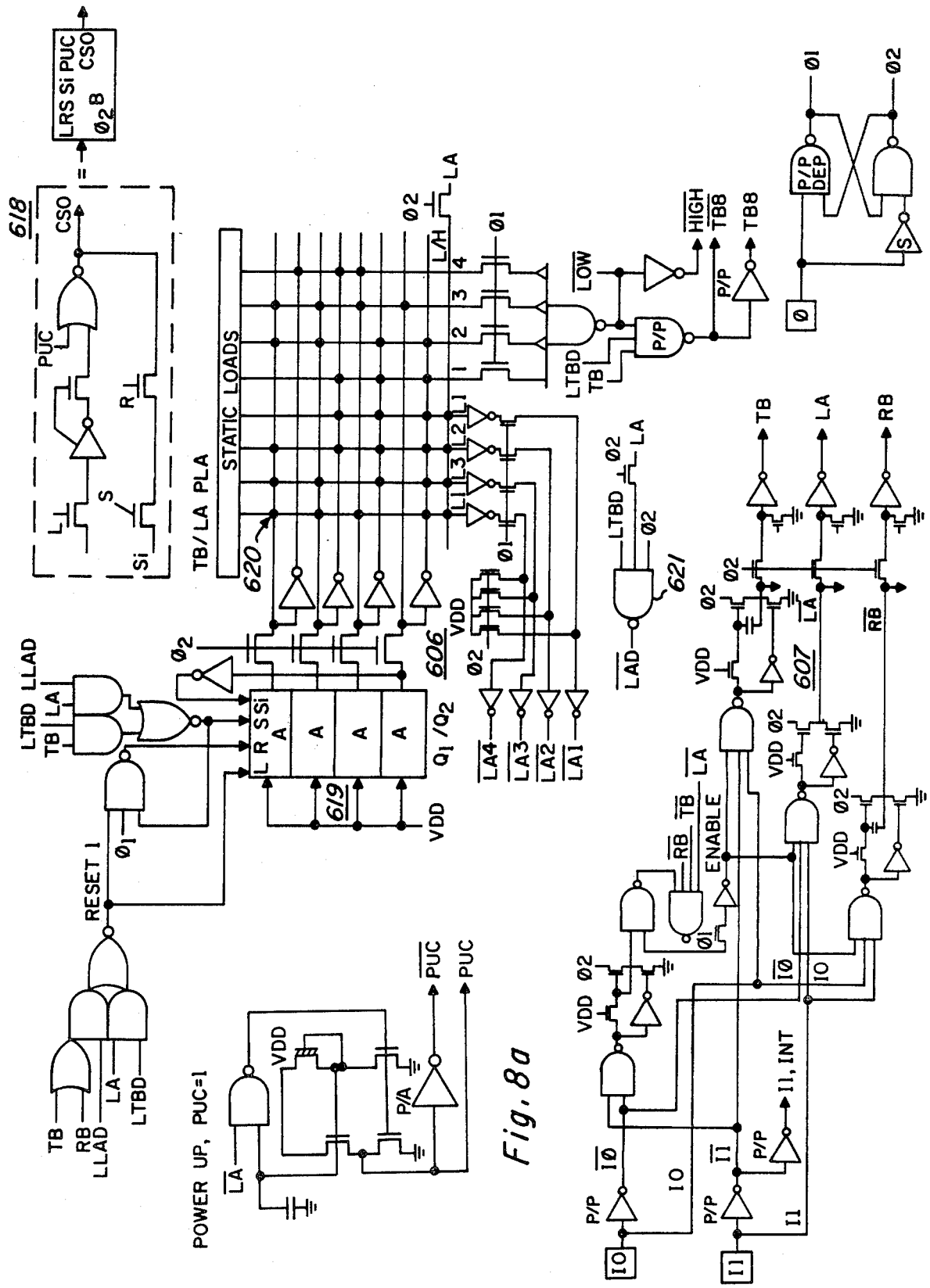
FIGS. 8a-f form a composite logic diagram of the control logic for the read-only-memory.
Figure 8B:
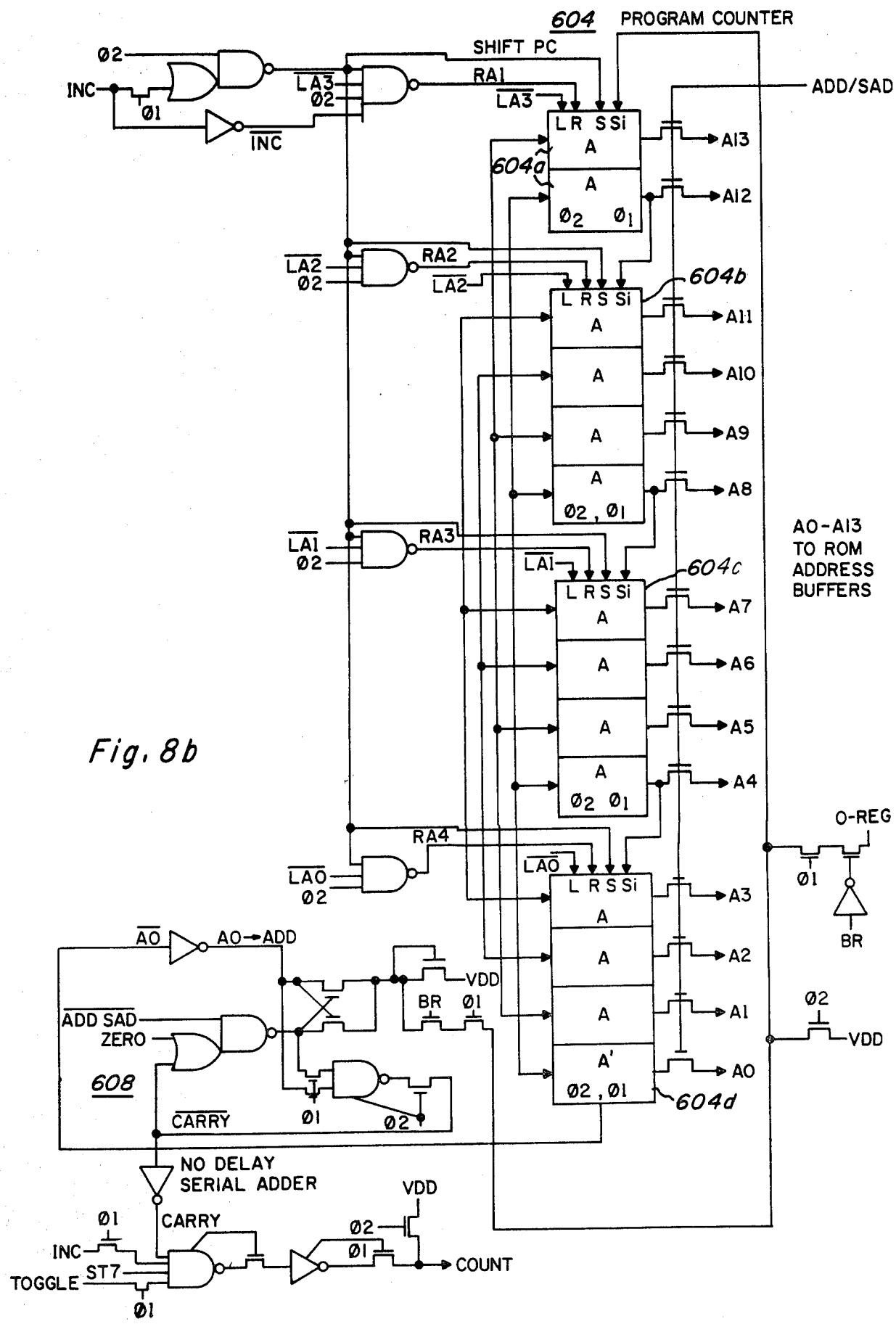
Figure 8C:
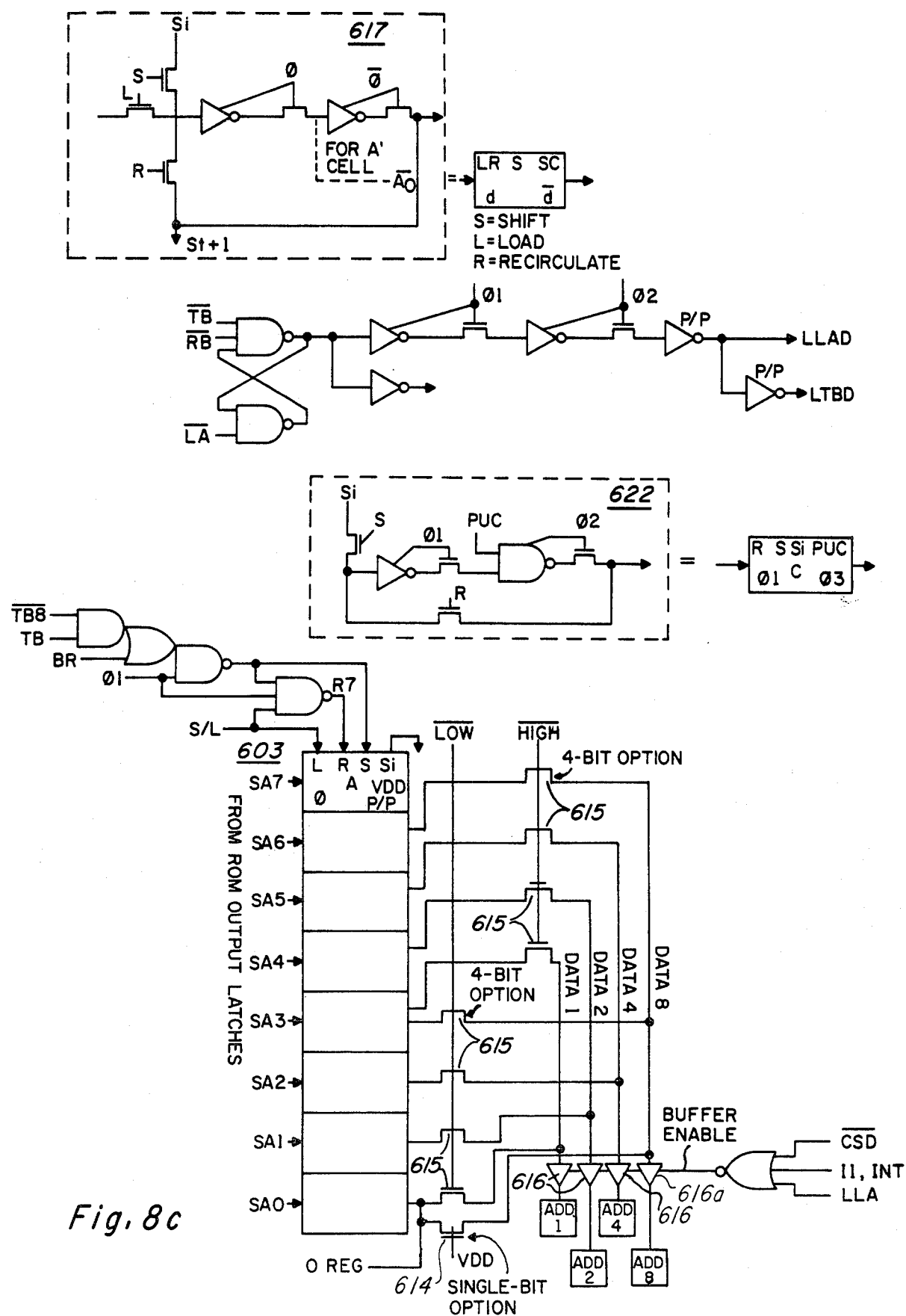
Figure 8D:
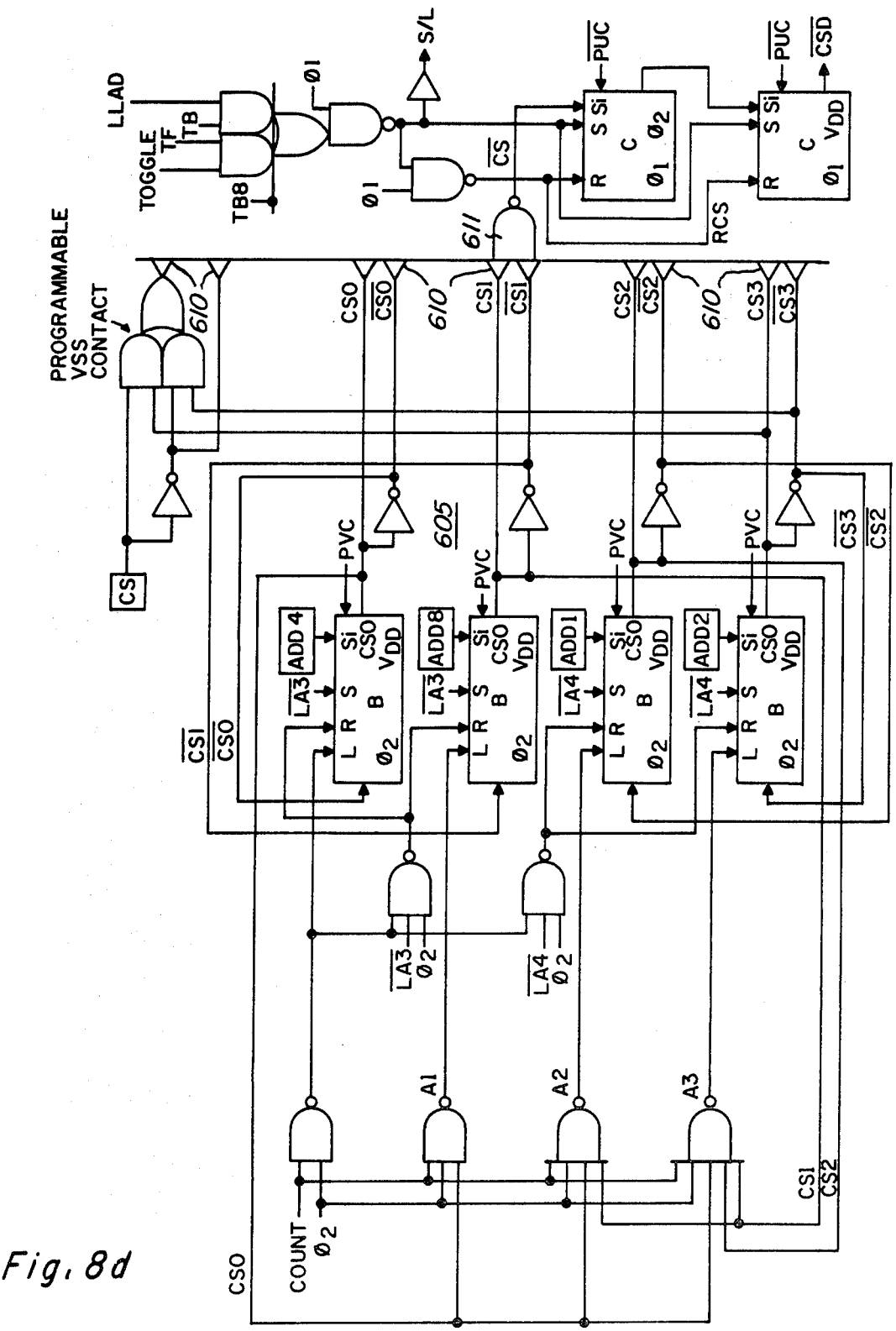
Figure 8E:
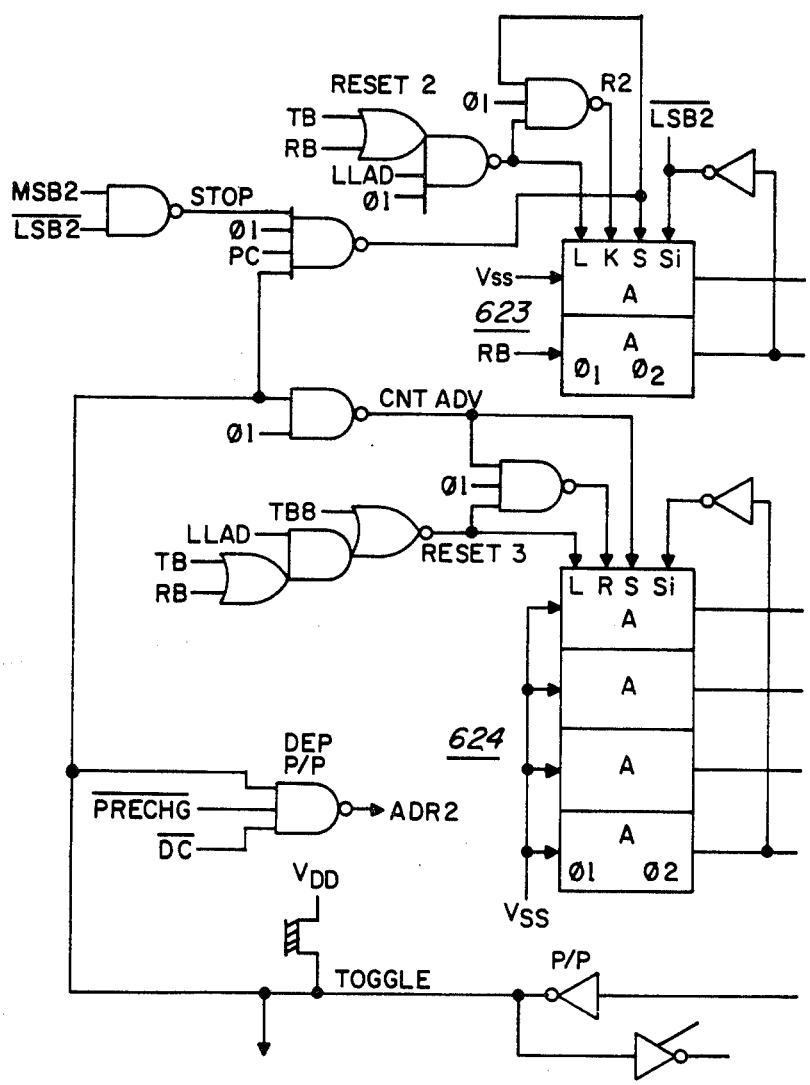
Figure 8F:
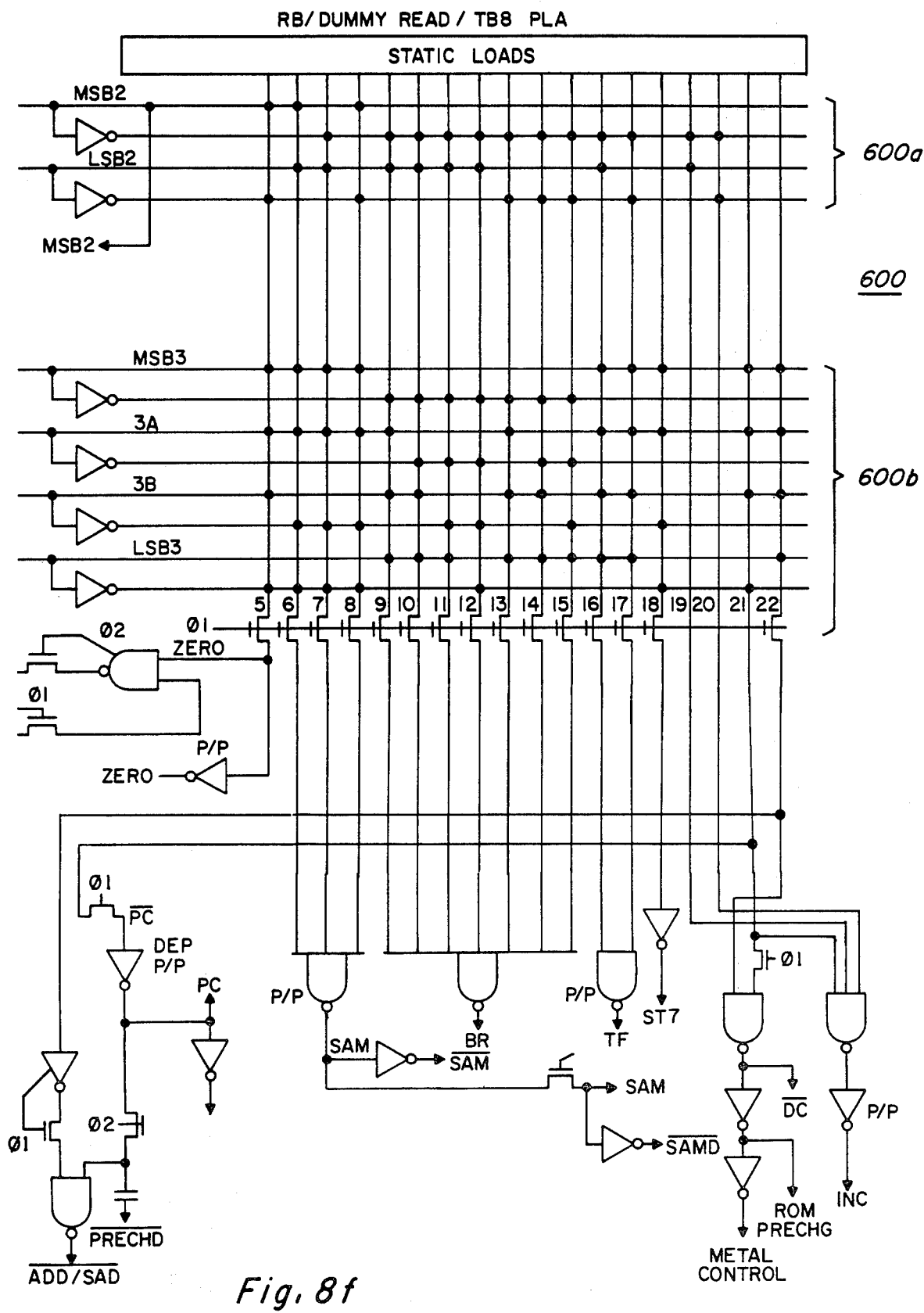
Figure 9A:
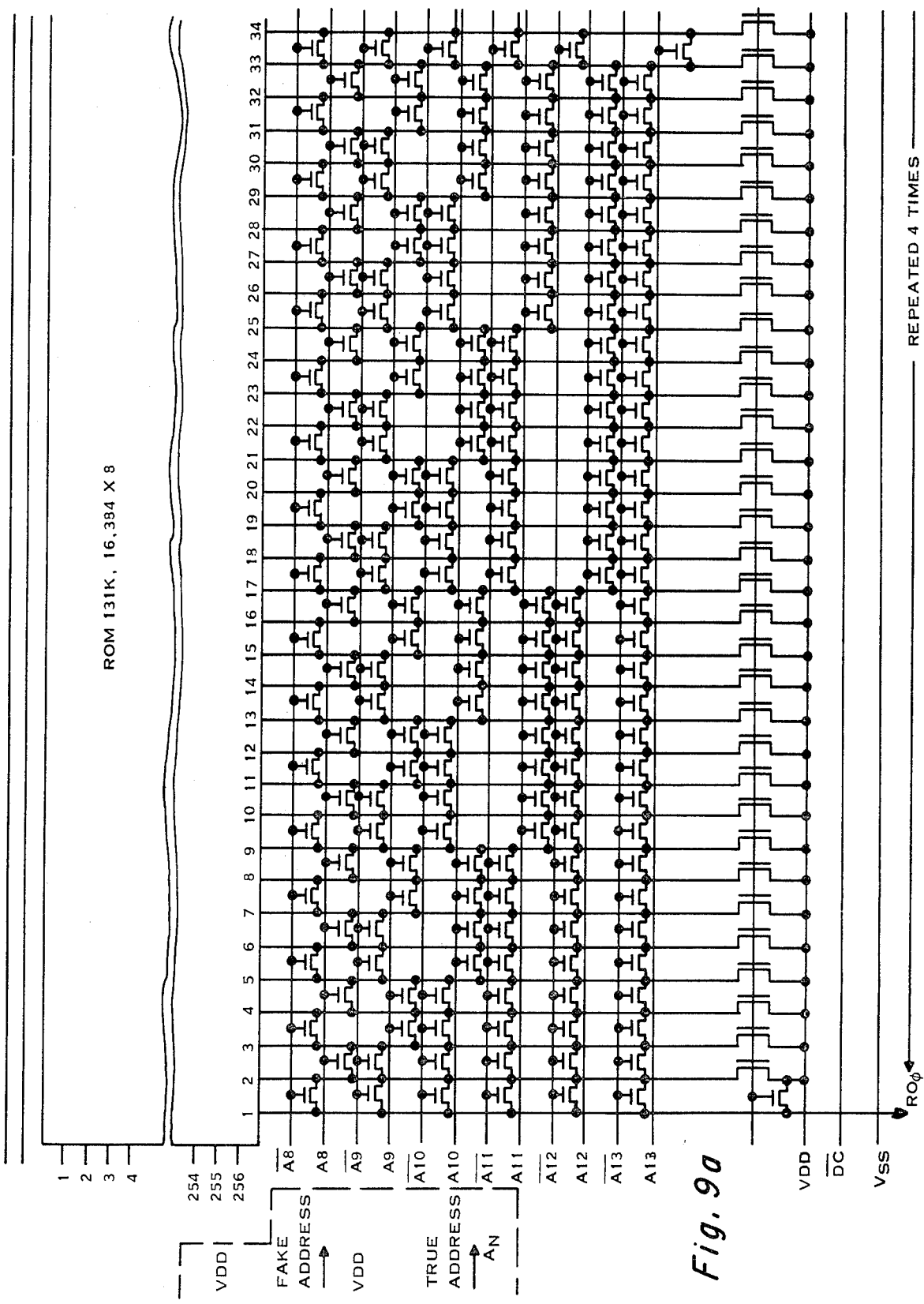
FIGS. 9a and b form a composite logic diagram of the X and Y address decoders and the array of memory cells.
Figure 9B:
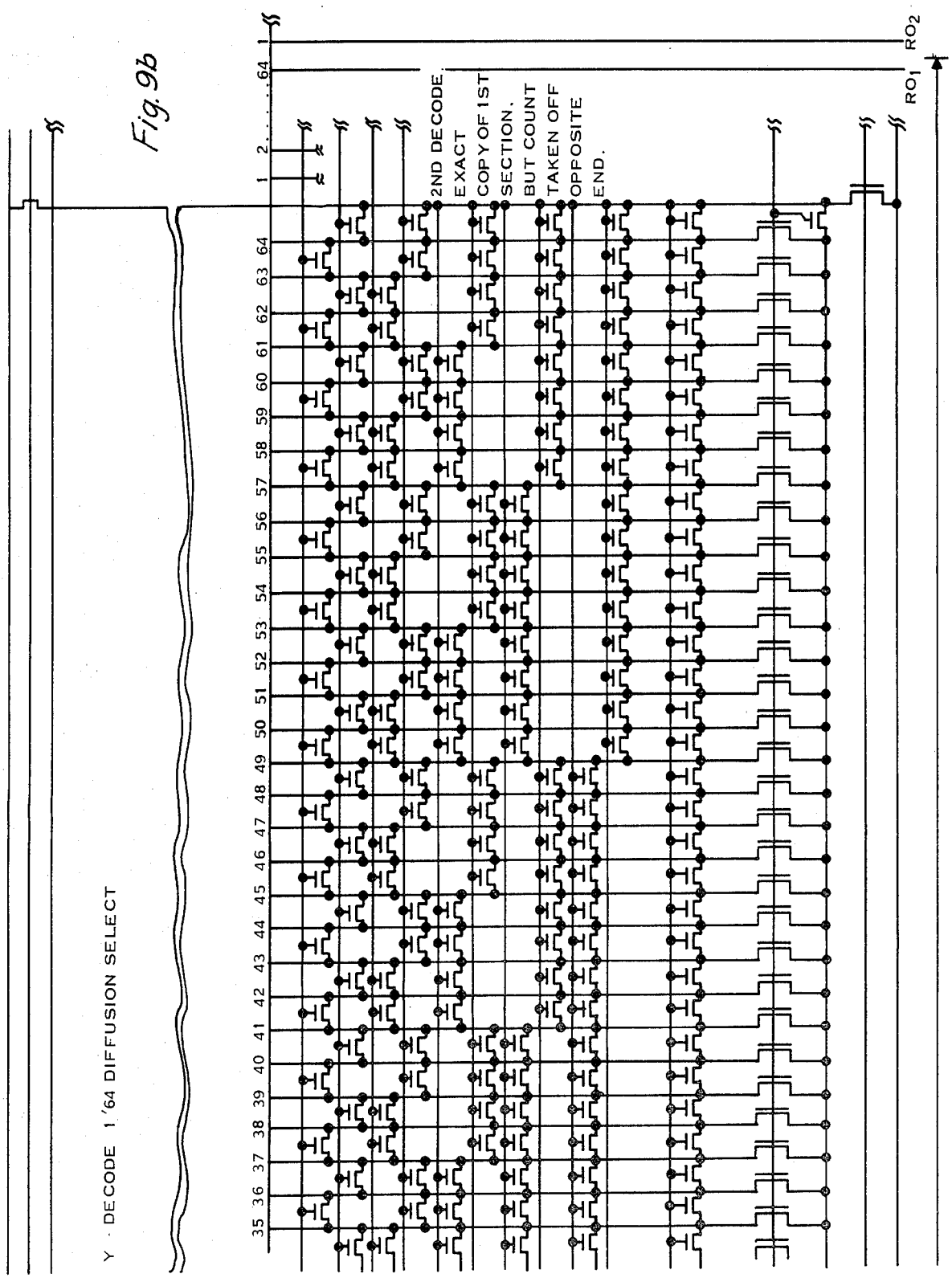

Read-only-memory (ROM) 6 is shown in FIGS. 7, 8a–f and 9a–b. FIG. 7 is a block diagram of the ROM. FIGS. 8a–f form a composite logic diagram of the control logic for the ROM while figures 9a–b form a composite logic diagram of the X and Y address decoders and show the array of memory cells.

Referring now to FIG. 7, the ROM array 601 is arranged with eight output lines, one output line from each section of 16,384 bits. The eight output lines from ROM array 601 are connected via an output latch 602 to an eight bit output register 603. The output register 603 is interconnected with pins ADD1–ADD8 and arranged either to communicate the four high or low order bits from output register 603 via the four pins ADD1–ADD8 or alternatively to communicate the bit serially from output register 603 via pin ADD1. The particular alternative used may be selective according to mask programmable gates.

ROM array 601 is addressed via a 14 bit address counter 604. The address counter 604 has associated therewith a four bit chip select counter 605. Addresses in address counter 604 and chip select counter 605 are loaded four bits at a time from pins ADD1–ADD8 in response to a decoded Load Address (LA) command. The first LA command loads the four least significant bits in address counter 604 (bits $A_0$–$A_3$), and subsequent LA commands load the higher order bits ($A_4$–$A_7$, $A_8$–$A_{11}$ and $A_{12}$–$A_{13}$). During the fourth LA cycle the $A_{12}$ and $A_{13}$ bits are loaded at the same time the CS0 and CS1 bits in chip select counter 605 are loaded. Upon the fifth LA command the two most significant bits in chip select counter 605 are loaded from ADD1 and ADD2. A counter 606 counts consecutively received LA commands for indicating where the four bits on ADD1–ADD8 are to be inputted into counters 604 and/or 605.

Commands are sent to the ROM chip via $I_0$ and $I_1$ pins to a decoder 607 which outputs the LA command, a TB (transfer bit) and an RB (read and branch) command.

Address register 604 and chip select register 605 have an add-one circuit 608 associated therewith for incrementing the address contained therein. When a carry occurs outside the fourteen bit number stored in address register 604, the carry is carried into chip select register 605, which may enable the chip select function if not previously enabled, or disable the chip select function if previously enabled, for example. Alternatively, the eight bit contents of output register 603 may be loaded into address register 604 by means of selector 609 in response to an RB command. During an RB command, the first byte read out of array 601 is used as the lower order eight bits while the next successive byte is used for the higher order six bits in counter 604.

The output of chip select register 605 is applied via programmable connectors 610 to gate 611 for comparing the contents of chip select counter 605 with a preselected code entered by the programming of connectors 610. Gate 611 is also responsive to a chip select signal on the chip select pin for permitting the chip select feature to be based on either the contents of the four bit chip select register 605 and/or the state of the chip select bit on the CS pin. The output of gate 611 is applied to two delay circuits 612, the output of which controls the output buffers associated with outputting information from output register 603 to pins ADD1–ADD8. The delay imposed by delay circuits 612 effects the two byte delay in this embodiment, because the address information inputted on pins ADD1–ADD8 leads the data outputted in response thereto by the time required to access ROM array 601.

A timing PLA 600 is used for timing the control signals outputted to ROM array 601 as well as the timing of other control signals.

Referring now to the composite drawing formed by FIGS. 8a–f, output register 603 is formed by eight "A" bit latches, an exemplary one of which is shown at 617. The output of register 603 is connected in parallel via a four bit path controlled on LOW or HIGH signals to output buffers 616 for ADD1–ADD4 and 616a for ADD8. Buffers 616 and 616a are shown in detail in FIGS. 9a–b.

Gates 615 which control the transferring of the parallel outputs from register 603 via buffers 616 in response to LOW and HIGH are preferably mask level programmable gates which are preferably not programmed when this chip is used with the learning aid described herein. Rather, the data in register 603 is communicated serially via programmable gate 614 to buffer 616a and pin ADD8. The bits outputted to ADD1–ADD8 in response to a HIGH signal are driven from the third through sixth bits in register 603, rather than the fourth through seventh bits, inasmuch as a serial shift will normally be accomplished between a LOW and HIGH signal.

Address register 604 comprises fourteen of the bit latches shown at 617. The address in address register 604 on lines $A_0$–$A_{13}$ is communicated to the ROM X and Y address buffers shown in FIGS. 9a–b. Register 604 is divided into four sections 604a–604d, the 604d section loading four bits from ADD1–ADD8 in response to a LA0 signal, the 604c section loading four bits from ADD1–ADD8 in response to an LA1 signal and likewise for section 604b in response to an LA2 signal. Section 604a is two bits in length and loads the ADD1 and ADD2 bits in response to an LA3 signal. The chip select register 605 comprises four B type bit latches of the type shown at 618. The low order bits, CS0 and CS1, are loaded from ADD4 and ADD8 in response to an LA3 signal while the high order bits CS2 and CS3 are loaded from ADD1 and ADD2 on an LA4 signal. The LA0–LA4 signals are generated by counter 606. Counter 606 includes a four bit register 619 comprised of four A bit latches 617. The output of the four bit counter 619 is applied to a PLA 620 for decoding the LA1-LA4 signals. The LA0 signal is generated by a NAND gate 621. As can be seen, the LA0 signal comes up in response to an LA signal being decoded immediately after a TB signal. The gate 621 looks for a logical one on the LA signal and a logical one on an LTBD (latched transfer bit delay) signal from latch 622. Latch circuit 622 is responsive to signals LA, RB and TB for indicating whether the previously received instruction was either an LA or a TB or RB command.

In addition to counting successive LA commands, four bit counter 619 and PLA 620 are used to count successive TB commands.

Add-one circuit 608 increments the number in program counter 604 in response to a TB command or an RB command. Since two successive bytes are used as a new address during an RB cycle, the card address and the present address incremented by one must be used to generate these two bytes. The output of add-one circuit 608 is applied via selector 609 for communicating the results of the incrementation back to the input of counter 604. Selector 609 permits the bits in output register 603 to be communicated to program counter 604 during an RB cycle as controlled by signal BR from timing array 600. Add-one circuit 608 is also coupled via COUNT to chip select counter 605 for incrementing the number stored therein whenever a CARRY would occur outside the fourteen bits stored in program counter 604. The output of chip select counter 605 is applied via programmable gate 610 to gate 611. The signal on the CS pin may also be applied to connectors 611 or compared with the contents of CS3. Thus, gate 611 can test for either (1) the state of the CS signal; (2) a specific count in counter 605; (3) a comparison between the state on the chip select and the state of CS3 or (4) some combination of the foregoing, as may be controlled by those knowledgeable in the art according to how programmable links 610 are programmed during chip manufacture. The output of gate 611 is applied via two bit latches of the C type, which are shown at 622. Timing array 600 controls the timing of ROM sequencing during RB and TB sequences. Array 600 includes PLA sections 600a and 600b and counters 623 and 624. Counter 623 is a two bit counter comprising two A type bit latches shown at 617. Counter 623 counts the number of times a ROM access is required to carry out a particular instruction. For instance, a TB command requires one ROM access while an RB command requires three ROM accesses. Counter 624, which comprises four "A" type bit latches of the type shown at 617, counts through the ROM timing sequence for generating various control signals used in accessing ROM array 601. The various signals generated by the PLA sections 600a and 600b will now be briefly described. The BR signal controls the transfer of two serial bits from the output register 603 to the program counter 604. The TF signal controls the transfer of eight bits from the output latch 602 to output register 603 on lines SA0-SA7. INC controls the serial incrementing of the program counter, two bits for each INC signal generated. PC is the precharge signal for the ROM array and normally exists for approximately ten microseconds. The DC signal discharges the ROM 601 array and preferably lasts for approximately ten microseconds for each DC signal. This particular ROM array uses approximately seventy microseconds to discharge and thus seven DC signals are preferably generated during each addressing sequence. The signal SAM gates the data outputted from the ROM into the output latch 602 while the signal SAD gates the address lines by gating the address from the program counter into the ROM address buffers.

ALTERNATIVE EMBODIMENTS

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

TABLE 1-0

| ADDRESS | | INSTRUCTION | | | NAME | TITLE | COMMENTS | |
|---|---|---|---|---|---|---|---|---|
| 0000 | 0000 | 01000110 | | 0004 | MUSIC | CALLL | LOADADD | |
| 0001 | 0003 | 11100010 | 0866 | 0005 | | | | |
| 0003 | 0007 | 01000111 | | 0006 | | CALLL | READ | DUMMY |
| 0007 | 000F | 11001110 | 1955 | 0007 | | | | |
| 000F | 001F | 01000000 | | 0008 | | CALLL | WASTE | |
| 001F | 003F | 11001010 | 0251 | 0009 | | | | |
| 003F | 007F | 01000111 | | 0010 | REAL | CALLL | READ | |
| 007F | 007E | 11001110 | 1955 | 0011 | | | | |
| 007E | 007D | 01001000 | | 0012 | | LDX | 0 | |
| 0070 | 0074 | 00100101 | | 0013 | | TCY | 13 | |
| 0078 | 0076 | 00010111 | | 0014 | | TAM | | |
| 0077 | 006F | 01000111 | | 0015 | | CALLL | READ | |
| 006F | 005F | 11001110 | 1955 | 0016 | | | | |
| 005F | 003F | 01001000 | | 0017 | | LDX | 0 | |
| 003E | 007C | 00100011 | | 0018 | | TCY | 12 | |
| 007C | 0079 | 00010111 | | 0019 | | TAM | | |
| 0079 | 0072 | 01000111 | | 0020 | | CALLL | READ | |
| 0073 | 0066 | 11001110 | 1955 | 0021 | | | | |
| 0067 | 004F | 01001000 | | 0022 | | LDX | 1 | |
| 004F | 001E | 00100101 | | 0023 | | TCY | 13 | |
| 001E | 003F | 00010111 | | 0024 | | TAM | | |
| 0030 | 0078 | 01000111 | | 0025 | | CALLL | READ | |
| 007A | 0075 | 11001110 | 1955 | 0026 | | | | |
| 0075 | 006A | 00100011 | | 0027 | | TCY | 12 | |
| 006A | 0056 | 01001000 | | 0028 | | LDX | 1 | |
| 0057 | 002E | 00010101 | | 0029 | | TAMTYC | | |
| 002E | 005C | 00010101 | | 0030 | | TMA | | |
| 005C | 0039 | 01110011 | | 0031 | | ALEC | 14 | |
| 0038 | 0070 | 10110011 | 0070 | 0032 | | BRANCH | OUTOUT | |

| | | | | | | | |
|---|---|---|---|---|---|---|---|
| 0070 | 0061 | 000000110 | | 0033 | SOUND | CLA | |
| 0061 | 0042 | 001001011 | | 0034 | BLOOP | TCY | 13 |
| 0043 | 0006 | 000101011 | | 0035 | | TYA | |
| 0006 | 000C | 010110000 | | 0036 | | TDO | UP(10) |
| 000C | 001B | 001110000 | | 0037 | | ACACC | 0 |
| 001B | 0037 | 010110000 | | 0038 | | TDO | |
| 0037 | 006F | 010010000 | | 0039 | | LDX | 0 |
| 006F | 0050 | 001000011 | | 0040 | | TCY | 12 |
| 0050 | 003A | 000101010 | | 0041 | | TMY | |
| 003A | 0074 | 001110100 | | 0042 | | ACACC | 2 |
| 0074 | 0069 | 001110100 | | 0043 | ALOOP | ACACC | 2 |
| 0069 | 0052 | 001111111 | | 0044 | A1 | ACACC | 15 |
| 0053 | 0026 | 101101001 | 0044 | 0045 | | BRANCH | A1 |
| 0026 | 004C | 000000100 | | 0046 | | DYN | |
| 004C | 0019 | 101110100 | 0043 | 0047 | | BRANCH | ALOOP |
| 0019 | 0030 | 000000110 | | 0048 | | CLA | |
| 0031 | 0063 | 001111100 | | 0049 | | ACACC | 3 |
| 0062 | 0045 | 010110000 | | 0050 | | TDO | |
| 0045 | 000A | 001001011 | | 0051 | | TCY | 13 |
| 000A | 0014 | 000101010 | | 0052 | | TMY | |
| 0015 | 002B | 001110011 | | 0053 | | ACACC | 12 |
| 002B | 0057 | 001110100 | | 0054 | BLOOP | ACACC | 2 |
| 0056 | 002D | 001111111 | | 0055 | A2 | ACACC | 15 |
| 002C | 0058 | 101010101 | 0055 | 0056 | | BRANCH | A2 | DELAY 8 INSTRUCTIONS
| 0058 | 0031 | 000000100 | | 0057 | | DYN | |
| 0030 | 0060 | 100101011 | 0054 | 0058 | | BRANCH | BLOOP |
| 0060 | 0041 | 010011000 | | 0059 | | LDX | 1 |
| 0041 | 0002 | 001001011 | | 0060 | | TCY | 13 |
| 0002 | 0004 | 000000111 | | 0061 | | DMAN | |
| 0005 | 000B | 101111000 | 006B | 0062 | | BRANCH | BBLOOP |
| 000B | 0017 | 000101100 | | 0063 | | TAMDYN | |
| 0017 | 002F | 000000111 | | 0064 | | DMAN | |
| 002F | 005F | 101111000 | 006B | 0065 | | BRANCH | BBLOOP |
| 005E | 003D | 010111111 | | 0066 | | RFTN | |
| 003C | 007A | 100111111 | 0010 | 0067 | | BRANCH | REAL |
| 007B | 0071 | 000101111 | | 0068 | BBLOOP | TAM | |
| 0071 | 0062 | 101100001 | 0034 | 0069 | | BRANCH | BLOOP |
| 0063 | 0046 | 111110000 | 0033 | 0070 | OUTOUT | CALL | SOUND |
| 0047 | 000F | 010010000 | | 0071 | | LDX | 8 | TESTING FLAG
| 000E | 001C | 001000011 | | 0072 | | TCY | 12 |
| 0010 | 003A | 000101001 | | 0073 | | TMA | |
| 003A | 0077 | 011101000 | | 0074 | | ALEC | 1 |
| 0076 | 0060 | 100111011 | 0119 | 0075 | | BRANCH | COMTUNE |
| 0060 | 005A | 010001001 | | 0076 | | LDP | 9 |
| 005B | 0036 | 011100100 | | 0077 | | ALEC | 2 |
| 0036 | 006C | 100011001 | 1276 | 0078 | | BRANCH | COMREWD |
| 006C | 0059 | 011101100 | | 0079 | | ALEC | 3 |
| 0059 | 0032 | 101010101 | 1283 | 0080 | | BRANCH | COMSREWD |
| 0032 | 0064 | 010000110 | | 0081 | | LDP | 6 |
| 0064 | 0049 | 011100010 | | 0082 | | ALEC | 4 |
| 0049 | 0012 | 101001101 | 0893 | 0083 | | BRANCH | COMPENT |
| 0012 | 0024 | 010001011 | | 0084 | COMFIVE | BL | OTSP/KH |
| 0025 | 004B | 100000110 | 1709 | 0085 | | | |
| 004A | 0015 | 010010001 | | 0086 | TUNE | LDX | 8 |
| 0014 | 0028 | 001000011 | | 0087 | | TCY | 12 |
| 0029 | 0053 | 001101000 | | 0088 | | TCMIY | 1 | FLAG
| 0052 | 0025 | 010010001 | | 0089 | LOAD | LDX | 8 |
| 0024 | 004B | 001001001 | | 0090 | | TCY | 9 |
| 004B | 0011 | 001101111 | | 0091 | | TCMIY | 15 |
| 0010 | 0020 | 001100000 | | 0092 | | TCMIY | 0 |
| 0021 | 0043 | 001100000 | | 0093 | | TCMIY | 0 |
| 0042 | 0005 | 001001110 | | 0094 | | TCY | 7 |
| 0004 | 000B | 010111111 | | 0095 | | RFTN | |
| 0009 | 0013 | 011100000 | | 0096 | | ALEC | 0 |
| 0013 | 0027 | 101000110 | 0116 | 0097 | | BRANCH | TUNE1 |
| 0027 | 004F | 011101000 | | 0098 | | ALEC | 1 |
| 004F | 001D | 100001000 | 0113 | 0099 | | BRANCH | TUNE2 |
| 001C | 003A | 011100100 | | 0100 | | ALEC | 2 |
| 0039 | 0073 | 101010001 | 0110 | 0101 | | BRANCH | TUNE3 |
| 0072 | 0065 | 011101100 | | 0102 | | ALEC | 3 |
| 0065 | 004A | 101011010 | 0107 | 0103 | | BRANCH | TUNE4 |
| 004B | 0016 | 001100111 | | 0104 | TUNE5 | TCMIY | 14 |
| 0016 | 002C | 001100011 | | 0105 | | TCMIY | 12 |
| 0020 | 005B | 100000000 | 0004 | 0106 | | BRANCH | MUSIC |
| 005A | 0035 | 001100011 | | 0107 | TUNE4 | TCMIY | 12 |
| 0034 | 006B | 001100011 | | 0108 | | TCMIY | 12 |
| 006B | 0051 | 100000000 | 0004 | 0109 | | BRANCH | MUSIC |
| 0051 | 0022 | 001100101 | | 0110 | TUNE3 | TCMIY | 10 |
| 0022 | 0044 | 001100011 | | 0111 | | TCMIY | 12 |
| 0044 | 0009 | 100000000 | 0004 | 0112 | | BRANCH | MUSIC |
| 000A | 0010 | 001100011 | | 0113 | TUNE2 | TCMIY | 8 |
| 0011 | 0023 | 001100011 | | 0114 | | TCMIY | 12 |
| 0023 | 0047 | 100000000 | 0004 | 0115 | | BRANCH | MUSIC |
| 0046 | 000D | 001100110 | | 0116 | TUNE1 | TCMIY | 6 |
| 000C | 0018 | 001100011 | | 0117 | | TCMIY | 12 |
| 0019 | 0033 | 100000000 | 0004 | 0118 | | BRANCH | MUSIC |
| 0033 | 0067 | 010011100 | | 0119 | COMTUNE | LDX | 3 |
| 0066 | 0040 | 001000100 | | 0120 | | TCY | 4 |
| 0040 | 001A | 010001100 | | 0121 | | LDP | 3 |
| 001A | 0034 | 000000000 | | 0122 | | TBIT | 0 |
| 0035 | 006B | 101000001 | 0447 | 0123 | | BRANCH | DOORRR |
| 006A | 0055 | 010000010 | | 0124 | | LDP | 4 |
| 0055 | 002A | 100111010 | 055B | 0125 | | BRANCH | DOORR |
| 002A | 0054 | 001001100 | | 0126 | ERASE | TCY | 3 |

```
0054  0029  010011110        0127          LDX      7
002B  0050  010001110        0128          LDP      7
0050  0021  000100001        0129          TBIT     2
0020  0040  100100100  0990  0130          BRANCH   FRA8E1
0040  0001  100100010  1011  0131          BRANCH   GEND
```

TABLE 1-1

```
                                0132          ORGPG    1
0000  0080  010011110         0133  TPLYR    LDX      7
0001  0083  001001010         0134           TCY      5
0003  0087  000100000         0135           TBIT     0
0007  008F  100111111  0139   0136           BRANCH   TPLYR1
000F  009F  010001011         0137  DEND     BL       DISP/KB
001F  00BF  100000110  1709   0138
003F  00FF  010011110         0139  TPLYR1   LDX      7
007F  00FE  001001010         0140           TCY      2
007F  00FD  001100101         0141           TCMIY    10       EXPGO=10
007D  00FA  001001010         0142           TCY      5
007B  00F6  001100101         0143           TCMIY    2        SNPLYR=0,TPLYR=1,SNPF=0
0077  00EF  010000111         0144           BL       BEEP
006F  00DE  100101010  1928   0145
005F  00BE  001001110         0146  EXCH     TCY      7
003E  00FC  010010000         0147  EXA      LDX      0
007C  00F9  000101001         0148           TMA
0079  00F2  010010110         0149           LDX      6
0073  00E6  000000011         0150           XMA
0067  00CE  010010000         0151           LDX      0
004F  009E  000101100         0152           TAMDYN
001F  00BC  100111110  0147   0153           BRANCH   EXA
003D  00FB  001001110         0154           TCY      7
007A  00F5  010011000         0155  EXB      LDX      1
0075  00EA  000101001         0156           TMA
006B  00D6  010010110         0157           LDX      6
0057  00AE  011111110         0158           YMCY     7
002E  00DC  000000011         0159           XMA
005C  00B9  010011000         0160           LDX      1
003B  00F0  011111110         0161           YMCY     7
0070  00E1  000101100         0162           TAMDYN
0061  00C2  101111010  0155   0163           BRANCH   EXB
0043  0086  010111111         0164           RETN
0006  008C  010011110         0165  CLUF     LDX      7
000D  009B  001001100         0166           TCY      3
001B  00B7  000100011         0167           TBIT     3        CLUF
0037  00EF  101011101  0170   0168           BRANCH   REIGT
006F  00DD  100001111  0137   0169           BRANCH   DEND
005D  00BA  010011110         0170  REIGT    LDX      7
003A  00F4  001000011         0171           TCY      12
0074  00E9  000101001         0172           TMA
0069  00D2  010010001         0173           LDX      8        REG8=X
0053  00A6  001001111         0174           TCY      15
0026  00CC  000101100         0175  REIGTA   TAMDYN
004C  0099  100100110  0175   0176           BRANCH   REIGTA
0018  00B0  010111111         0177           RETN
0031  00E3  001001110         0178  CLU7     TCY      7
0062  00C5  010011110         0179           LDX      7
0045  008A  000101001         0180           TMA
000A  0094  011100100         0181           ALEC     2
0015  00AB  100100100  0219   0182           BRANCH   ZERO
002B  00D7  001000000         0183           TCY      0        FIND FIRST +ON DISPLAY
0056  00AD  010010000         0184  CLUA     LDX      0
002C  00DA  000110011         0185           MNEZ
0058  00B1  100000101  0191   0186           BRANCH   CLUB     MSB=1
0030  00E0  000000101         0187  CLUC     IYC
0060  00C1  001011110         0188           YNEC     7
0041  0082  101010010  0184   0189           BRANCH   CLUA
0002  0084  100001111  0137   0190           BRANCH   DEND
0005  008B  010011000         0191  CLUB     LDX      1
0008  0097  000000110         0192           CLA
0017  00AF  001110011         0193           ACACC    12
002F  00DF  000001001         0194           MNEA
005F  00BD  100010100  0187   0195           BRANCH   CLUC     +=+
003C  00FB  010000001         0196           CALLL    X        =+,PUT LETTER ON DISPLAY
007B  00F1  110110010  1110   0197
0071  00E2  000101001         0198           TMA
0063  00C6  010010000         0199           LDX      0
0047  008F  000101111         0200           TAM
000E  009C  010000001         0201           CALLL    X
001D  00BB  110110010  1110   0202
003B  00F7  011110001         0203           YMCY     8
0076  00ED  000101001         0204           TMA
006D  00DA  010011000         0205           LDX      1
005B  00B6  011110110         0206           YMCY     6
0036  00EC  000101111         0207           TAM
006C  00D9  001001110         0208           TCY      7
0059  00B2  110100101  0214   0209           CALL     J1
0032  00E4  110100101  0214   0210           CALL     J1       SHOW EXGES ON DISPLAY
0064  00C9  010011000         0211           LDX      1
0049  0092  000101111         0212           TAM
0012  00A4  001000000         0213           TCY      0
0025  00CB  010011110  0214   0214  J1       LDX      7
004A  0095  000000111         0215           DMAN
0014  00AB  000101111         0216           TAM               NL=1
0029  0003  010111111         0217           RETN
```

| | | | | | | | | |
|---|---|---|---|---|---|---|---|---|
| 0052 | 00A5 | 100000100 | 0224 | 0218 | | BRANCH | FOUND | |
| 0024 | 00CA | 010011000 | | 0219 | ZERO | LDX | 1 | |
| 004B | 0091 | 001100000 | | 0220 | | TCMIY | 0 | EXGES ON DISPLAY |
| 0010 | 00AC | 010011110 | | 0221 | | LDX | 7 | |
| 0021 | 00C3 | 001001110 | | 0222 | | TCY | 7 | |
| 0042 | 00B5 | 001100000 | | 0223 | | TCMIY | 0 | EXGES=0 |
| 0004 | 008B | 010011110 | | 0224 | FOUND | LDX | 7 | |
| 0009 | 0093 | 001000000 | | 0225 | | TCY | 0 | |
| 0013 | 00A7 | 000110011 | | 0226 | | MNEZ | | |
| 0027 | 00CF | 101100101 | 0232 | 0227 | | BRANCH | DAD | NL≠0 |
| 004F | 009D | 001001110 | | 0228 | | TCY | 7 | |
| 001C | 008B | 000110011 | | 0229 | | MNEZ | | |
| 0039 | 00F3 | 100110100 | 0237 | 0230 | | BRANCH | DOO | NL=0,EXGES≠0 |
| 0072 | 00F5 | 100101101 | 0235 | 0231 | | BRANCH | DO1 | |
| 0065 | 00CA | 001001110 | | 0232 | DAD | TCY | 7 | |
| 004B | 0096 | 000110011 | | 0233 | | MNEZ | | |
| 0016 | 00AC | 100001111 | 0137 | 0234 | | BRANCH | DEND | NL≠0,EXPGES≠0 |
| 0020 | 00DB | 010001101 | | 0235 | DO1 | BL | DO | |
| 0054 | 00B5 | 100000000 | 1419 | 0236 | | | | |
| 0034 | 00EB | 010001101 | | 0237 | DOO | BL | REWARD | REWARD SOUND |
| 006B | 00D1 | 101101010 | 1539 | 0238 | | | | |
| 0051 | 00A2 | 000010101 | | 0239 | ADD | AMAAC | | |
| 0022 | 00C4 | 100010001 | 0243 | 0240 | | BRANCH | ADB | |
| 0044 | 00A9 | 011101001 | | 0241 | | ALEC | 9 | |
| 000B | 0090 | 101100110 | 0249 | 0242 | | BRANCH | ADDBB | |
| 0011 | 00A3 | 001110110 | | 0243 | ADB | ACACC | 6 | |
| 0023 | 00C7 | 000101100 | | 0244 | | TAMDYN | | |
| 0046 | 00BD | 000000110 | | 0245 | | CLA | | |
| 000C | 009A | 001111000 | | 0246 | | ACACC | 1 | |
| 0019 | 00B3 | 010011110 | | 0247 | | LDX | 7 | |
| 0033 | 00E7 | 101010001 | 0239 | 0248 | | BRANCH | ADD | |
| 0066 | 00CD | 000101111 | | 0249 | ADDBB | TAM | RETN | |
| 0040 | 0094 | 010111111 | | 0250 | | RETN | | |
| 001A | 00B4 | 001000001 | | 0251 | WASTE | TCY | 8 | |
| 0035 | 00EB | 010010110 | | 0252 | WASTEE | LDX | 6 | |
| 006A | 00D5 | 000000100 | | 0253 | | DYN | | |
| 0055 | 00AA | 100110101 | 0252 | 0254 | | BRANCH | WASTEE | |
| 002A | 00D4 | 010111111 | | 0255 | | RETN | | |
| 0054 | 00A9 | 001000011 | | 0256 | LVLLVL1 | TCY | 6 | |
| 0028 | 00D0 | 010001011 | | 0257 | | LDP | 13 | |
| 0050 | 00A1 | 000100011 | | 0258 | | TBIT | 3 | |
| 0020 | 00C0 | 101111110 | 1685 | 0259 | | BRANCH | LVLLVL | |
| 0040 | 0081 | 100000110 | 1709 | 0260 | | BRANCH | DISP/KB | |

TABLE 1-2

| | | | | | | | | |
|---|---|---|---|---|---|---|---|---|
| | | | | 0261 | | ORGPG | 2 | |
| 0000 | 0100 | 001000011 | | 0262 | MWGOUS | TCY | 12 | |
| 0001 | 0103 | 000101001 | | 0263 | | TMA | | |
| 0003 | 0107 | 011101000 | | 0264 | | ALEC | 1 | |
| 0007 | 010F | 100010111 | 0322 | 0265 | | BRANCH | AXX | X=1 |
| 000F | 011F | 001000100 | | 0266 | HAMM | TCY | 2 | |
| 001F | 013F | 000000111 | | 0267 | | DMAN | | |
| 003F | 017F | 001001101 | | 0268 | | TAMIYC | | EXPGO=1 |
| 007F | 017F | 001001100 | | 0269 | | TCY | 3 | |
| 007E | 017D | 010100011 | | 0270 | | SBIT | 3 | CLUF=1 |
| 007D | 017A | 001001010 | | 0271 | | TCY | 5 | |
| 007B | 0176 | 010100100 | | 0272 | | RBIT | 0 | SNPF=0 |
| 0077 | 016F | 001001110 | | 0273 | | TCY | 7 | |
| 006F | 015F | 001100001 | | 0274 | | TCMIY | 8 | |
| 005F | 013E | 010001111 | | 0275 | | CALLL | BLNK | |
| 003F | 017C | 110000000 | 1935 | 0276 | | | | |
| 007C | 0179 | 010001000 | | 0277 | | CALLL | RFTGT | |
| 0079 | 0172 | 111011101 | 0170 | 0278 | | | | |
| 0073 | 0166 | 010000001 | | 0279 | | CALLL | X | |
| 0067 | 014F | 110110010 | 1110 | 0280 | | | | |
| 004F | 011F | 001000001 | | 0281 | | TCY | 8 | |
| 001F | 013C | 000101001 | | 0282 | | TMA | | |
| 0030 | 017B | 010011110 | | 0283 | | LDX | 7 | |
| 007A | 0175 | 001000000 | | 0284 | | TCY | 0 | |
| 0075 | 016A | 000101110 | | 0285 | | TAMZA | | |
| 006B | 0156 | 000101010 | | 0286 | | TMY | | |
| 0057 | 012F | 000000100 | | 0287 | | DYN | | |
| 002F | 015C | 001110011 | | 0288 | | ACACC | 12 | |
| 005C | 0139 | 010011000 | | 0289 | | LDX | 1 | |
| 003B | 0170 | 000101100 | | 0290 | XX | TAMDYN | | |
| 0070 | 0161 | 100111000 | 0290 | 0291 | | BRANCH | XX | |
| 0061 | 0142 | 001001110 | | 0292 | | TCY | 7 | '7'ON DISPLAY |
| 0043 | 0106 | 001100001 | | 0293 | | TCMIY | 8 | |
| 0006 | 010C | 001001110 | | 0294 | | TCY | 7 | |
| 000D | 011B | 010010000 | | 0295 | | LDX | 0 | |
| 001B | 0137 | 001100100 | | 0296 | | TCMIY | 2 | |
| 0037 | 016F | 010011110 | | 0297 | | LDX | 7 | |
| 006E | 015D | 001001101 | | 0298 | | TCY | 11 | START TIMER |
| 005D | 013A | 010100011 | | 0299 | | SBIT | 0 | TIMER=1 |
| 003A | 0174 | 010001011 | | 0300 | | CALLL | LTN | INTIAL TIMEOUT |
| 0074 | 0169 | 110111010 | 1715 | 0301 | | | | |
| 0069 | 0152 | 010011110 | | 0302 | | LDX | 7 | |
| 0053 | 0126 | 001001000 | | 0303 | | TCY | 1 | |
| 0026 | 014C | 000101001 | | 0304 | | TMA | | LVL |
| 004C | 0119 | 010011000 | | 0305 | | LDX | 1 | |
| 0018 | 0130 | 001000001 | | 0306 | | TCY | 8 | SCORE |

```
0031  0163  011100100         0307           ALEC    2         CHECK LVL,INTIALIZE SCOER
0062  0145  101010110  0313   0308           BRANCH  INIT2
0045  0104  001100100         0309           TCMIY   2
000A  0114  001100000         0310           TCMIY   0
0015  012B  001100000         0311           TCMIY   0
002B  0157  100000101  0320   0312           BRANCH  AX
0056  0120  001101000         0313   INIT2   TCMIY   1         LVL=1
002C  0158  001100100         0314           TCMIY   .2
005B  0131  001100000         0315           TCMIY   0
0030  0160  011101000         0316           ALEC    1
0060  0141  100000101  0320   0317           BRANCH  AX
0041  0102  001001001         0318           TCY     9         LVL=2
0002  0104  001101010         0319           TCMIY   5
0005  010B  010001011         0320   AX      BL      DISP/KB
000B  0117  100000110  1709   0321
0017  012F  001000110         0322   AXX     TCY     6
002F  015F  001100000         0323           TCMIY   0
005E  0130  100000101  0320   0324           BRANCH  AX        X<=1
003C  017A  000101001         0325   WHERE   TMA
007B  0171  010010001         0326           LDX     8
0071  0162  000101111         0327           TAM
0063  0146  001001011         0328           TCY     13
0047  010F  000101111         0329           TAM
000E  011C  001001010         0330           TCY     5
0010  013B  010100100         0331           RBIT    0         ADDFLAG=0
003B  0177  001000110         0332   NOWADD  TCY     6         ADD M(8,7-11)+M(8,13-15)
0076  016D  001101010         0333           TCMIY   7
006D  015A  001001011         0334           TCY     13
005B  0136  000101001         0335           TMA
0036  016C  001000110         0336   LOOPA   TCY     6
006C  0159  000101010         0337           TMY
0059  0132  010000110         0338           LDP     6
0032  0164  000010101         0339           AMAAC
0064  0149  110111110  0790   0340           CALL    CARRY
0049  0112  010000100         0341           LDP     2
0012  0124  000101111         0342           TAM
0025  014B  001000110         0343           TCY     6
0044  0115  000110110         0344           IMAC
0014  012B  011101001         0345           ALEC    9
0029  0153  100100100  0348   0346           BRANCH  NOW
0052  0125  100000100  0353   0347           BRANCH  OUTLOOP
0024  014B  000101111         0348   NOW     TAM
004B  0111  000101000         0349           TAY
0010  0120  011111010         0350           YMCY    5
0021  0143  000101001         0351           TMA
0042  0105  100110110  0336   0352           BRANCH  LOOPA
0004  0108  001001010         0353   OUTLOOP TCY     5
0009  0113  010000010         0354           LDP     4
0013  0127  000100000         0355           TBIT    0
0027  014F  100001001  0612   0356           BRANCH  WHAT
004F  0110  010011110         0357           LDX     7
001C  013B  001001000         0358           TCY     1
0039  0173  000101001         0359           TMA
0072  0165  011101000         0360           ALEC    1
0065  014A  100001001  0612   0361           BRANCH  WHAT
004A  0116  010000100         0362           LDP     2
0016  012C  010010001         0363           LDX     8
002D  015B  001001010         0364           TCY     5
005A  0135  010100000         0365           SBIT    0
0034  016B  001001011         0366           TCY     13
006B  0151  011100100         0367           ALEC    2
0051  0122  100100011  0373   0368           BRANCH  L2
0022  0144  001100001         0369           TCMIY   0
0044  0109  001100001         0370           TCMIY   8
0008  0110  001100100         0371           TCMIY   2
0011  0123  100111011  0332   0372           BRANCH  NOWADD
0023  0147  001100000         0373   L2      TCMIY   0
0046  010D  001100010         0374           TCMIY   4
000C  011B  001101000         0375           TCMIY   1
0019  0133  100111011  0332   0376           BRANCH  NOWADD
0033  0167  001000010         0377   RANDB   TCY     4
0066  014D  000001101         0378           SETR              SET R4
004D  011A  001000110         0379           TCY     6
001A  0134  000001101         0380           SETR              SET
0035  016B  001000011         0381           TCY     12
006A  0155  000001101         0382           SETR              SET R12
0055  012A  001000011         0383           TCY     12        WAIT
002A  0154  000110110         0384           RSTR              RESET R12
0054  0129  001000110         0385           TCY     6
002A  0150  000110110         0386           RSTR              RESET R6
0050  0121  001000010         0387           TCY     4
0020  0140  000110110         0388           RSTR              RESET R4
0040  0101  010111111         0389           RETN
```

TABLE 1-3

```
                                0390           ORGPG   3
0000  0180  010011110         0391   REPLAY  LDX     7
0001  0183  001001100         0392           TCY     3
0003  0187  000100000         0393           TBIT    0
0007  018F  100011011  0425   0394           BRANCH  REPLAY1
000F  019F  101001011  0491   0395           BRANCH  YEND
001F  01BF  001101000         0396   GO1     TCMIY   1         GO=1,GOF=0,USRF=0,LVLF=0
```

```
003F  01FF  001001100        0397              TCY     3
007F  01FF  010100110        0398              RBIT    1              SCORE=0
007E  01FD  001000010        0399              TCY     4
007D  01FA  000100000        0400              TBIT    0
007B  01F6  100100010  0498  0401              BRANCH  MWGO           MW=1
0077  01FF  001000000        0402  CLGO        TCY     0
006F  01DF  001101000        0403              TCMIY   1              NL=1
005F  01BE  010011100        0404  NUMX        LDX     3
003E  01FC  001000000        0405              TCY     0
007C  01F9  001101111        0406              TCMIY   15             NUM=15
0079  01F2  010111111        0407              RETN
0073  01E6  001100000        0408              TCMIY   0              LST=0
0067  01CF  010011110        0409  LIMIT       LDX     7
004F  019F  001001000        0410              TCY     1
001E  01BC  000110010        0411              IMAC
003D  01FB  001001011        0412              TCY     13
007A  01F5  010010001        0413              LDX     8
0075  01EA  000101111        0414              TAM                    LIMIT=LVL+1
006B  01D6  010111111        0415              RETN
0057  01AE  010001110        0416              CALLL   GETN
002E  01DC  110110000  095A  0417
005C  01B9  010001110        0418              CALLL   RAMDOM
003B  01F0  110101111        0419
007D  01F1  010000010        0420              CALLL   GETGET         GENERATE A RAMDOM IN LST POSITION
0061  01C2  110001110  058B  0421
0043  01B6  001001100        0422              TCY     3
0006  018C  010011100        0423              LDX     3
000D  019B  010100100        0424              RBIT    0              RIGHT=0
001A  01B7  111011111  0404  0425  REPLAY1     CALL    NUMX
0037  01EF  010001111        0426  LINBB       CALLL   BLNK
006F  01DD  110000000  1935  0427
005D  01BA  010001011        0428              CALLL   LTN
003A  01F4  110111010  1715  0429
0074  01E9  010000111        0430              CALLL   DELAY
0069  01D2  110010001  1916  0431
0053  01A6  001000000        0432  Q1          TCY     0
0026  01CC  010011100        0433              LDX     3
004C  0199  000110010        0434              IMAC
0018  01B0  000101111        0435              TAM                    MUN=NUM+1
0031  01F3  010111111        0436              RETN
0062  01C5  000101010        0437              TMY
0045  01BA  010010100        0438              LDX     2
000A  0194  010000010        0439              CALLL   MOVE
0015  01A8  111100111  053B  0440
0028  01D7  000101011        0441              TYA
0056  01AD  001000010        0442              TCY     4
002C  01DB  010011100        0443              LDX     3
0058  01B1  010100000        0444              SBIT    0
0030  01E0  010000000        0445              BL      TUNE
0060  01C1  101001010  008B  0446
0041  01B2  010001011        0447  ODORRR      CALLL   LTN
0002  01B4  110111010  1715  0448
0005  01B8  010000111        0449              CALLL   DELAY
000B  0197  110010001  1916  0450
0017  01AF  010011100        0451              LDX     3
002F  01DF  001001000        0452              TCY     1
005E  01BD  000101001        0453              TMA
003C  01FB  001000000        0454              TCY     0
007A  01F1  000001001        0455              MNEA
0071  01E2  100110111  0426  0456              BRANCH  LINBB          NUM=LSB
0063  01C6  001101111        0457              TCMIY   15             NUM=15
0047  01BE  010001111        0458  SHOULTN     CALLL   BLNK
000E  019C  110000000  1935  0459
0010  01BB  010010000        0460  SHOU        LDX     0
003A  01F7  001000110        0461              TCY     6
0076  01ED  001100100        0462              TCMIY   2
006D  01DA  001100100        0463              TCMIY   2
005B  01B6  010011000        0464              LDX     1
0036  01EC  001000110        0465              TCY     6
006C  01D9  001101000        0466              TCMIY   1
0059  01B2  001100110        0467              TCMIY   6
0032  01E4  001001100        0468              TCY     3
0064  01C9  010011100        0469              LDX     3
0049  0192  000100000        0470              TBIT    0              RIGHT?
0012  01A4  101001011  0491  0471              BRANCH  YEND
0025  01CA  001001000        0472  YNEXT       TCY     1
004A  0195  010011100        0473              LDX     3
0014  01AB  000101001        0474              TMA
0029  01D3  011101001        0475              ALEC    9
0052  01A5  100010000  0479  0476              BRANCH  YE
0024  01CA  001110110        0477              ACACC   6
004B  0191  100100111  0485  0478              BRANCH  YF
0010  01A0  010010000        0479  YE          LDX     0
0021  01C3  001000100        0480              TCY     6              PUT BLNK IN MSB
0042  01B5  001101000        0481              TCMIY   1
0004  018B  010011000        0482              LDX     1
0009  0193  001000110        0483              TCY     6
0013  01A7  001101101        0484              TCMIY   11
0027  01CF  010011000        0485  YF          LDX     1              PUT SCORE IN LSB
004F  0190  001001110        0486              TCY     7
001C  01BB  000101111        0487              TAM
0039  01F3  010010000        0488              LDX     0
0072  01E5  001100100        0489              TCMIY   2
0065  01CA  010111111        0490              RETN
```

```
004B  0196  010001011          0491  YEND         BL         DISP/KB
0016  01AC  100000110   1709   0492                                        
002D  01DB  010011110          0493  GO           LDX        7
005A  01B5  001000110          0494               TCY        6
0034  01EA  000100010          0495               TBIT       1            GUF=1?
006B  01D1  100011111   0396   0496               BRANCH     GO1
0051  01A2  101001011   0491   0497               BRANCH     YEND
0022  01C4  010000100          0498  MWGO         LDP        2
0044  01B9  000100010          0499               TBIT       1
000B  0190  100000000   0262   0500               BRANCH     MWGOIIS      USENT=1
0011  01A3  010011000          0501  HAM          LDX        1
0023  01C7  001001111          0502               TCY        15
0046  01BD  000101001          0503               TMA
000C  019B  010000000          0504               CALLL      LOAD
0019  01B3  111010010   0089   0505
0033  01E7  001000001          0506               TCY        8
0066  01C0  000101101          0507               TAMIYC
0040  0194  001100000          0508               TCMIY      0
001A  01B4  001000111          0509               TCY        14
0035  01EB  000101101          0510               TAMIYC
006A  01D5  001100000          0511               TCMIY      0
0055  01AA  010010010          0512               LDX        0
002A  01D4  001001110          0513               TCY        7
0054  01A9  010000100          0514               BL         WHERE
002B  01DD  100111100   0325   0515
0050  01A1  001100110          0516  MMAH         TCMIY      6
0020  01C0  010000100          0517               BL         HAMM
0040  0181  100001111   0266   0518

TABLE 1-4

0519               ORGPG      4
0000  0200  010010000          0520  CLAL         LDX        0            SEE IF IT IS ONE OF A,B,C,D,E
0001  0203  001001111          0521               TCY        15
0003  0207  000110011          0522               MNEZ
0007  020F  101111110   0528   0523  XEND         BRANCH     XENDX
000F  021F  001000111          0524               TCY        14
001F  023F  000101001          0525               TMA
003F  027F  011100010          0526               ALEC       4
007F  027F  101111011   0530   0527               BRANCH     ONN
007E  027D  010001011          0528  XENDX        BL         DISP/KB
007D  027A  100000110   1709   0529
007B  0276  010001100          0530  ONN          CALLL      G1           NUM+1
0077  026F  111010011   0432   0531               CALLL      BLNK
006F  025E  010001111          0532
005F  023E  110000000   1935   0533
003F  027C  010001110          0534               CALLL      GETR
007C  0279  110110000   0958   0535
0079  0272  010010000          0536               LDX        0            PUT CODE FROM M(0,14) TO DISPLAY
0073  0266  001000111          0537               TCY        14
0067  024E  000101001          0538  MOVE         TMA                     PUT CODE IN MEMORY
004F  021F  000101010          0539               TMY                     TO DISPLAY RIGHT POSITION
001E  023C  010011000          0540               LDX        1
003D  027B  000101110          0541               TAMZA
007A  0275  010010000          0542               LDX        0
0075  0264  000101111          0543               TAM
006B  0256  101011111          0544               RETN
0057  022E  041000111          0545               TCY        14           RIGHT CODE?
002F  025C  000101001          0546               TMA
005C  0239  010011100          0547               LDX        3
0038  0270  001000000          0548               TCY        0
0070  0261  000101010          0549               TMY
0061  0242  010010100          0550               LDX        2
0043  0205  000001001          0551               MNEA
0006  020C  101010010   0605   0552               BRANCH     LEEBB        WRONG
0000  0218  010011100          0553               LDX        3
001B  0237  001000010          0554               TCY        4
0037  026F  010100100          0555               RBIT       0
006F  025D  010000000          0556               BL         TUNE
005D  023A  101001010   0086   0557
003A  0274  010011100          0558  DOORR        LDX        3            COME BACK FROM TUNE
0074  0269  001001000          0559               TCY        1
0069  0252  000101001          0560               TMA
0053  0226  001000000          0561               TCY        0
0026  024C  000001001          0562               MNEA
004C  0219  101111110   0528   0563               BRANCH     XENDX        NUMT=LST
0018  0230  001001000          0564               TCY        1
0031  0263  000101010          0565               TMY
0062  0245  001011111          0566               YNEC       15           LST1=15?
0045  020A  100000101   0578   0567               BRANCH     LEEAA        YES
0004  0214  001001100          0568               TCY        3            NO
0015  0228  010100000          0569               SBIT       0            SET RIGHT FLAG
002A  0257  010011100          0570  NLO          LDX        7
0056  022D  001000000          0571               TCY        0
002C  025B  001100000          0572               TCMIY      0            NL=0
005B  0231  010111111          0573               RETN
0030  0260  001001100          0574  T            TCY        3
0060  0241  010100000          0575               SBIT       0            RPLYF=1
0041  0202  010001101          0576               BL         REWARD
0002  0204  101101010   1539   0577
0005  020B  001001000          0578  LEEAA        TCY        1
000B  0217  000110010          0579               IMAC
0017  022F  000101100          0580               TAMDYN
002F  025F  001101111          0581               TCMIY      15           NUM=15
```

| | | | | | | | |
|---|---|---|---|---|---|---|---|
| 005F | 023D | 010001100 | | 0582 | | CALLL | LIMIT | LIMIT=LVL+1 |
| 003C | 027B | 111100111 | 0409 | 0583 | | | | |
| 007B | 0271 | 010001110 | | 0584 | | CALLL | GETR | |
| 0071 | 0262 | 110110000 | 0958 | 0585 | | | | |
| 0063 | 0246 | 010001110 | | 0586 | | CALLL | RAMDOM | |
| 0047 | 020F | 110101111 | 0965 | 0587 | | | | |
| 000E | 021C | 010010001 | | 0588 | GETGET | LDX | 8 | PUT RAMDOM ON LST POSITION |
| 001D | 023B | 001001111 | | 0589 | | TCY | 15 | |
| 003B | 0277 | 000101001 | | 0590 | | TMA | | |
| 0076 | 026D | 010011100 | | 0591 | | LDX | 3 | |
| 006D | 0254 | 001001000 | | 0592 | | TCY | 1 | |
| 005B | 0256 | 000101010 | | 0593 | | TMY | | |
| 0036 | 026C | 010010100 | | 0594 | | LDX | 2 | |
| 006C | 0259 | 000101111 | | 0595 | | TAM | | |
| 0059 | 0232 | 010111111 | | 0596 | | RETN | | |
| 0032 | 0264 | 010001111 | | 0597 | | CALLL | BLNK | |
| 0064 | 0249 | 110000000 | 1935 | 0598 | | | | |
| 0049 | 0212 | 010001011 | | 0599 | | CALLL | LIN | |
| 0012 | 0224 | 110111010 | 1715 | 0600 | | | | |
| 0025 | 024B | 010000111 | | 0601 | | CALLL | DELAY | |
| 004A | 0215 | 110010001 | 1916 | 0602 | | | | |
| 0014 | 022A | 010001100 | | 0603 | | BL | REPLAY1 | |
| 0029 | 0253 | 100011011 | 0425 | 0604 | | | | |
| 0052 | 0225 | 110101011 | 0570 | 0605 | LFERH | CALL | NLD | |
| 0024 | 024A | 001001100 | | 0606 | | TCY | 3 | |
| 0048 | 0211 | 010100000 | | 0607 | | SBIT | 0 | P RPLYF=1 |
| 0010 | 0220 | 010001100 | | 0608 | | CALLL | SHOW | |
| 0021 | 0243 | 110011101 | 0460 | 0609 | | | | |
| 0042 | 0205 | 010001010 | | 0610 | | BL | PENALTY | |
| 0004 | 020A | 100011010 | 0767 | 0611 | | | | |
| 0009 | 0213 | 010010001 | | 0612 | WHAT | LDX | 8 | |
| 0013 | 0227 | 001000010 | | 0613 | | TCY | 4 | |
| 0027 | 024F | 001100000 | | 0614 | | TCMIY | 0 | FLAG |
| 004E | 021D | 010000110 | | 0615 | GODWORD | CALLL | LOADADD | |
| 001C | 023B | 111000010 | 0866 | 0616 | | | | |
| 0039 | 0273 | 010000100 | | 0617 | | CALLL | RANDB | |
| 0072 | 0265 | 110110011 | 0377 | 0618 | | | | |
| 0065 | 024A | 010001000 | | 0619 | | CALLL | WASTE | |
| 004A | 0216 | 110011010 | 0251 | 0620 | | | | |
| 0016 | 022C | 010000101 | | 0621 | | CALLL | BLNK6 | |
| 002D | 025A | 110111010 | 1329 | 0622 | | | | |
| 005A | 0235 | 001000001 | | 0623 | | TCY | 8 | Y PIR=99 |
| 0034 | 026B | 001101001 | | 0624 | | TCMIY | 9 | START WITH THE LSD OF FIRST LETTER |
| 006B | 0251 | 010001111 | | 0625 | LOOP | CALLL | READ | |
| 0051 | 0222 | 110011110 | 1955 | 0626 | | | | |
| 0022 | 0244 | 001000001 | | 0627 | | TCY | 8 | |
| 0044 | 0209 | 000101010 | | 0628 | | TMY | | |
| 0008 | 0210 | 000101111 | | 0629 | | TAM | | LSD |
| 0011 | 0223 | 010001111 | | 0630 | | CALLL | READ | |
| 0023 | 0247 | 110011110 | 1955 | 0631 | | | | |
| 0046 | 020D | 001000001 | | 0632 | | TCY | 8 | |
| 000C | 021A | 000101010 | | 0633 | | TMY | | |
| 0019 | 0233 | 011110110 | | 0634 | | YMCY | 6 | |
| 0033 | 0267 | 000101111 | | 0635 | | TAM | | MSD |
| 0066 | 024D | 011101110 | | 0636 | | ALEC | 7 | END OF WORD? |
| 004D | 021A | 100110101 | 0639 | 0637 | | BRANCH | BAD | NO |
| 0014 | 0234 | 100101000 | 0644 | 0638 | | BRANCH | GOOD | |
| 0035 | 026B | 011111001 | | 0639 | BAD | YMCY | 9 | |
| 006A | 0255 | 000101011 | | 0640 | | TYA | | |
| 0055 | 022A | 001000001 | | 0641 | | TCY | 8 | |
| 002A | 0254 | 000101111 | | 0642 | | TAM | | |
| 0054 | 0229 | 101101000 | 0625 | 0643 | | BRANCH | LOOP | |
| 002B | 0250 | 010100111 | | 0644 | GOOD | RBIT | 3 | RESET THE ENDING HIT |
| 0050 | 0221 | 011110000 | | 0645 | | YMCY | 0 | Y+1 |
| 0020 | 0240 | 010001110 | | 0646 | | BL | LOADXX | |
| 0040 | 0201 | 100001000 | 1013 | 0647 | | | | |

TABLE 1-5

| | | | | | | | |
|---|---|---|---|---|---|---|---|
| | | | | 0648 | | ORGPG | 5 | |
| 0000 | 02B0 | 010011010 | | 0649 | GGTS | LDX | 5 | |
| 0001 | 02B3 | 001100000 | | 0650 | | TCMIY | 0 | |
| 0003 | 02A7 | 001000100 | | 0651 | COMPARE1 | TCY | 2 | |
| 0007 | 02BF | 000101001 | | 0652 | | TMA | | |
| 000F | 029F | 001000000 | | 0653 | | TCY | 0 | |
| 001F | 02BF | 000001001 | | 0654 | | MNEA | | |
| 003F | 02FF | 101111001 | 0665 | 0655 | | BRANCH | NE | |
| 007F | 02FF | 001001100 | | 0656 | | TCY | 3 | |
| 007E | 02FD | 000101001 | | 0657 | | TMA | | |
| 007D | 02FA | 001001000 | | 0658 | | TCY | 1 | |
| 007B | 02F4 | 000001001 | | 0659 | | MNEA | | |
| 0077 | 02FF | 101111001 | 0665 | 0660 | | BRANCH | NE | |
| 006F | 02DE | 001000010 | | 0661 | | TCY | 4 | |
| 005F | 02BF | 000100000 | | 0662 | | TBIT | 0 | |
| 003E | 02FC | 100100101 | 0730 | 0663 | | BRANCH | GEQB | |
| 007C | 02F9 | 100011010 | 0767 | 0664 | | BRANCH | PENALTY | |
| 0079 | 02F2 | 000000001 | | 0665 | NE | ALEH | | |
| 0073 | 02E6 | 100001101 | 0682 | 0666 | | BRANCH | LT | |
| 0067 | 02CE | 001000010 | | 0667 | GT | TCY | 4 | |
| 004F | 029E | 000100000 | | 0668 | | TBIT | 0 | |
| 001F | 02BC | 100000000 | 0649 | 0669 | | BRANCH | GGTS | |
| 003D | 02FA | 000100010 | | 0670 | | TBIT | 1 | |
| 007A | 02F5 | 101010011 | 0690 | 0671 | | BRANCH | GGTL | |
| 0075 | 02EA | 001000000 | | 0672 | UGTG | TCY | 0 | |

| | | | | | | | |
|---|---|---|---|---|---|---|---|
|006B|02D6|000101001| |0673| |TMA| |
|0057|02AE|001000100| |0674| |TCY|2|
|002E|02DC|000101111| |0675| |TAM| |
|005C|02B9|001001000| |0676| |TCY|1|
|003B|02F0|000101001| |0677| |TMA| |
|0070|02E1|001001100| |0678| |TCY|3|
|0061|02C2|000101111| |0679| |TAM| |
|0043|02B6|010000011| |0680|SHOW|BL|.SREWARD|
|0006|02BC|101101010|1668|0681| | | |
|0000|0298|001000010| |0682|LT|TCY|4|
|001B|02B7|000100000| |0683| |TBIT|0|
|0037|02EF|101011101|0686|0684| |BRANCH|GLTB|
|006F|02DD|100011010|0767|0685| |BRANCH|PENALTY|
|005D|02BA|010011100| |0686|GLTB|LDX|3|
|003A|02F4|001000010| |0687| |TCY|4|
|0074|02E9|001100100| |0688| |TCMIY|2|
|0069|02D2|100000011| |0689| |BRANCH|COMPARE1  COMPARE LOWER,GUESS|
|0053|02A6|010011100| |0690|GGTL|LDX|3        LOWER=GUESS|
|0026|02CC|001000100| |0691| |TCY|2|
|004C|0299|000101001| |0692| |TMA| |
|0018|02B0|001000000| |0693| |TCY|0|
|0031|02E3|000101111| |0694| |TAM| |
|0062|02C5|001001100| |0695| |TCY|3|
|0045|02BA|000101001| |0696| |TMA| |
|000A|0294|001001000| |0697| |TCY|1|
|0015|02AB|000101111| |0698| |TAM| |
|002B|02D7|101000001| |0699| |BRANCH|SHOW|
|0056|02AD|010010000| |0700|SHOWW|LDX|0        PUT ( ) ON DISPLAY|
|002C|02DA|001001100| |0701| |TCY|3|
|0058|02B1|001101000| |0702| |TCMIY|1|
|0030|02E0|010011000| |0703| |LDX|1|
|0060|02C1|001001100| |0704| |TCY|3|
|0041|02B2|001100111| |0705| |TCMIY|14|
|0002|02B4|010011100| |0706|BOUND|LDX|3|
|0005|02B8|001000000| |0707| |TCY|0        PUT LOWER BOUND ON DISPLAY|
|000B|0297|000101001| |0708| |TMA| |
|0017|02AF|010010000| |0709| |LDX|0|
|002F|02DF|001001000| |0710| |TCY|1|
|005E|02BD|000101111| |0711| |TAM| |
|003C|02FB|010011100| |0712| |LDX|3|
|0078|02F1|000101001| |0713| |TMA| |
|0071|02E2|010011000| |0714| |LDX|1|
|0063|02C6|000101111| |0715| |TAM| |
|0047|02BE|010011010| |0716| |LDX|5        PUT UPPER BOUND ON DISPLAY|
|000E|029C|001000100| |0717| |TCY|2|
|001D|02BA|000101001| |0718| |TMA| |
|003B|02F7|001001010| |0719| |TCY|5|
|0076|02F0|010010000| |0720| |LDX|0|
|006D|02DA|000101111| |0721| |TAM| |
|005B|02B6|010011010| |0722| |LDX|5|
|0036|02EC|001001100| |0723| |TCY|3|
|006C|02D9|000101001| |0724| |TMA| |
|0059|02B2|001001010| |0725| |TCY|5|
|0032|02E4|010011000| |0726| |LDX|1|
|0064|02C9|000101111| |0727| |TAM| |
|0049|02D2|010001011| |0728| |BL|DISP/KB|
|0012|02A4|100000110|1709|0729|GEOS|BL|REWARD|
|0025|02CB|010001101| |0730| | | |
|004A|02D5|101101010|1539|0731|START|LDX|0        ERASE UPPER AND LOWER|
|0014|02AB|010010000| |0732| |TCY|1|
|0029|02D3|001001000| |0733| |TCMIY|1|
|0052|02A5|001101000| |0734| |TCY|5|
|0024|02CB|001001010| |0735| |TCMIY|1|
|004B|0291|001101000| |0736| |LDX|1|
|0010|02A0|010011000| |0737| |TCY|1|
|0021|02C3|001001000| |0738| |TCMIY|11|
|0042|02B5|001101101| |0739| |TCY|5|
|0004|02BB|001001010| |0740| |TYA| |
|0009|0293|000101011| |0741| |TCMIY|11|
|0013|02A7|001101101| |0742| |LDX|8|
|0027|02CF|010010001| |0743| |TCY|4|
|004E|02D0|001000010| |0744| |TCMIY|1        RIGHT IN REG6 FOR FLASHING|
|001C|02BA|001101000| |0745| |CALLL|ADDRESS|
|0039|02F3|010000001| |0746| | | |
|0072|02F5|111010111|1058|0747| |TCMIY|6|
|0065|02CA|001100110| |0748| |BL|GOODWORD|
|004B|0296|010000010| |0749| | | |
|0016|02AC|101001110|0615|0750|BIX|CALLL|AFTER    NL=0|
|002D|02DB|010001101| |0751| | | |
|005A|02B5|110111011|1489|0752| |BL|COMEND|
|0034|02EB|010000101| |0753| | | |
|0068|02D1|101000010|1381|0754|JJ|LDP|10|
|0051|02A2|010000101| |0755| |ALEC|2|
|0022|02C4|011100100| |0756|BRANCH| |USEOU|
|0044|02B9|100100011|1402|0757| |CALLL|DISLVL|
|0008|02B0|010001011| |0758| | | |
|0011|02A3|111111001|1693|0759| |CALL|LOADX|
|0023|02C7|010001110| |0760| | | |
|0046|02B0|111000110|1016|0761| |LDP|10|
|000C|029A|010000101| |0762| |ALEC|3|
|0019|02B3|011101100| |0763|BRANCH| |CLG|
|0033|02E7|100011001|1405|0764| |BL|MWG|
|0066|02CD|010001101| |0765| | | |
|0040|02C4|100011001|1533|0766| | | |

```
001A  02B4  010000000         0767  PENALTY   CALL     LOAD
0035  02FB  111010010   0089  0768
006A  0205  001100010         0769            TCMIY    4
0055  02AA  001100011         0770            TCMIY    12
002A  02D4  001000011         0771            TCY      12
0054  02A9  001100010         0772            TCMIY    4
002B  02D0  010000000         0773            LDP      0
0050  02A1  100000000   0004  0774            BRANCH   MUSIC

TABLE 1-6
                                0775            ORGPG    6
0000  0300  000101101         0776  KD3       TAMIYC
0001  0303  000000110         0777            CLA
0003  0307  001111010         0778            ACACC    5
0007  030F  000010101         0779            AMAAC
000F  031F  110111110   0790  0780            CALL     CARRY      COMPUTE CODE ACCORDING TO R-LINE VA
001F  033F  000101111         0781  KD2       TAM
003F  037F  001001011         0782            TCY      13
007F  037E  000000111         0783            DMAN
007E  037D  100000000   0776  0784            BRANCH   KD3
007D  037A  010010000         0785            LDX      0          ADD OFFSET ACCORDING TO K-LIN VALUE
007B  037A  001000011         0786            TCY      12
0077  036E  000101001         0787            TMA
006F  035F  010001111         0788            BL       NEXT
005F  033E  100010111   1995  0789
003E  037C  000101101         0790  CARRY     TAMIYC
007C  0379  000110010         0791            IMAC
0079  0372  100111110   0790  0792            BRANCH   CARRY
0073  0366  010111111         0793            RETN
0067  034E  010010100         0794  LGAL      LDX      2          TRY+1
004F  031E  001000111         0795            TCY      14
001E  033C  000110010         0796            IMAC
003D  037B  011101001         0797            ALEC     9
007A  0375  100101110   0802  0798            BRANCH   LGAA
0075  036A  001110110         0799            ACACC    6
006B  0356  000101101         0800            TAMIYC
0057  032F  000110010         0801            IMAC
002E  035C  000101111         0802  LGAA      TAM
005C  0339  010111111         0803            RETN
003B  0370  001001111         0804  LGDIS     TCY      15
0070  0361  010010100         0805            LDX      2
0061  0342  000110011         0806            MNEZ
0045  0306  100010100   0859  0807            BRANCH   LGA
0006  030C  001000111         0808  LGC       TCY      14
000D  031B  010010100         0809            LDX      2
001B  0337  000101001         0810            TMA
0037  036F  001001110         0811            TCY      7
006E  035D  010011000         0812            LDX      1
005D  033A  000101111         0813            TAM
003A  0374  010010000         0814            LDX      0
0074  0369  001100100         0815            TCMIY    2
0069  0352  001001111         0816  LGB       TCY      15
0053  0326  000101001         0817            TMA
0026  034C  001001100         0818            TCY      3
004C  0319  000101111         0819            TAM
0018  0330  010010100         0820            LDX      2
0031  0363  001000100         0821            TCY      2
0062  0345  000101111         0822            TAM
0045  030A  010011100         0823            LDX      3
000A  0314  000101111         0824            TAM
0015  032B  010011010         0825            LDX      5
002B  0357  001000000         0826            TCY      0
0056  032D  000101111         0827            TAM
002C  035B  010010000         0828            LDX      0
0058  0331  001000111         0829            TCY      14
0030  0360  000101001         0830            TMA
0060  0341  010011000         0831            LDX      1
0041  0302  001001100         0832            TCY      3
0002  0304  000101111         0833            TAM
0005  030B  010010100         0834            LDX      2
000B  0317  001001100         0835            TCY      3
0017  032F  000101111         0836            TAM
002F  035F  010011100         0837            LDX      3
005E  033D  000101111         0838            TAM
003C  037B  010011010         0839            LDX      5
0078  0371  001001000         0840            TCY      1
0071  0362  000101111         0841            TAM
0063  0346  010111111         0842            RETN
0047  030E  010001011         0843            CALLL    LIN
000E  031C  110111010   1715  0844
001D  033B  010000111         0845            CALLL    DELAY
003B  0377  110010001   1916  0846
0076  036D  010010100         0847            LDX      2
006D  035A  001000111         0848            TCY      14
005B  0336  000101010         0849            TMY
0036  036C  010001011         0850            LDP      13
006C  0359  001011010         0851            YNEC     5
0059  0332  101010101   1798  0852            BRANCH   LGBB       TRY+25
0032  0364  001001111         0853            TCY      15
0064  0349  000101010         0854            TMY
0049  0312  001010100         0855            YNEC     2
0012  0324  101010101   1798  0856            BRANCH   LGBB
0025  034B  010001110         0857            BL       LG         TRY+25,START OVER AGAIN
```

| | | | | | | | |
|---|---|---|---|---|---|---|---|
| 004A | 0315 | 100000000 | 0904 | 0858 | | | |
| 0014 | 032A | 000101001 | | 0859 | LGA | TMA | |
| 0029 | 0355 | 001000110 | | 0860 | | TCY | 6 |
| 0052 | 0325 | 010011000 | | 0861 | | LDX | 1 |
| 0024 | 034A | 000101111 | | 0862 | | TAM | |
| 004A | 0311 | 010010000 | | 0863 | | LDX | 0 |
| 0010 | 0320 | 001100100 | | 0864 | | TCMIY | 2 |
| 0021 | 0343 | 100000110 | 0808 | 0865 | | BRANCH | LGC |
| 0042 | 0305 | 001001111 | | 0866 | LOADADD | TCY | 15 |
| 0004 | 0308 | 000001101 | | 0867 | | SETR | |
| 0009 | 0313 | 001000011 | | 0868 | | TCY | 12 |
| 0013 | 0327 | 000001101 | | 0869 | | SETR | | SET R12 |
| 0027 | 034F | 001001101 | | 0870 | | TCY | 11 |
| 004F | 031D | 000001101 | | 0871 | | SETR | | SET R11 |
| 001C | 033A | 010010001 | | 0872 | | LDX | 8 |
| 0059 | 0375 | 001000110 | | 0873 | | TCY | 6 | Y PTR OF DIGIT IN M(8,6) |
| 0072 | 0365 | 001101110 | | 0874 | | TCMIY | 7 | LSD OF ADDRESS |
| 0065 | 034A | 000101001 | | 0875 | ONCEMOR | TMA | | DIGIT OF ADDRESS IN ACC |
| 004A | 0316 | 001000010 | | 0876 | | TCY | 4 |
| 0016 | 032C | 000001101 | | 0877 | | SETR | | SET R4 |
| 002D | 035A | 010010001 | | 0878 | | LDX | 8 | WAIT |
| 005A | 0335 | 000110110 | | 0879 | | RSTR | | RESET R4 |
| 0034 | 036B | 001000110 | | 0880 | | TCY | 6 | WAIT 1 & Y PTR=1 |
| 006B | 0351 | 000110010 | | 0881 | | IMAC | |
| 0051 | 0322 | 000101111 | | 0882 | | TAM | |
| 0022 | 0344 | 000101000 | | 0883 | | TAY | |
| 0044 | 0309 | 001010011 | | 0884 | | YNEC | 12 | YT=12? |
| 0008 | 0310 | 101100101 | 0875 | 0885 | | BRANCH | ONCEMOR |
| 0011 | 0323 | 001001101 | | 0886 | | TCY | 11 |
| 0023 | 0347 | 000110110 | | 0887 | | RSTR | | RESET R11 |
| 0046 | 030D | 001000011 | | 0888 | | TCY | 12 |
| 000C | 031B | 000110110 | | 0889 | | RSTR | | RESET R12 |
| 0019 | 0333 | 001001111 | | 0890 | | TCY | 15 |
| 0033 | 0367 | 000110110 | | 0891 | | RSTR | |
| 0066 | 034D | 010111111 | | 0892 | | RETN | |
| 0040 | 031A | 010011110 | | 0893 | COMPENT | LDX | 7 |
| 001A | 0334 | 001000010 | | 0894 | | TCY | 4 |
| 0035 | 036B | 010000011 | | 0895 | | LDP | 12 |
| 006A | 0355 | 000100000 | | 0896 | | TBIT | 0 |
| 0055 | 032A | 101000100 | 1656 | 0897 | | BRANCH | NNT | IN MW |
| 002A | 0354 | 010001010 | | 0898 | | LDP | 5 |
| 0054 | 0329 | 000100011 | | 0899 | | TBIT | 3 |
| 002A | 0350 | 101010110 | 0700 | 0900 | | BRANCH | SHOWW | IN LG |
| 0050 | 0321 | 010001011 | | 0901 | | BI | DISP/KB |
| 0020 | 0340 | 100000110 | 1709 | 0902 | | | |

TABLE 1-7

| | | | | | | | |
|---|---|---|---|---|---|---|---|
| | | | | 0903 | | ORGPG | 7 |
| 0000 | 0380 | 010000001 | | 0904 | LG | CALLL | RESET |
| 0001 | 03A3 | 110000101 | 1091 | 0905 | | | |
| 0003 | 03A7 | 001000000 | | 0906 | | TCY | 0 |
| 0007 | 03AF | 010100000 | | 0907 | | SBIT | 0 | NL=1 |
| 000F | 039F | 001000010 | | 0908 | | TCY | 4 |
| 001F | 03BF | 010100011 | | 0909 | | SBIT | 3 |
| 003F | 03FF | 010011010 | | 0910 | | LDX | 5 |
| 007F | 03FF | 001000100 | | 0911 | | TCY | 2 | UPPER=19 |
| 007E | 03FD | 001101000 | | 0912 | | TCMIY | 1 |
| 007D | 03FA | 001101001 | | 0913 | | TCMIY | 9 |
| 007B | 03F6 | 010010010 | | 0914 | | LDX | 4 |
| 0077 | 03EE | 001001110 | | 0915 | | TCY | 7 |
| 006F | 03DE | 000101001 | | 0916 | | TMA | |
| 005F | 03BE | 001000000 | | 0917 | | TCY | 0 |
| 003E | 03FC | 001000000 | | 0918 | | TCY | 0 |
| 007C | 03F9 | 010010100 | | 0919 | | LDX | 2 |
| 0079 | 03F2 | 001100000 | | 0920 | | TCMIY | 0 | DEC |
| 0073 | 03E6 | 000101111 | | 0921 | | TAM | | HEX FOR SECET |
| 0067 | 03CF | 001000111 | | 0922 | | TCY | 14 | TRY #00 |
| 004F | 039F | 001100000 | | 0923 | | TCMIY | 0 |
| 001E | 03BC | 001100000 | | 0924 | | TCMIY | 0 |
| 003D | 03FB | 010011100 | | 0925 | | LDX | 3 | LOWER=00 |
| 007A | 03F5 | 001100000 | | 0926 | | TCMIY | 0 |
| 0075 | 03EA | 001100000 | | 0927 | | TCMIY | 0 |
| 006B | 03D6 | 010001111 | | 0928 | | CALLL | BLNK | SHOW A( )7 ON DISPLAY |
| 0057 | 03AF | 110000000 | 1935 | 0929 | | | |
| 002E | 03DC | 010010000 | | 0930 | | LDX | 0 |
| 005C | 03B9 | 001001000 | | 0931 | | TCY | 1 |
| 003A | 03F0 | 001100000 | | 0932 | | TCMIY | 0 |
| 0070 | 03E1 | 001001000 | | 0933 | | TCY | 1 |
| 0061 | 03C2 | 010011000 | | 0934 | | LDX | 1 |
| 0043 | 0386 | 001100000 | | 0935 | | TCMIY | 0 |
| 0006 | 03AC | 001101101 | | 0936 | | TCMIY | 11 |
| 000D | 039B | 001100111 | | 0937 | | TCMIY | 14 |
| 001B | 03B7 | 001101101 | | 0938 | | TCMIY | 11 |
| 0037 | 03EF | 001101001 | | 0939 | | TCMIY | 9 |
| 006E | 03DD | 001001111 | | 0940 | | TCY | 15 |
| 005D | 03BA | 000101001 | | 0941 | | TMA | |
| 003A | 03F4 | 001000111 | | 0942 | | TCY | 14 |
| 0074 | 03E9 | 000010101 | | 0943 | | AMAAC | |
| 0069 | 03D2 | 001111001 | | 0944 | | ACACC | 9 |
| 0053 | 03A6 | 101100010 | 0950 | 0945 | | BRANCH | AGAIN1 |
| 0026 | 03CC | 001000000 | | 0946 | | TCY | 0 |
| 004C | 0399 | 010010100 | | 0947 | | LDX | 2 |

| | | | | | | | | |
|---|---|---|---|---|---|---|---|---|
| 0018 | 03B0 | 001101000 | | 0948 | | TCMIY | 1 | |
| 0051 | 03E3 | 010100111 | | 0949 | | RBIT | 3 | |
| 0062 | 03C5 | 010010100 | | 0950 | AGAIN1 | LDX | 2 | |
| 0045 | 038A | 001001000 | | 0951 | | TCY | 1 | |
| 000A | 0394 | 000110010 | | 0952 | AGAIN | IMAC | | |
| 0015 | 03AB | 000101100 | | 0953 | | TAMDYN | | |
| 002B | 03D7 | 011100000 | | 0954 | | ALEC | 0 | |
| 0056 | 03AD | 100001010 | 0952 | 0955 | | BRANCH | AGAIN | |
| 002C | 03D8 | 010000101 | | 0956 | | BL | LGG | |
| 005B | 03B1 | 101010101 | 1412 | 0957 | | | | |
| 0030 | 03E0 | 001001111 | | 0958 | GETR | TCY | 15 | |
| 0060 | 03C1 | 010011000 | | 0959 | GETR1 | LDX | 1 | |
| 0041 | 03B2 | 000101001 | | 0960 | | TMA | | |
| 0002 | 0384 | 010010001 | | 0961 | | LDX | 8 | |
| 0005 | 038B | 001000011 | | 0962 | | TCY | 12 | GET RENDOM NUM FROM TIMEOUT |
| 000B | 0397 | 000101101 | | 0963 | | TAMIYC | | |
| 0017 | 03AF | 010111111 | | 0964 | | RETN | | |
| 002F | 03DF | 010010001 | | 0965 | RAMDOM | LDX | 8 | |
| 005E | 03BD | 001000011 | | 0966 | | TCY | 12 | |
| 003C | 03FA | 000101001 | | 0967 | | TMA | | |
| 007B | 03F1 | 001000111 | | 0968 | | TCY | 14 | |
| 0071 | 03E2 | 000101101 | | 0969 | | TAMIYC | | LSH=RAM |
| 0063 | 03C6 | 001100000 | | 0970 | | TCMIY | 0 | MSH=0 |
| 0047 | 03BE | 001001011 | | 0971 | BFG | TCY | 13 | |
| 000F | 039C | 000000111 | | 0972 | | DMAN | | |
| 0010 | 03BB | 101011011 | 0977 | 0973 | | BRANCH | ARAM | |
| 003B | 03F7 | 001001111 | | 0974 | CRAM | TCY | 15 | |
| 0076 | 03ED | 000101001 | | 0975 | | TMA | | |
| 006D | 03DA | 010111111 | | 0976 | | RETN | | |
| 005B | 03B6 | 000101100 | | 0977 | ARAM | TAMDYN | | LIMIT-1 |
| 0036 | 03EC | 000101001 | | 0978 | | TMA | | |
| 006C | 03D9 | 001000111 | | 0979 | | TCY | 14 | |
| 0059 | 03B2 | 000101001 | | 0980 | | AMAAC | | |
| 0032 | 03E4 | 100100101 | 0985 | 0981 | | BRANCH | BRAM | |
| 0064 | 03C9 | 000101111 | | 0982 | | TAM | | |
| 0049 | 0392 | 011101001 | | 0983 | | ALEC | 9 | |
| 0012 | 03A4 | 101000111 | 0971 | 0984 | | BRANCH | BFG | |
| 0025 | 03CB | 001110110 | | 0985 | BRAM | ACACC | 6 | |
| 0004 | 0395 | 000101101 | | 0986 | | TAMIYC | | |
| 0014 | 03AB | 000110010 | | 0987 | | IMAC | | |
| 0029 | 03D3 | 000101111 | | 0988 | | TAM | | |
| 0052 | 03A5 | 101000111 | 0971 | 0989 | | BRANCH | BFG | |
| 0024 | 03CB | 010011110 | | 0990 | ERASE1 | LDX | 7 | |
| 0048 | 0591 | 001000000 | | 0991 | | TCY | 0 | |
| 0010 | 03A0 | 000110010 | | 0992 | | IMAC | | |
| 0021 | 03C3 | 000101111 | | 0993 | | TAM | | N1+1 |
| 0042 | 0385 | 001000001 | | 0994 | | TCY | 8 | |
| 0004 | 03B8 | 010010000 | | 0995 | | LDX | 0 | |
| 0009 | 0393 | 000000111 | | 0996 | | DMAN | | |
| 0013 | 03A7 | 000101111 | | 0997 | | TAM | | |
| 0027 | 03CF | 000110011 | | 0998 | | MNEZ | | |
| 004E | 039D | 100101101 | 1006 | 0999 | | BRANCH | ERA | |
| 001C | 038B | 010011110 | | 1000 | FA | LDX | 7 | |
| 0039 | 03F3 | 001000110 | | 1001 | | TCY | 6 | |
| 0072 | 03E5 | 010100010 | | 1002 | | SBIT | 1 | GOF=1 |
| 0065 | 03CA | 010100101 | | 1003 | | RBIT | 2 | USRF=0 |
| 004B | 0396 | 010001111 | | 1004 | | BL | MYSTERY | |
| 0016 | 03AC | 100101100 | 1987 | 1005 | | | | |
| 002D | 03DB | 001000111 | | 1006 | ERA | TCY | 14 | |
| 0054 | 03B5 | 001101101 | | 1007 | | TCMIY | 11 | BLNK CODE |
| 0034 | 03EB | 001101000 | | 1008 | | TCMIY | 1 | |
| 006B | 03D1 | 010000011 | | 1009 | | CALL | PCODE | LBNK THE POSITION |
| 0051 | 03A2 | 111101110 | 1584 | 1010 | | | | |
| 0022 | 03C4 | 010001011 | | 1011 | GEND | BL | DISP/KB | |
| 0044 | 0389 | 100000110 | 1709 | 1012 | | | | |
| 000B | 0390 | 000101011 | | 1013 | LOADXX | TYA | | |
| 0011 | 03A3 | 001000001 | | 1014 | | TCY | 8 | |
| 0023 | 03C7 | 000101111 | | 1015 | | TAM | | LENGTH OF WORD |
| 0046 | 03BD | 001000010 | | 1016 | LOADX | TCY | 4 | |
| 000C | 0398 | 010010001 | | 1017 | | LDX | 8 | |
| 0019 | 03B3 | 000101001 | | 1018 | | TMA | | |
| 0033 | 03E7 | 010111111 | | 1019 | | RETN | | |
| 0066 | 03CD | 010011110 | | 1020 | | LDX | 7 | |
| 004D | 039A | 001000011 | | 1021 | | TCY | 12 | |
| 001A | 03B4 | 010001100 | | 1022 | | LDP | 3 | |
| 0035 | 03EB | 011100000 | | 1023 | | ALEC | 0 | |
| 006A | 03D5 | 101010000 | 0516 | 1024 | | BRANCH | MMAH | |
| 0055 | 03AA | 010010110 | | 1025 | | LDX | 6 | |
| 002A | 03D4 | 010000001 | | 1026 | | BL | BUZZY | |
| 0054 | 03A9 | 100101101 | 1155 | 1027 | | | | |
| 002B | 03D0 | 010001000 | | 1028 | DAAAK | CALL | BFIGT | |
| 0050 | 03A1 | 111011101 | 0170 | 1029 | | | | |
| 0020 | 03C0 | 010000011 | | 1030 | | BL | DAAA | |
| 0040 | 03B1 | 100111001 | 1645 | 1031 | | | | |

TABLE 1-B

| | | | | | | | | |
|---|---|---|---|---|---|---|---|---|
| | | | | 1032 | | ORGPG | 4 | |
| 0000 | 0400 | 010011110 | | 1033 | USENT | LDX | 7 | |
| 0001 | 0403 | 001000110 | | 1034 | | TCY | 6 | |
| 0003 | 0407 | 000100001 | | 1035 | | TBIT | 2 | |
| 0007 | 040F | 100111111 | 1039 | 1036 | | BRANCH | USENT1 | |
| 000F | 041F | 010001011 | | 1037 | FEND | BL | DISP/KB | |
| 001F | 043F | 100000110 | 1709 | 1038 | | | | |

```
005F  047F  001100100          1039  USENT1   TCMIY    2          GOF=1,URSF=0,GO=0,LVIF=0
007F  047E  001001000          1040           TCY      1          LVL=2
007E  047D  001100100          1041           TCMIY    2
007D  047A  001001100          1042           TCY      3
007B  0476  010100101          1043           RBIT     2          EXABF=0
0077  046F  001000010          1044           TCY      4
006F  045E  010100010          1045           SBIT     1          USENT=1
005F  043E  001000011          1046           TCY      .12
003E  047C  000110010          1047           IMAC                X+1
007C  0479  000101111          1048           TAM
0079  0472  001000000          1049           TCY      0
0073  0466  001101110          1050           TCMIY    7          NL=7
0067  044E  011101010          1051           ALEC     5
004F  041E  101111010  1055    1052           BRANCH              USENTAA
001E  043F  001000000          1053           TCY      0
003D  047B  001100000          1054           TCMIY    0          NL=0,IF NO STORAGE SPACE LEFT
007A  0475  010100001          1055  USENTAA  LDX      8
0075  046A  001000000          1056           TCY      4
006A  0456  001100100          1057           TCMIY    2          READY
0057  042F  001000001          1058  ADDRESS  TCY      8
002E  045C  001100011          1059           TCMIY    12
005C  0439  001101100          1060           TCMIY    3
0038  0470  001100000          1061           TCMIY    0
0070  0461  001100000          1062           TCMIY    0
0061  0442  001001110          1063           TCY      7
0043  0406  010111111          1064           RETN
0006  040C  001100010          1065           TCMIY    4
000D  041B  010000010          1066  FLAGB    BL                  GOODWORD
001B  0437  101001110  0615    1067
0037  046F  001000111          1068  USEOUCH  TCY      14
006E  045D  000101001          1069  BBB      TMA
005D  043A  000000101          1070           IYC
003A  0474  000101111          1071           TAM
0074  0469  011111011          1072           YNCY     15
0069  0452  001011110          1073           YNEC     7
0053  0426  101101110  1069    1074           BRANCH              BBB
0026  044C  010010000          1075           LDX      0
004C  0419  001000001          1076           TCY      8
0018  0430  000000110          1077           CLA
0031  0463  000000011          1078           XMA
0062  0445  010010110          1079           LDX      6
0045  040A  000101111          1080           TAM
000A  0414  010001000          1081           CALL                RETGT
0015  042B  111011101  0170    1082
002B  0457  001001111          1083           TCY      15
0056  042D  010010110          1084  NEW      LDX      6
002C  045A  000101001          1085           TMA
005A  0431  110110010  1110    1086           CALL                X
0030  0460  000101100          1087           TAMDYN
0060  0441  101010110  1084    1088           BRANCH              NEW
0041  0402  010001111          1089           BL USFG
0002  0404  101101010  2055    1090
0005  040B  000000110          1091  RESET    CLA
000B  0417  010011110          1092           LDX      7
0017  042F  001001111          1093           TCY      15
002F  045F  000101100          1094  FILL     TAMDYN
005F  0430  100101111  1094    1095           BRANCH              FILL
003E  047B  010111111          1096           RETN
0078  0471  001001000          1097           TCY      1
0071  0462  001101000          1098           TCMIY    1          LVL=1
0063  0446  001101000          1099           TCMIY    1          EXPGO=1
0047  040E  001000010          1100           TCY      4
000E  041C  010100001          1101           SBIT     2          CL=1
001D  043B  001000110          1102           TCY      6
003B  0477  001100101          1103           TCMIY    10         LVIF=1,USRF=0,GOF=1,GO=0
0076  046D  010100001          1104           LDX      8
006D  0454  001000010          1105           TCY      4
005B  0436  001101100          1106           TCMIY    3          CRAZY FLAG
0036  046C  111010111  1058    1107           CALL                ADDRESS
006C  0459  001100100          1108           TCMIY    2
0059  0432  100001101  1066    1109           BRANCH              FLAGB
0032  0464  010010001          1110  X        LDX      8
0064  0449  000000011          1111           XMA
0049  0412  011100100          1112           ALEC     2
0012  0424  101100101  1132    1113           BRANCH              XTWO
0025  044B  011101100          1114           ALEC     3
004A  0415  100011100  1129    1115           BRANCH              XTHR
0014  042B  011101111          1116           ALEC     4
0029  0453  100010011  1126    1117           BRANCH              XFOUR
0052  0425  011101010          1118           ALEC     5
0024  0448  101000010  1123    1119           BRANCH              XFIV
0048  0411  000000011          1120           XMA
0010  0420  010010110          1121           LDX      6
0021  0443  010111111          1122           RETN
0042  0405  000000011          1123  XFIV     XMA
0004  0408  010011010          1124           LDX      5
0009  0413  010111111          1125           RETN
0013  0427  000000011          1126  XFOUR    XMA
0027  044F  010010010          1127           LDX      4
004E  041D  010111111          1128           RETN
001C  043A  000000011          1129  XTHR     XMA
0039  0473  010011100          1130           LDX      3
0072  0465  010111111          1131           RETN
0065  044A  000000011          1132  XTWO     XMA
```

| | | | | | | | | |
|---|---|---|---|---|---|---|---|---|
| 004B | 0416 | 010010100 | | 1133 | | LDX | 2 | |
| 0016 | 042C | 010111111 | | 1134 | | RETN | | |
| 002D | 045A | 001001110 | | 1135 | BUZZY | TCY | 7 | |
| 005A | 0435 | 001101000 | | 1136 | | TCMIY | 1 | BLANK |
| 0034 | 046A | 000101001 | | 1137 | BUZZ | TMA | | |
| 006B | 0451 | 000000100 | | 1138 | | DYN | | |
| 0051 | 0422 | 000101111 | | 1139 | | TAM | | |
| 0022 | 0444 | 011111000 | | 1140 | | YMCY | 1 | |
| 0044 | 0409 | 001010000 | | 1141 | | YNEC | 0 | |
| 0008 | 0410 | 100110100 | 1137 | 1142 | | BRANCH | BUZZ | |
| 0011 | 0423 | 001001111 | | 1143 | | TCY | 15 | |
| 0023 | 0447 | 001101101 | | 1144 | | TCMIY | 11 | |
| 0046 | 040D | 010001110 | | 1145 | | CALLL | LOADX | |
| 000C | 041A | 111000110 | 1016 | 1146 | | | | |
| 0019 | 0433 | 010001010 | | 1147 | | LDP | 5 | |
| 0033 | 0467 | 011101000 | | 1148 | | ALEC | 1 | |
| 0066 | 044D | 100011101 | 0751 | 1149 | | BRANCH | RTX | |
| 004D | 041A | 010001000 | | 1150 | | CALLL | EXCH | |
| 001A | 0434 | 111011111 | 0146 | 1151 | | | | |
| 0035 | 046B | 010001110 | | 1152 | | CALLL | LOADX | |
| 006A | 0455 | 111000110 | 1016 | 1153 | | | | |
| 0055 | 042A | 010001010 | | 1154 | | BL | JJ | |
| 002A | 0454 | 101010001 | 0755 | 1155 | | | | |
| 0054 | 0429 | 010001100 | | 1156 | NEWRE | LDP | 3 | |
| 002B | 0450 | 000100001 | | 1157 | | TBIT | 2 | |
| 0050 | 0421 | 100011011 | 0425 | 1158 | | BRANCH | REPLAY1 | IN CL MODE |
| 002D | 0440 | 010001010 | | 1159 | | BL | START | |
| 0040 | 0401 | 100010100 | 0732 | 1160 | | | | |

TABLE 1-9

| | | | | | | | | |
|---|---|---|---|---|---|---|---|---|
| | | | | 1161 | | ORGPG | 9 | |
| 0000 | 04B0 | 010011110 | | 1162 | ENEXT | LDX | 7 | |
| 0001 | 04B3 | 001000010 | | 1163 | | TCY | 4 | |
| 0003 | 04B7 | 000100000 | | 1164 | | TBIT | 0 | |
| 0007 | 04BF | 100111111 | 1168 | 1165 | | BRANCH | MWFLASH | |
| 000F | 049F | 010001011 | | 1166 | EEND | BL | DISP/KB | FLASHING IN LETTER GUESSER MODE |
| 001F | 04BE | 100000101 | 1709 | 1167 | | | | |
| 003F | 04FF | 001001010 | | 1168 | MWFLASH | TCY | 5 | |
| 007F | 04FE | 000100010 | | 1169 | | TBIT | 1 | TPLYR=1? |
| 007E | 04FD | 101111011 | 1172 | 1170 | | BRANCH | DUMM | YES |
| 007D | 04FA | 101111100 | 1177 | 1171 | | BRANCH | CHANGE | NO |
| 007B | 04F5 | 000100001 | | 1172 | DUMM | TBIT | 2 | SNPYR=0,1 |
| 0077 | 04EF | 100111110 | 1176 | 1173 | | BRANCH | NUM | SNPYR=1,0 |
| 006F | 04DF | 010100001 | | 1174 | | SBIT | 2 | |
| 005F | 04BE | 101111100 | 1177 | 1175 | | BRANCH | CHANGE | |
| 003E | 04FC | 010100101 | | 1176 | NUM | RBIT | 2 | |
| 007C | 04F9 | 001000100 | | 1177 | CHANGE | TCY | 2 | |
| 0079 | 04F2 | 000110011 | | 1178 | | MNEZ | | EXPGOT=0? |
| 0073 | 04E6 | 100111000 | 1190 | 1179 | | BRANCH | CONT | YES |
| 0067 | 04CF | 001000000 | | 1180 | | TCY | 0 | |
| 004F | 049F | 001100000 | | 1181 | | TCMIY | 0 | RESET ALL FLAGS ACCEPT LVLRS |
| 001E | 04BC | 001000100 | | 1182 | | TCY | 2 | |
| 003D | 04FB | 000000101 | | 1183 | 777 | IYC | | |
| 007A | 04F5 | 001100000 | | 1184 | | TCMIY | 0 | |
| 0075 | 04EA | 001100000 | | 1185 | | TCMIY | 0 | |
| 006B | 04D6 | 010111111 | | 1186 | | RETN | | |
| 0057 | 04AE | 110111101 | 1183 | 1187 | | CALL | 777 | |
| 002E | 04DC | 010001011 | | 1188 | | BL | SCORE3 | |
| 005C | 04B9 | 101010000 | 1802 | 1189 | | | | |
| 003B | 04F0 | 010001111 | | 1190 | CONT | CALLL | BLNK | |
| 0070 | 04E1 | 110000000 | 1935 | 1191 | | | | |
| 0061 | 04C2 | 001001010 | | 1192 | | TCY | 5 | |
| 0043 | 04A6 | 010011110 | | 1193 | | LDX | 7 | |
| 0006 | 048C | 000100001 | | 1194 | | TBIT | 2 | SHOWSACCORDING TO SNPLY |
| 000D | 049B | 101101110 | 1198 | 1195 | | BRANCH | SND | |
| 001B | 04B7 | 001000000 | | 1196 | | TCY | 0 | |
| 0037 | 04FF | 101011101 | 1199 | 1197 | | BRANCH | ABC | |
| 006E | 04DD | 001001110 | | 1198 | SND | TCY | 7 | |
| 005D | 04BA | 010011000 | | 1199 | ABC | LDX | 1 | |
| 003A | 04F4 | 001100101 | | 1200 | | TCMIY | 10 | |
| 0074 | 04E9 | 010001011 | | 1201 | DELAYA | CALLL | LIN | INITIAL TIMEOUT |
| 0069 | 04D2 | 110111010 | 1715 | 1202 | | | | |
| 0053 | 04A6 | 010001111 | | 1203 | | CALLL | DELAY | |
| 0026 | 04CC | 110010001 | 1916 | 1204 | | | | |
| 004C | 0499 | 010001011 | | 1205 | | CALLL | LIN | |
| 0018 | 04B0 | 110111010 | 1715 | 1206 | | | | |
| 0031 | 04E3 | 010000111 | | 1207 | | CALLL | DELAY | |
| 0062 | 04C5 | 110010001 | 1916 | 1208 | | | | |
| 0045 | 04BA | 010001111 | | 1209 | | BL | MYSTERY | |
| 000A | 0494 | 100101100 | 1987 | 1210 | | | | |
| 0015 | 04AB | 010011000 | | 1211 | TIMER | LDX | 1 | |
| 002B | 04D7 | 001001011 | | 1212 | | TCY | 13 | |
| 0056 | 04AD | 000101001 | | 1213 | | TMA | | |
| 002C | 04DA | 010000111 | | 1214 | | LDP | 14 | |
| 0058 | 04B1 | 011100100 | | 1215 | | ALEC | 2 | |
| 0030 | 04E0 | 100000000 | 1806 | 1216 | | BRANCH | DSS | |
| 0060 | 04C1 | 001001111 | | 1217 | | TCY | 15 | |
| 0041 | 0482 | 000110011 | | 1218 | | RSTR | | |
| 0002 | 04B4 | 010001001 | | 1219 | | LDP | 9 | |
| 0005 | 04BB | 010011110 | | 1220 | | LDX | 7 | |
| 000B | 0497 | 001001000 | | 1221 | | TCY | 1 | |
| 0017 | 04AF | 000101001 | | 1222 | | TMA | | |
| 002F | 04DF | 010011000 | | 1223 | | LDX | 1 | |

| | | | | | | | | |
|---|---|---|---|---|---|---|---|---|
| 005E | 04BD | 001000101 | | 1224 | | TCY | 10 | |
| 003C | 04FA | 011101000 | | 1225 | | ALEC | 1 | |
| 007A | 04F1 | 100110010 | 1239 | 1226 | | BRANCH | LVL1 | |
| 0071 | 04F2 | 011100100 | | 1227 | | ALEC | 2 | |
| 0063 | 04C6 | 101011011 | 1235 | 1228 | | BRANCH | LVL2 | |
| 0047 | 04BF | 001111111 | | 1229 | | ACACC | 15 | |
| 000F | 049C | 110010100 | 1245 | 1230 | BY | CALL | SUBTRA | SCORE=2 |
| 001D | 04BB | 010001011 | | 1231 | LINN | BL | LIN | |
| 003B | 04F7 | 100111010 | 1715 | 1232 | | | | |
| 0076 | 04ED | 010100101 | | 1233 | BYBY | RBIT | 2 | |
| 006D | 04DA | 010011000 | | 1234 | | LDX | 1 | |
| 005B | 04B6 | 001001000 | | 1235 | LVL2 | TCY | 1 | |
| 0036 | 04EC | 000101011 | | 1236 | | TYA | | |
| 006C | 04D9 | 001000101 | | 1237 | | TCY | 10 | |
| 0059 | 04B2 | 100001110 | 1230 | 1238 | | BRANCH | BY | |
| 0032 | 04E8 | 001001101 | | 1239 | LVL1 | TCY | 11 | |
| 0064 | 04C9 | 010011110 | | 1240 | | LDX | 7 | |
| 0049 | 04B2 | 000100001 | | 1241 | | TBIT | 2 | LVLSCR=17 |
| 0012 | 04A4 | 101110110 | 1233 | 1242 | | BRANCH | BYBY | |
| 0025 | 04CB | 010100001 | | 1243 | | SBIT | 2 | |
| 004A | 04B5 | 100011101 | 1231 | 1244 | | BRANCH | LINN | |
| 0014 | 04A8 | 000110000 | | 1245 | SUBTRA | SAMAN | | |
| 0029 | 04D3 | 101010001 | 1268 | 1246 | | BRANCH | TT | |
| 0052 | 04A5 | 001110101 | | 1247 | | ACACC | 10 | |
| 0024 | 04CA | 000101100 | | 1248 | | TAMDYN | | |
| 0048 | 04B1 | 000000110 | | 1249 | | CLA | | |
| 0010 | 04A0 | 001111000 | | 1250 | | ACACC | 1 | |
| 0021 | 04C3 | 000110000 | | 1251 | MID | SAMAN | | |
| 0042 | 04B5 | 101000100 | 1270 | 1252 | | BRANCH | NBOR2 | |
| 0004 | 04BB | 001110101 | | 1253 | | ACACC | 10 | |
| 0009 | 04B3 | 000101100 | | 1254 | | TAMDYN | | |
| 0013 | 04A7 | 000000110 | | 1255 | | CLA | | |
| 0027 | 04CF | 001111100 | | 1256 | | ACACC | 1 | |
| 004E | 04B0 | 000110000 | | 1257 | | SAMAN | | |
| 001C | 04B8 | 101010001 | 1268 | 1258 | | BRANCH | TT | |
| 0039 | 04F3 | 011111000 | | 1259 | THATIS | YMCY | 1 | |
| 0072 | 04E5 | 000000110 | | 1260 | | CLA | | |
| 0065 | 04CA | 000101100 | | 1261 | | TAMDYN | | |
| 004B | 04B6 | 001110100 | | 1262 | | ACACC | 2 | |
| 0016 | 04AC | 000101111 | | 1263 | | TAM | | 20 |
| 002D | 04DB | 010011110 | | 1264 | | LDX | 7 | |
| 005A | 04B5 | 001001101 | | 1265 | | TCY | 11 | |
| 0034 | 04EB | 010100100 | | 1266 | | RBIT | 0 | |
| 0068 | 04D1 | 010111111 | | 1267 | | RETN | | |
| 0051 | 04A2 | 000101111 | | 1268 | TT | TAM | | |
| 0022 | 04C4 | 010111111 | | 1269 | SUBRE | RETN | | |
| 0044 | 04B9 | 000101100 | | 1270 | NBOR2 | TAMDYN | | |
| 0008 | 04B0 | 000110011 | | 1271 | | MNEZ | | |
| 0011 | 04A3 | 100100010 | 1269 | 1272 | | BRANCH | SUBRE | |
| 0023 | 04C7 | 011101000 | | 1273 | | ALEC | 1 | |
| 0046 | 04BD | 100111001 | 1259 | 1274 | | BRANCH | THATIS | |
| 000C | 04B8 | 100010010 | 1269 | 1275 | | BRANCH | SUBRE | |
| 0019 | 04B3 | 001000010 | | 1276 | COMREWD | TCY | 4 | |
| 0033 | 04E7 | 010011110 | | 1277 | | LDX | 7 | |
| 0066 | 04CD | 010001101 | | 1278 | | LDP | 11 | |
| 004D | 049A | 000100000 | | 1279 | | TBIT | 0 | |
| 001A | 04B4 | 100000000 | 1419 | 1280 | | BRANCH | DO | IN MW MODE |
| 0035 | 04EB | 010000001 | | 1281 | | BL | NEWRE | |
| 006A | 04D5 | 101010100 | 1156 | 1282 | | | | |
| 0055 | 04AA | 001000010 | | 1283 | COMSREWD | TCY | 4 | |
| 002A | 04A4 | 010011110 | | 1284 | | LDX | 7 | |
| 0054 | 04A9 | 010001110 | | 1285 | | LDP | 7 | |
| 002A | 04D0 | 000100000 | | 1286 | | TBIT | 0 | |
| 0050 | 04A1 | 100101000 | 1028 | 1287 | | BRANCH | DAAAK | |
| 0020 | 04C0 | 010001010 | | 1288 | | BL | SHOWW | |
| 0040 | 04B1 | 101010110 | 0700 | 1289 | | | | |

TABLE 1-10

| | | | | | | | | |
|---|---|---|---|---|---|---|---|---|
| | | | | 1290 | | ORGPG | 10 | |
| 0000 | 0500 | 001000101 | | 1291 | ONEXT | TCY | 10 | |
| 0001 | 0503 | 100000111 | 1294 | 1292 | | BRANCH | ADDA | |
| 0003 | 0507 | 001001111 | | 1293 | A12 | TCY | 15 | |
| 0007 | 050F | 010001000 | | 1294 | ADDA | CALLL | ADD | |
| 000F | 051F | 111010001 | 0239 | 1295 | | | | |
| 001F | 053F | 001001001 | | 1296 | | TCY | 9 | |
| 003F | 057F | 010011000 | | 1297 | LDXTMA | LDX | 1 | |
| 007F | 057F | 000101001 | | 1298 | | TMA | | ADDSECOND DIGIT |
| 007E | 057D | 001001010 | | 1299 | | TCY | 5 | |
| 007D | 057A | 010011110 | | 1300 | | LDX | 7 | |
| 007B | 0576 | 010111111 | | 1301 | | RETN | | |
| 0077 | 056E | 000100001 | | 1302 | | TBIT | 2 | |
| 006F | 055E | 101111100 | 1306 | 1303 | | BRANCH | A22 | |
| 005F | 053E | 001001001 | | 1304 | | TCY | 9 | |
| 003E | 057C | 101111001 | 1307 | 1305 | | BRANCH | ADDB | |
| 007C | 0579 | 001000111 | | 1306 | A22 | TCY | 14 | |
| 0079 | 0572 | 010001000 | | 1307 | ADDB | CALLL | ADD | |
| 0073 | 0566 | 111010001 | 0239 | 1308 | | | | |
| 0067 | 054F | 001000001 | | 1309 | | TCY | 8 | |
| 004F | 051E | 110111111 | 1297 | 1310 | | CALL | LDXTMA | |
| 001F | 053C | 000100001 | | 1311 | | TBIT | 2 | |
| 0030 | 057B | 101101011 | 1315 | 1312 | | BRANCH | A32 | |
| 007A | 0575 | 001000001 | | 1313 | | TCY | 8 | |

| | | | | | | | | |
|---|---|---|---|---|---|---|---|---|
| 0075 | 056A | 101010111 | 1316 | 1314 | | BRANCH | XXX | |
| 006B | 0556 | 001001011 | | 1315 | A32 | TCY | 13 | |
| 0057 | 052E | 010001000 | | 1316 | XXX | CALL | ADD | |
| 002E | 055C | 111010001 | 0239 | 1317 | | | | |
| 005C | 0539 | 010011000 | | 1318 | | LDX | 1 | PUT SCORE IN M(1,13-15) TOO |
| 0038 | 0570 | 001000101 | | 1319 | | TCY | 10 | |
| 0070 | 0561 | 000101001 | | 1320 | COMCOM | TMA | | |
| 0061 | 0542 | 011110010 | | 1321 | | YMCY | 4 | |
| 0043 | 0506 | 000101111 | | 1322 | | YAM | | |
| 0006 | 050C | 011111001 | | 1323 | | YMCY | 9 | |
| 000D | 051B | 001011110 | | 1324 | | YNEC | 7 | |
| 001B | 0537 | 101110000 | 1320 | 1325 | | BRANCH | COMCOM | |
| 0037 | 0565 | 001001010 | | 1326 | | TCY | 5 | |
| 006E | 055D | 010011110 | | 1327 | | LDX | 7 | SF=0 |
| 0050 | 053A | 010100111 | | 1328 | | RBIT | 3 | |
| 003A | 0574 | 010010110 | | 1329 | BLNK6 | LDX | 6 | |
| 0074 | 0569 | 001001110 | | 1330 | | TCY | 7 | BLANK REG8 FIRST |
| 0069 | 0552 | 000000110 | | 1331 | | CLA | | |
| 0053 | 0526 | 001111000 | | 1332 | | ACACC | 1 | |
| 0026 | 054C | 000101100 | | 1333 | | TAMDYN | | |
| 004C | 0519 | 100100110 | 1333 | 1334 | | BRANCH | COMA | |
| 001B | 0530 | 001000001 | | 1335 | | TCY | 8 | |
| 0031 | 0563 | 001110101 | | 1336 | | ACACC | 10 | |
| 0062 | 0545 | 000101101 | | 1337 | COMB | TAMIYC | | |
| 0045 | 0504 | 100010101 | 1340 | 1338 | | BRANCH | COMD | |
| 000A | 0514 | 101100010 | 1337 | 1339 | | BRANCH | COMB | |
| 0015 | 0528 | 010111111 | | 1340 | COMD | RETN | | |
| 002B | 0557 | 001001010 | | 1341 | | TCY | 5 | CHECK SNPTR |
| 0056 | 052D | 010011110 | | 1342 | | LDX | 7 | TRANSFER RIGHT SCORE TO REG8 |
| 002C | 055B | 000010001 | | 1343 | | TBIT | 2 | READY FOR FLASHING |
| 005B | 0531 | 101000001 | 1347 | 1344 | | BRANCH | COMC | |
| 0030 | 0560 | 001000001 | | 1345 | | TCY | 8 | |
| 0060 | 0541 | 100000010 | 134B | 1346 | | BRANCH | CAM | |
| 0041 | 0502 | 001001011 | | 1347 | COMC | TCY | 13 | |
| 0002 | 0504 | 010011000 | | 1348 | CAM | LDX | 1 | DIG=0? |
| 0005 | 0508 | 000101011 | | 1349 | | TYA | | DIG=0? |
| 000B | 0517 | 000110011 | | 1350 | | MNEZ | | |
| 0017 | 052F | 100111011 | 1361 | 1351 | | BRANCH | COM | NO |
| 002F | 055F | 001001010 | | 1352 | | TCY | 5 | |
| 005E | 053D | 010011110 | | 1353 | | LDX | 7 | |
| 003C | 057A | 000100011 | | 1354 | | TBIT | 3 | TEST FLAG(SF) |
| 007A | 0571 | 100111011 | 1361 | 1355 | | BRANCH | COM | DIG=0,FLAG=1 |
| 0071 | 0562 | 001111000 | | 1356 | COMCC | ACACC | 1 | |
| 0063 | 0546 | 000101000 | | 1357 | | TAY | | |
| 0047 | 050F | 101001010 | 1373 | 1358 | | BRANCH | CUM | |
| 000F | 051C | 001010101 | | 1359 | COMG | YNEC | 10 | |
| 001C | 053B | 101010010 | 1376 | 1360 | | BRANCH | COMH | |
| 003B | 0577 | 001001010 | | 1361 | COM | TCY | 5 | |
| 0076 | 056D | 010011110 | | 1362 | | LDX | 7 | |
| 006D | 055A | 010100011 | | 1363 | | SBIT | 3 | |
| 005A | 0536 | 000101000 | | 1364 | | TAY | | |
| 0036 | 056C | 010011000 | | 1365 | | LDX | 1 | |
| 006C | 0559 | 000101001 | | 1366 | | TMA | | |
| 0059 | 0532 | 010010110 | | 1367 | | LDX | 6 | |
| 0032 | 0564 | 000101111 | | 1368 | | TAM | | |
| 0064 | 0549 | 011111110 | | 1369 | | YMCY | 7 | |
| 0049 | 0512 | 001100100 | | 1370 | | TCMIY | 2 | |
| 0012 | 0524 | 011111110 | | 1371 | | YMCY | 7 | |
| 0025 | 054B | 000101011 | | 1372 | | TYA | | |
| 004A | 0515 | 001011101 | | 1373 | CUM | YNEC | 11 | |
| 0014 | 052A | 100001110 | 1359 | 1374 | | BRANCH | COMG | |
| 0029 | 0553 | 101000010 | 1381 | 1375 | | BRANCH | COMEND | |
| 0052 | 0525 | 001011111 | | 1376 | COMH | YNEC | 15 | |
| 0024 | 054B | 100010000 | 1379 | 1377 | | BRANCH | COMF | |
| 004B | 0511 | 100111011 | 1361 | 1378 | | BRANCH | COM | |
| 0010 | 0520 | 001010100 | | 1379 | COMF | YNEC | 0 | |
| 0021 | 0543 | 100000010 | 134B | 1380 | | BRANCH | CAM | |
| 0042 | 0505 | 010001000 | | 1381 | COMEND | LDX | 0 | |
| 0004 | 050B | 001001001 | | 1382 | | TCY | 9 | |
| 0009 | 0513 | 001101010 | | 1383 | | TCMIY | 5 | FLASH=5 |
| 0013 | 0527 | 000101001 | | 1384 | | TMA | | |
| 0027 | 054F | 000101111 | | 1385 | FLASH | TAM | | LFLASH DISPLAY AND REG8 |
| 004E | 051D | 010001011 | | 1386 | | CALL | LTN | |
| 001C | 053A | 110111010 | 1715 | 1387 | | | | |
| 0039 | 0573 | 010000101 | | 1388 | | CALL | DELAY | DELAY 1/2 SEC |
| 0072 | 0565 | 110010001 | 1916 | 1389 | | | | |
| 0065 | 054A | 010001011 | | 1390 | | CALL | LTN | |
| 004B | 0516 | 110111010 | 1715 | 1391 | | | | |
| 0016 | 052C | 010000111 | | 1392 | | CALL | DELAY | DELAY 1 SEC |
| 002D | 055B | 110010001 | 1916 | 1393 | | | | |
| 005A | 0535 | 010001000 | | 1394 | | CALL | EXCH | |
| 0034 | 056B | 111011111 | 0146 | 1395 | | | | |
| 006B | 0551 | 010010000 | | 1396 | | LDX | 0 | |
| 0051 | 0522 | 001001001 | | 1397 | | TCY | 9 | |
| 0022 | 0544 | 000000111 | | 1398 | | DMAN | | |
| 0044 | 0509 | 100100111 | 1385 | 1399 | | BRANCH | FLASH | |
| 0008 | 0510 | 010001001 | | 1400 | | BL | ENEXT | |
| 0011 | 0523 | 100000000 | 1162 | 1401 | | | | |
| 0023 | 0547 | 010010110 | | 1402 | USEOU | LDX | 6 | |
| 0046 | 050D | 010000001 | | 1403 | | BL | USEOUCH | |
| 000C | 051B | 100110111 | 106B | 1404 | | | | |
| 0019 | 0533 | 010000000 | | 1405 | CLG | CALL | LOAD | |
| 0033 | 0567 | 111010010 | 0089 | 1406 | | | | |
| 0066 | 054D | 001100000 | | 1407 | | TCMIY | 0 | |

| | | | | | | | |
|---|---|---|---|---|---|---|---|
| 0040 | 051A | 001100001 | | 1408 | | TCMIY | 8 |
| 001A | 0534 | 001000011 | | 1409 | | TCY | 12 |
| 0035 | 056B | 010001111 | | 1410 | GAMM | LDP | 15 |
| 006A | 0555 | 100101000 | 2059 | 1411 | | BRANCH | GAME |
| 0055 | 052A | 010000000 | | 1412 | LGG | CALLL | LOAD |
| 0024 | 0554 | 111010010 | 0089 | 1413 | | | |
| 0054 | 0529 | 001100101 | | 1414 | | TCMIY | 10 |
| 002B | 0550 | 001101001 | | 1415 | | TCMIY | 4 |
| 0050 | 0521 | 001000011 | | 1416 | | TCY | 12 |
| 0020 | 0540 | 100110101 | 1410 | 1417 | | BRANCH | GAMM |

TABLE 1-11

| | | | | | | | | |
|---|---|---|---|---|---|---|---|---|
| | | | | 1418 | | ORGPG | 11 | |
| 0000 | 05B0 | 001001110 | | 1419 | DO | TCY | 7 | |
| 0001 | 05B3 | 010011110 | | 1420 | | LDX | 7 | |
| 0003 | 05B7 | 000110011 | | 1421 | | MNEZ | | |
| 0007 | 05AF | 100111111 | 1425 | 1422 | | BRANCH | DODO | |
| 000F | 059F | 010001111 | | 1423 | | CALLL | BLNK | |
| 001F | 05BF | 110000000 | 1935 | 1424 | | | | |
| 003F | 05FF | 010001000 | | 1425 | DODO | CALLL | DFIGT | |
| 007F | 05FE | 111011101 | 0170 | 1426 | | | | |
| 007E | 05FD | 001000000 | | 1427 | | TCY | 0 | |
| 007D | 05FA | 010000001 | | 1428 | WU | CALLL | X | |
| 007B | 05F6 | 110110010 | 1110 | 1429 | | | | |
| 0077 | 05EE | 000101001 | | 1430 | | TMA | | |
| 006F | 05DE | 010010000 | | 1431 | | LDX | 0 | |
| 005F | 05BE | 000101111 | | 1432 | | TAM | | |
| 003E | 05FC | 010000001 | | 1433 | | CALLL | X | |
| 007C | 05F9 | 110110010 | 1110 | 1434 | | | | |
| 0079 | 05F2 | 011110001 | | 1435 | | YMCY | 8 | |
| 0073 | 05E6 | 000101001 | | 1436 | | TMA | | |
| 0067 | 05CF | 010011000 | | 1437 | | LDX | 1 | |
| 004F | 059F | 011110110 | | 1438 | | YMCY | 6 | |
| 001E | 05BC | 000101101 | | 1439 | | TAMIYC | | |
| 003D | 05FB | 001011110 | | 1440 | | YNEC | 7 | |
| 007A | 05F5 | 101111101 | 1428 | 1441 | | BRANCH | WU | |
| 0075 | 05EA | 010011110 | | 1442 | | LDX | 7 | |
| 006B | 05D6 | 001001100 | | 1443 | | TCY | 3 | |
| 0057 | 05AE | 010100111 | | 1444 | | RBIT | 3 | CLUF=0 |
| 002E | 05DC | 001001101 | | 1445 | | TCY | 11 | |
| 005C | 05B9 | 010100100 | | 1446 | | RBIT | 0 | TIMER=0 |
| 0038 | 05F0 | 001000110 | | 1447 | | TCY | 6 | |
| 0070 | 05E1 | 010100100 | | 1448 | | RBIT | 0 | GO=0 |
| 0061 | 05C2 | 001001110 | | 1449 | | TCY | 7 | |
| 0043 | 0586 | 000101001 | | 1450 | | TMA | | |
| 0006 | 058C | 011100000 | | 1451 | | ALEC | 0 | EXGES=0 |
| 000D | 059B | 100101100 | 1471 | 1452 | | BRANCH | GEE | |
| 001B | 05B7 | 001110001 | | 1453 | | ACACC | 8 | |
| 0037 | 05EF | 100111011 | 1489 | 1454 | | BRANCH | AFTER | EXGES=7 |
| 006E | 05DD | 001001000 | | 1455 | COMPUTE | TCY | 1 | |
| 005D | 05BA | 010011110 | | 1456 | | LDX | 7 | |
| 003A | 05F4 | 000101001 | | 1457 | | TMA | | |
| 0074 | 05E9 | 010111111 | | 1458 | | RETN | | |
| 0069 | 05D2 | 011101000 | | 1459 | | ALEC | 1 | CHECK LVL |
| 0053 | 05A6 | 100000101 | 1477 | 1460 | | BRANCH | ONE | =8 |
| 0026 | 05CC | 000000110 | | 1461 | | CLA | | |
| 004C | 0599 | 001111000 | | 1462 | | ACACC | 1 | |
| 0018 | 05B0 | 001001001 | | 1463 | | TCY | 9 | |
| 0031 | 05E3 | 010011000 | | 1464 | | LDX | 1 | |
| 0062 | 05C5 | 010001001 | | 1465 | | CALLL | MID | =10 |
| 0045 | 05B4 | 110100001 | 1251 | 1466 | | | | |
| 000A | 0594 | 111101110 | 1455 | 1467 | | CALL | COMPUTE | |
| 0015 | 05AB | 011101100 | | 1468 | | ALEC | 2 | CHECK LVL |
| 002B | 05D7 | 100010111 | 1479 | 1469 | | BRANCH | TWO | |
| 0056 | 05AD | 100001011 | 1478 | 1470 | GEE | BRANCH | THRE | 6 |
| 002C | 05DB | 010011000 | | 1471 | GEE | LDX | 1 | |
| 005B | 05B1 | 001000001 | | 1472 | | TCY | 8 | |
| 0030 | 05E0 | 001100000 | | 1473 | | TCMIY | 0 | |
| 0060 | 05C1 | 001100000 | | 1474 | | TCMIY | 0 | |
| 0041 | 05B2 | 001100000 | | 1475 | | TCMIY | 0 | |
| 0002 | 0584 | 100111011 | 1489 | 1476 | | BRANCH | AFTER | |
| 0005 | 05BB | 001111010 | | 1477 | ONE | ACACC | 4 | |
| 000B | 0597 | 001111100 | | 1478 | THRE | ACACC | 3 | |
| 0017 | 05AF | 001000101 | | 1479 | TWO | TCY | 10 | |
| 002F | 05DF | 010011000 | | 1480 | | LDX | 1 | |
| 005E | 05BD | 010001001 | | 1481 | | CALLL | SUBTRA | |
| 003C | 05FB | 110010100 | 1245 | 1482 | | | | |
| 0078 | 05F1 | 010011110 | | 1483 | | LDX | 7 | |
| 0071 | 05E2 | 001001110 | | 1484 | | TCY | 7 | |
| 0063 | 05C6 | 000110010 | | 1485 | | IMAC | | EXGES+1 |
| 0047 | 058E | 000101111 | | 1486 | | TAM | | |
| 000F | 059C | 011101110 | | 1487 | | ALEC | 7 | |
| 0010 | 05BB | 101101110 | 1455 | 1488 | | BRANCH | COMPUTE | |
| 003B | 05F7 | 001000000 | | 1489 | AFTER | TCY | 0 | SET FLAGS |
| 0076 | 05ED | 010011110 | | 1490 | | LDX | 7 | |
| 006D | 05DA | 001100000 | | 1491 | | TCMIY | 0 | |
| 005B | 05B6 | 010111111 | | 1492 | | RETN | | |
| 0036 | 05EC | 001001000 | | 1493 | | TCY | 4 | NL=0 |
| 006C | 05D9 | 000100010 | | 1494 | | TBIT | 1 | USENT=1? |
| 0059 | 05B2 | 101100100 | 1497 | 1495 | | BRANCH | E | USENT=1 |
| 0032 | 05E4 | 100010000 | 1507 | 1496 | | BRANCH | DUM | |
| 0064 | 05C9 | 001000011 | | 1497 | E | TCY | 12 | |

```
0049  0592  000000111          1498            DMAN
0012  05A4  000101111          1499            TAM                    X=1
0025  05CB  001110101          1500            ACACC      10
004A  0595  100010000   1507   1501            BRANCH     DUM
0014  05AB  001000000          1502    EE      TCY        0            USFNT=1,X<=5
0029  05D3  001101110          1503            TCMIY      7            NL=7
0052  05A5  001000001          1504            TCY        8
0024  05CB  010010000          1505            LDX        0
004B  0591  001100000          1506            TCMIY      0            Y=0 FOR NEXT USER ENTRY
0010  05A0  010011110          1507    DUM     LDX        7
0021  05C3  001001100          1508            TCY        3
0042  05B5  010100010          1509            SBIT       1                              SCOREF=1
0004  05B8  001000110          1510            TCY        6
0009  05B3  010100011          1511            SBIT       3                              LVLF=1
0013  05A7  010100010          1512            SBIT       1                              GOF=1
0027  05CF  001000011          1513            TCY        12
004F  0590  000101010          1514            TMY
001C  05BB  001011000          1515            YNEC       1
0039  05F3  101001011   1519   1516            BRANCH     UPDATE
0072  05E5  001000010          1517            TCY        6
0065  05CA  010100110          1518            RBIT       1                              GOF=1
004B  0596  001000101          1519    UPDATE  TCY        10           UPDATE SCORE
0016  05AC  010011000          1520            LDX        1
002D  05DB  000101001          1521            TMA
005A  05B5  001001010          1522            TCY        5
0034  05FB  010011110          1523            LDX        7
006B  05D1  010000101          1524            LDP        10
0051  05A2  000100001          1525            TBIT       2            SNPLYR=1?
0022  05C0  100000011   1293   1526            BRANCH     A12
0044  05B9  100000000   1291   1527            BRANCH     DNEXT
0008  05B0  010000000          1528    ENDING  CALLL      LOAD
0011  05A3  111010010   0089   1529
0023  05C7  001100000          1530            TCMIY      0
0046  05BD  001101101          1531            TCMIY      11
000C  0598  100011010   1537   1532            BRANCH     GAME1
0019  05B3  010000000          1533    MWG     CALLL      LOAD
0033  05E7  111010010   0089   1534
0066  05CD  001100101          1535            TCMIY      10
004D  0594  001100001          1536            TCMIY      8
001A  05B4  010001111          1537    GAME1   BL                      GAME
0035  05FB  100101000   2059   1538    REWARD  CALLL      LOAD
006A  05D5  010000000          1539
0055  05AA  111010010   0089   1540
002A  05D4  001100100          1541            TCMIY      2
0054  05A9  001100101          1542            TCMIY      10
002B  05D0  001000011          1543            TCY        12
0050  05A1  001100100          1544            TCMIY      2            FLAG
0020  05C0  010000000          1545            LDP        0
0040  05B1  100000000   0004   1546            BRANCH     MUSIC
```

TABLE i-12

```
                                  1547            ORGPG      12
0000  0600  001000000          1548    ALPH    TCY        0
0001  0603  010011110          1549            LDX        7
0003  0607  000110011          1550            MNEZ
0007  060F  100011111   1553   1551            BRANCH     ALPHPH
000F  061F  101011000   1601   1552            BRANCH     CEND
001F  063F  001000010          1553    ALPHPH  TCY        4
003F  067F  000100000          1554            TBIT       0
007F  067F  101011111   1561   1555            BRANCH     MWAL
007E  067D  010000110          1556            LDP        6
007D  067A  000100011          1557            TBIT       3
007B  0676  101100111   0794   1558            BRANCH     LGAL
0077  066F  010000010          1559            LDP        4
006F  065F  100000000   0520   1560            BRANCH     CLAL
005F  063F  001000110          1561    MWAL    TCY        6
003F  067C  000100000          1562            TBIT       0
007C  0679  101100000   1603   1563            BRANCH     MWGOAL       GO=1
0079  0672  001000001          1564            TCY        8
0073  0666  010010000          1565            LDX        0
0067  064E  000101010          1566            TMY
004F  061E  001011110          1567            YNEC       7
001E  063C  101111010   1570   1568            BRANCH     YU
003D  067B  101011000   1601   1569            BRANCH     CEND
007A  0675  111001000   1635   1570    YU      CALL       NLMINUS      NL=1
0075  066A  001000110          1571            TCY        6
006B  0656  001100010          1572            TCMIY      4            GUF=0,LVLF=0,=1,GO=0
0057  062E  001001100          1573            TCY        3
002E  065C  010100001          1574            SBIT       2            ERASF=1
005C  0639  010100110          1575            RBIT       1            SCORF=0
003B  0670  001001010          1576            TCY        5
0070  0661  010100100          1577            RBIT       0            SNPF=0
0061  0642  010010000          1578            LDX        0
0043  0606  001000001          1579            TCY        8
0006  060C  000110011          1580            MNEZ
0000  061B  101101110   1584   1581            BRANCH     PCODE
001B  0637  010001111          1582            CALLL      BLNK
0037  066F  110000000   1935   1583
006E  0650  010010010          1584    PCODE   LDX        0            PUT CODE ON DISPLAY
005D  063A  001001111          1585            TCY        15
0034  0674  000101001          1586            TMA
0074  0669  001000001          1587            TCY        8
0069  0652  000101010          1588            TMY
```

```
0053  0626  000101111         1589            TAM              M(0,Y)=M(0,15)
0026  064C  001000111         1590            TCY      14
004C  0619  000101001         1591            TMA
001B  0630  001000001         1592            TCY      8
0031  0663  000101010         1593            TMY
0062  0645  010011000         1594            LDX      1
0045  060A  000101111         1595            TAM              M(1,Y)=M(0,14)
000A  0614  010111111         1596            RETN
0015  062H  001000001         1597            TCY      8        Y+1
002H  0657  010010000         1598            LDX      0
0056  0620  000110010         1599            IMAC
002C  065B  000101111         1600            TAM
005B  0631  010001011         1601  CEND      BL               DISP/KB
0030  0660  100000110   1709  1602  MWGOAL    LDX      2        SET FLAG FOR FINDING LETTER
0060  0641  010010000         1603            LDX      2
0041  0602  001001110         1604            TCY      7
0002  0604  010100100         1605            RBIT     0
0005  060B  000001000         1606            CALLL    RFIGT    REG8=x
000B  0617  111011101   0170  1607
0017  062F  010001011         1608            BL  DX
002F  065F  100101101   1779  1609
005E  0630  010010000         1610  DAB       LDX      0
003C  067A  001001111         1611            TCY      15
0078  0671  000101001         1612            TMA              MSB
0071  0662  001000001         1613            TCY      8
0063  0646  000101010         1614            TMY
0047  060E  010111111         1615            RETN
000E  061C  010000001         1616            CALLL    X
001D  063B  110110010   1110  1617
003B  0677  000001001         1618            MNEA
0076  0660  100111001   1645  1619            BRANCH   DAAA
006D  065A  010010000         1620            LDX      0
005B  0636  001000111         1621            TCY      14
0036  066C  000101001         1622            TMA              LSB
006C  0659  001000001         1623            TCY      8
0059  0632  000101010         1624            TMY
0032  0664  011110001         1625            YMCY     8
0064  0649  010000001         1626            CALLL    X
0049  0612  110110010   1110  1627
0012  0624  000001001         1628            MNEA
0025  064B  100111001   1645  1629            BRANCH   DAAA
004A  0615  010011000         1630            LDX      1
0014  062A  011110110         1631            YMCY     6
0029  0653  000101111         1632            TAM              M(1,Y)=M(0,14)
0052  0625  111011110   1610  1633            CALL     DAB
0024  064A  000101111         1634            TAM              M(0,Y)=M(0,15)
004B  0611  010011110         1635  NLMINUS   LDX      7
0010  0620  001000000         1636            TCY      0
0021  0643  000000111         1637            DMAN
0042  0605  000101111         1638            TAM              NL=1
0004  060B  010111111         1639            RETN
0009  0613  010010100         1640            LDX      2
0013  0627  001001110         1641            TCY      7
0027  064F  010100000         1642            SBIT     0
004F  0610  010000011         1643  DAA       BL               SREWARD
001C  0638  101101010   1668  1644
0039  0673  010010000         1645  DAAA      LDX      0
0072  0665  001000001         1646            TCY      8
0065  064A  000000111         1647            DMAN
004A  0616  101100110   1664  1648            BRANCH   DABB
0016  062C  010010100         1649  DAG       LDX      2
0020  065B  001001110         1650            TCY      7
005A  0635  010001000         1651            LDP      1
0034  066B  000100000         1652            TBIT     0
006B  0651  100000100   0224  1653            BRANCH   FOUND
0051  0622  010001010         1654  NOTEND    BL               PENALTY
0022  0644  100011010   0767  1655
0044  0609  010011110         1656  NNT       LDX      7
0008  0610  001001110         1657            TCY      7
0011  0623  000000111         1658            DMAN
0023  0647  000101111         1659            TAM              EXGES=1
0046  060D  010011000         1660            LDX      1
000C  0618  000101111         1661            TAM              SHOW EXGES ON DISPLAY
0019  0633  010001000         1662            LDP      1
0033  0667  100000100   0224  1663            BRANCH   FOUND
0066  0640  000101111         1664  DABB      TAM
0040  061A  000101000         1665            TAY
001A  0634  010001011         1666            BL  CX
0035  066B  101011010   1780  1667
006A  0655  010000000         1668  SREWARD   CALLL    LOAD
0055  062A  111010010   0089  1669
002A  0654  001100011         1670            TCMIY    12
0054  0629  001101101         1671            TCMIY    11
0028  0650  001000011         1672            TCY      12
0050  0621  001101100         1673            TCMIY    3        FLAG
0020  0640  010000000         1674            LDP      0
0040  0601  100000000   0004  1675            BRANCH   MUSIC

TABLE I-11

1676            DRGPG    13
0000  0680  011101011         1677  ANEXT     ALEC     13
0001  0683  100101110   1703  1678            BRANCH   SCORE
```

```
0003  06B7  001000010         1679  LVL     TCY      4
0007  06BF  010011110         1680          LDX      7
000F  069F  000100010         1681          TBIT     1
001F  06BF  100000110  1709   1682  BEND    BRANCH   DISP/KB
003F  06FF  010001000         1683          BL       LVLLVL1
007F  06FF  101010100  0256   1684
007E  06FD  001001000         1685  LVLLVL  TCY      1
007D  06FA  000110010         1686          IMAC
007B  06F6  011101100         1687          ALEC     3
0077  06EE  101101111  1690   1688          BRANCH   LVLB
006F  06DE  001111011         1689          ACACC    13
005F  06BF  000101111         1690  LVLB    TAM
003E  06FC  001000000         1691          TCY      0
007C  06F9  001100000         1692          TCMIY    0       NL=0
0079  06F2  010011110         1693  DISLVL  LDX      7       PUT LVL IN DISPLAY
0073  06E6  001001000         1694          TCY      1
0067  06CE  000101001         1695          TMA
00CF  069F  010011000         1696          LDX      1
001F  06BC  001001110         1697          TCY      7
0030  06FA  000101111         1698          TAM
007A  06F5  010010000         1699          LDX      0
0075  06EA  001100100         1700          TCMIY    2
006B  06D6  010111111         1701          RETN
0057  06AF  100011111  1682   1702          BRANCH   BEND
002E  06DC  010011110         1703  SCORE   LDX      7
005C  06B9  001001010         1704          TCY      5
0038  06F0  010100111         1705          BBIT     3       SF=0
0070  06F1  001001100         1706          TCY      3
0061  06C2  000100010         1707          TBIT     1
0043  06B6  100001010  1725   1708          BRANCH   SCORE1
0006  06BC  010011110         1709  DISP/KB LDX      7       TEST DELAY FLAG
000D  069B  001001101         1710          TCY      11
001B  06B7  010000111         1711          LDP      14
0037  06EF  000100000         1712          TBIT     0
006E  06DD  100000000  1806   1713          BRANCH   DSS
005D  06BA  010001011         1714          LDP      13
003A  06F4  010011000         1715  LIN     LDX      1
0074  06E9  001001101         1716          TCY      11      INITIALIZE DEC RANDOM & TIMEOUT CTR
0069  06D2  001100000         1717          TCMIY    0
0053  06A6  001100000         1718          TCMIY    0
0026  06CC  001100000         1719          TCMIY    0
004C  0699  001100000         1720          TCMIY    0
0018  06B0  001100000         1721          TCMIY    0
0031  06E3  010111111         1722          RETN
0062  06C5  010000111         1723          LDP      14
0045  06BA  100000000  1806   1724          BRANCH   DSS
000A  0694  010001111         1725  SCORE1  CALLL    BLNK
0015  06AB  110000000  1935   1726
002B  06D7  001000001         1727          TCY      8
0056  06AD  010011110         1728  SCORE2  LDX      7
002C  06DA  000101011         1729          TYA              DIGIT=0?
0058  06B1  000110011         1730          MNEZ
0030  06E0  100101111  173B   1731          BRANCH   SCB
0060  06C1  001001010         1732          TCY      5
0041  06B2  000100011         1733          TBIT     3       CHECK SF FLAGE IF THERE HAS BEEN A
0002  06B4  100101111  173B   1734          BRANCH   SCB     NON-ZERO DIGIT
0005  06B8  100011100  1773   1735          BRANCH   SCC     GIG=0,FLAG=0
000B  0697  001010101         1736  SCG     YNEC     10      PUT DIGIT ON DISPLAY,NO MATTER IT
0017  06AF  101000010  1767   1737          BRANCH   SCB
002F  06DF  001001010         1738  SCB     TCY      5
005E  06BD  010011110         1739          LDX      7
003C  06FA  010100011         1740          SBIT     3
0078  06F1  000101000         1741          TAY              PUT DIGIT ON DISPLAY
0071  06E2  000101001         1742          TMA
0063  06C6  011111110         1743          YMCY     7
0047  06BF  010100000         1744          LDX      0
000E  069C  001100100         1745          TCMIY    2
001D  06BB  000000100         1746          DYN
003B  06F7  010011000         1747          LDX      1
0076  06ED  000101111         1748          TAM
006D  06DA  011111001         1749          YMCY     8
005B  06B6  000101011         1750          TYA
0036  06EC  001011101         1751  SCD     YNEC     11
006C  06D9  100001011  1736   1752          BRANCH   SCG     FINISH PUTTING FIRST SCORE ON DISPI
0059  06B2  010111111         1753          RETN
0032  06E4  001001010         1754  SCEND   TCY      5       JUST FINISH FIRST SCORE
0064  06C9  010011110         1755          LDX      7
0049  06B2  010100111         1756          BBIT     3       SNPF=1? TWO PLAYER?
0012  06A4  010111111         1757          RETN
0025  06CB  000100010         1758          TBIT     1
004A  0695  101100101  1776   1759          BRANCH   SCALL   YES
0014  06AB  001000100         1760  SCZ     TCY      2       NO
0029  06D3  010011110         1761          LDX      7
0052  06A5  010001001         1762          LDP      9
0024  06CB  000110011         1763          MNEZ             EXPG0=0?
004B  0691  101110100  1201   1764          BRANCH   DELAYA
0010  06A0  010001101         1765          BL       ENDING
0021  06C3  100001000  1528   1766
0042  06B5  001011111         1767  SCH     YNEC     15
0004  06AB  100010001  1770   1768          BRANCH   SCE      ZERO OR NOT
0009  0693  100101111  173B   1769          BRANCH   SCB
0013  06A7  001010000         1770  SCE     YNEC     0        FINISHING PUTTING SECOND SCORE ON
0027  06CF  101010110  172B   1771          BRANCH   SCORE2
004F  069D  010111111         1772          RETN             Y POINT TO NEXT DIGIT
```

```
001C  06B8  001111000            1773  SCC      ACACC     1
0039  06F3  000101000            1774           TAY
0072  06E5  100110110   1751     1775           BRANCH    SCD
0065  06CA  001001011            1776  SCALL    TCY       13              PUT SECOND SCORE ON DISPLAY
0048  0696  111010110   1728     1777           CALL      SCORE2
0016  06AC  100010100   1760     1778           BRANCH    SCZ
0020  06D8  001000110            1779  DX       TCY       6
005A  06B5  010010000            1780  CX       LDX       0
0034  06E8  000110011            1781           MNEZ
006A  06D1  100010001   1787     1782           BRANCH    CXX
0051  06A2  000000100            1783  CXXX     DYN
0022  06C4  101011010   1780     1784           BRANCH    CX
0044  06B9  010000011            1785           BL DAG
0008  06B0  100010110   1649     1786           BRANCH
0011  06A3  010011000            1787  CXX      LDX       1
0023  06C7  000000110            1788           CLA
0046  06BD  001110011            1789           ACACC     12
000C  069B  000001001            1790           MNEA
0019  06B3  101010001   1783     1791           BRANCH    CXXX
0033  06F7  010010000            1792           LDX       0
0066  06CD  000101011            1793           TYA
0040  06B4  001000001            1794           TCY       8
001A  06B4  000101111            1795           TAM
0035  06EB  010000011            1796           BL DAB
006A  06D5  101011110   1610     1797  LGBR     TCY       4               COMPARE SECRET CODE AND GUESS
0055  06AA  001000010            1798           TCY       4               SET FLAG FOR COMPARISION
002A  06D4  010100000            1799           SBIT      0
0054  06A9  010001010            1800           BL        COMPARE1
002B  06D0  100000011   0651     1801  SCORE3   TCY       5
0050  06A1  001001010            1802           TCY       5
0020  06C0  010100111            1803           BBIT      3
0040  06B1  100001010   1725     1804           BRANCH    SCORE1

TABLE 1-14
                                 1805           ORGPG     14
0000  0700  001001011            1806  DSS      TCY       13
0001  0703  010010000            1807           LDX       0               RESET R-LINE PTR
0003  0707  001100000            1808           TCMIY     0
0007  070F  001000000            1809           TCY       0
000F  071F  000000110            1810  DSP2     CLA
001F  073F  001111100            1811           ACACC     3
003F  077F  010110000            1812           TDO
007F  077E  010011000            1813           LDX       1
007E  077D  000101011            1814           TYA
007D  077A  001001111            1815           TCY       15
007B  0776  000001101            1816           SETR                      R15=1,TURN ON FILAMENT
0077  076F  000101000            1817           TAY                       LOAD SEGMENT PLA
006F  075E  000101001            1818           TMA
005F  073F  010110000            1819           TDO
003E  077C  010010000            1820           LDX       0
007C  0779  000101001            1821           TMA
0079  0772  000001001            1822           MNEA
0073  0766  010110000            1823           TDO
0067  074F  000001101            1824           SFTR                      TURN ON DISPLAY DIGIT&R-LINE
004F  071F  001001111            1825           TCY       15
001E  073C  000101110            1826           RSTR                      TURN OFF FILAMENT
003D  077B  000001110            1827           KNEZ
007A  0775  100001110   1824     1828           BRANCH    KEYDOWN
0075  076A  001001011            1829  DISP/KB1 TCY       13              R-LINE PTR=R-LINE PTR+1
006B  0756  010010000            1830           LDX       0
0057  072E  000110010            1831           IMAC
002E  075C  000101111            1832           TAM
005C  0739  000101000            1833           TAY
003A  0770  000000100            1834           DYN
0070  0761  000110110            1835           RSTR
0061  0742  000000101            1836           IYC
0043  0706  001010001            1837           YNEC      8               SCAN COMPLETE?
0006  070C  100001111   1810     1838           BRANCH    DSP2            NO
000D  071B  010010010            1839           LDX       4
001B  0737  001001110            1840           TCY       7
0037  076F  000110010            1841           IMAC
006E  075D  000101111            1842           TAM
005D  073A  010011000            1843  TIMEOUT  LDX       1               TIMEOUT+1
003A  0774  001001111            1844           TCY       15
0074  0769  000110010            1845  INCRA    IMAC
0069  0752  011101001            1846           ALEC      9
0053  0726  100110001   1851     1847           BRANCH    OKAY
0026  074C  000000111            1848           CLA
004C  0719  000101100            1849           TAMDYN
0018  0730  101110100   1845     1850           BRANCH    INCRA           TIMEOUT>10000
0031  0763  000101111            1851  OKAY     TAM                       INCREMENT DEBOUNCE CTR
0062  0745  001001101            1852           TCY       11
0045  070A  000101001            1853           TMA
0004  0714  011101100            1854           ALEC      3
0015  072B  100101100   1858     1855           BRANCH    OKNEXT
002B  0757  001001011            1856           TCY       13              TURN CALCULATOR OFF
0056  072D  000110110            1857           RSTR
002C  0758  010010000            1858  OKNEXT   LDX       0
0058  0731  001000101            1859           TCY       10
0030  0760  000110010            1860           IMAC
0060  0741  100000010   1863     1861           BRANCH    DSP3
0041  0702  000101111            1862           TAM
0002  0704  010011110            1863  DSP3     LDX       7
```

```
0005  070B  001001101        1864          TCY      11
000B  0717  000100010        1865          TBIT     1
0017  072F  100010001  1916  1866          BRANCH   DELAY      DELAY=1
002F  075F  010001001        1867          LDP      9
005E  073D  000100000        1868          TBIT     0
003C  077B  100010101  1211  1869          BRANCH   TIMER
007B  0771  010000111        1870          LDP      14
0071  0762  001001111        1871          TCY      15
0063  0746  000001101        1872          SFTR                TURN ON FILAMNT
0047  070F  100000000  1806  1873          BRANCH   DSS        DELAY=0,GO BACK TO SCAN
000E  071C  001000101        1874  KEYDOWN TCY      10
001D  073A  000101001        1875          TMA
003B  0777  001100000        1876          TCMIY    0          RESET DEBOUNCE CTR
0076  076D  011101101        1877          ALEC     7
006D  075A  101110101  1829  1878          BRANCH   DISP/KB1
005A  0736  001000011        1879          TCY      12
0036  076C  000001010        1880          TKM
006C  0759  000110011        1881          MNEZ
0059  0732  101100100  1884  1882          BRANCH   KD1
0032  0764  101110101  1829  1883          BRANCH   DISP/KB1
0064  0749  001001111        1884  KD1     TCY      15
0049  0712  000000110        1885          CLA
0012  0724  000101100        1886          TAMDYN
0025  074B  000101100        1887          TAMDYN
004A  0715  000101010        1888          TMY
0014  072A  000110110        1889          RSTR                TURN OFF R-LINE
0029  0753  001001011        1890          TCY      13
0052  0725  001111110        1891          ACACC    7
0024  0748  000001110        1892          KNEZ
0048  0711  100100001  1895  1893          BRANCH   KD4
0010  0720  000101001        1894          TMA
0021  0743  001001101        1895  KD4     TCY      11
0042  0705  010011110        1896          LDX      7
0004  0708  000100010        1897          TBIT     1
0009  0713  100111001  1903  1898          BRANCH   TAKE
0013  0727  001001011        1899          TCY      13
0027  074F  010010000        1900          LDX      0
004E  071D  010000110        1901          BL       KD2
001C  073B  100011111  07B1  1902
0039  0773  000101000        1903  TAKE    TAY
0072  0765  001010110        1904          YNEC     6
0065  074A  100000000  1806  1905          BRANCH   DSS
004B  0716  010010000        1906          LDX      0
0016  072C  001000011        1907          TCY      12
002D  075B  000101010        1908          TMY
005A  0735  001010001        1909          YNEC     8
0034  076B  100000000  1806  1910          BRANCH   DSS
0068  0751  001001011        1911  OFF     TCY      13
0051  0722  000110110        1912          RSTR                OFF CAL
0022  0744  001001011        1913  DELAY1  TCY      13
0044  0709  001100000        1914          TCMIY    0
0008  0710  001100001        1915          TCMIY    8
0011  0723  010011000        1916  DELAY   LDX      1
0023  0747  001000111        1917          TCY      14
0046  070D  000101001        1918          TMA
000C  071B  001001101        1919          TCY      11
0019  0733  010011110        1920          LDX      7
0033  0767  010100010        1921          SBIT     1
0066  074D  011101110        1922          ALEC     7
0040  071A  100000000  1806  1923          BRANCH   DSS
001A  0734  010100110        1924          RBIT     1
0035  076B  001001111        1925          TCY      15
006A  0755  000110110        1926          RSTR
0055  072A  010111111        1927          RETN
002A  0754  010000000        1928  BEEP    CALLL    LOAD
0054  0729  111010010  0089  1929
002B  0750  001100100        1930          TCMIY    2
0050  0721  001100011        1931          TCMIY    12
0020  0740  010001111        1932          BL       GAME
0040  0701  100101000  2059  1933

TABLE 1-15

1934          ORGPG    15
0000  07B0  010010000        1935  BLNK    LDX      0
0001  07B3  001001110        1936          TCY      7
0003  07B7  000000110        1937          CLA
0007  07BF  001111000        1938          ACACC    1
000F  079F  000101100        1939  BLNKA   TAMDYN
001F  07BF  100001111  1939  1940          BRANCH   BLNKA
003F  07FF  010011000        1941          LDX      1
007F  07FE  001001110        1942          TCY      7
007F  07FD  001110101        1943          ACACC    10
007D  07FA  000101100        1944  BLNKB   TAMDYN
007B  07F6  101111101  1944  1945          BRANCH   BLNKB
0077  07EF  010111111        1946          RETN
006F  07DE  010000111        1947          CALLL    DELAY1
005F  03BF  110100010  1913  1948
003E  07FC  001001111        1949          TCY      15
007C  07F9  000110110        1950  LOOPY   RSTR                CLEAR R-LINEES
0079  07F2  000000100        1951          DYN
0073  07E6  101111100  1950  1952          BRANCH   LOOPY
0067  07CF  001001011        1953  FIRST   TCY      13
```

| | | | | | | | |
|---|---|---|---|---|---|---|---|
| 004F | 079F | 000001101 | | 1954 | | SETR | | TURN ON CAL |
| 001E | 07BC | 001001111 | | 1955 | READ | TCY | 15 |
| 0030 | 07FB | 000001101 | | 1956 | | SETR | |
| 007A | 07F5 | 001000011 | | 1957 | | TCY | 12 |
| 0075 | 07EA | 000001101 | | 1958 | | SETR | | SET R12 |
| 006B | 07D6 | 001000110 | | 1959 | | TCY | 6 |
| 0057 | 07AF | 000001101 | | 1960 | | SETR | | SET R6 |
| 002E | 07DC | 010010110 | | 1961 | | LDX | 6 | WAIT |
| 005C | 07B9 | 010010110 | | 1962 | | LDX | 6 | WAIT |
| 0038 | 07F0 | 000001000 | | 1963 | | TKA | | DATA IN ACC |
| 0070 | 07F1 | 000110110 | | 1964 | | RSTR | | RESET R6 |
| 0061 | 07C2 | 001000011 | | 1965 | | TCY | 12 |
| 0043 | 07B6 | 000110110 | | 1966 | | RSTR | | RESET R12 |
| 0006 | 07BC | 001001111 | | 1967 | | TCY | 15 |
| 000D | 079B | 000110110 | | 1968 | | RSTR | |
| 001B | 07B7 | 010111111 | | 1969 | | RETN | |
| 0037 | 07FF | 010000001 | | 1970 | ON | CALLL | | RESET |
| 006E | 07DD | 110000101 | 1091 | 1971 | | | |
| 0050 | 07BA | 001000000 | | 1972 | | TCY | 0 |
| 0034 | 07F4 | 001101110 | | 1973 | | TCMIY | 7 | NL=7 |
| 0074 | 07E9 | 001101000 | | 1974 | | TCMIY | 1 | LVL=1 |
| 0069 | 07D2 | 001101010 | | 1975 | | TCMIY | 5 | FXPGOV5 |
| 0053 | 07A6 | 001000010 | | 1976 | | TCY | 4 |
| 0026 | 07CC | 010100000 | | 1977 | | SBIT | 0 | MW=1 |
| 004C | 0799 | 001001010 | | 1978 | | TCY | 5 |
| 0018 | 07B0 | 010100000 | | 1979 | | SBIT | 0 | SNPF=1 |
| 0031 | 07E3 | 001000110 | | 1980 | | TCY | 6 |
| 0062 | 07C5 | 001100101 | | 1981 | | TCMIY | 10 | GOF=1,LVL=1 |
| 0045 | 07BA | 001000011 | | 1982 | | TCY | 12 | X=1 |
| 000A | 0794 | 001101000 | | 1983 | | TCMIY | 1 |
| 0015 | 07AB | 010010000 | | 1984 | | LDX | 0 |
| 002B | 07D7 | 001000001 | | 1985 | | TCY | 8 |
| 0056 | 07AD | 001100000 | | 1986 | | TCMIY | 0 | Y=0,INITIALIZE THE PTR FOR USER ENT |
| 002C | 07D8 | 010010001 | | 1987 | MYSTERY | LDX | 8 |
| 005B | 07B1 | 001000010 | | 1988 | | TCY | 4 |
| 0030 | 07E0 | 001100010 | | 1989 | | TCMIY | 4 |
| 0060 | 07C1 | 010000001 | | 1990 | | CALLL | ADDRESS |
| 0041 | 0782 | 111010111 | 1058 | 1991 | | | |
| 0002 | 07A4 | 001100000 | | 1992 | | TCMIY | 0 |
| 0005 | 07BA | 010000010 | | 1993 | | BL | GODWORD |
| 000B | 0797 | 101001110 | 0615 | 1994 | | | |
| 0017 | 07AF | 011100100 | | 1995 | NEXT | ALEC | 2 |
| 002F | 07DF | 100111011 | 2005 | 1996 | | BRANCH | ADD0 |
| 005F | 07BD | 011100010 | | 1997 | | ALEC | 4 |
| 003C | 07FA | 101000111 | 2002 | 1998 | | BRANCH | ADD15 |
| 0078 | 07F1 | 011100001 | | 1999 | | ALEC | 8 |
| 0071 | 07E2 | 100001110 | 2003 | 2000 | | BRANCH | ADD12 |
| 0063 | 07C6 | 100011101 | 2004 | 2001 | | BRANCH | ADD1 |
| 0047 | 07AE | 001111100 | | 2002 | ADD15 | ACACC | 3 |
| 000E | 079C | 001111101 | | 2003 | ADD12 | ACACC | 11 |
| 0010 | 07BB | 001111000 | | 2004 | ADD1 | ACACC | 1 |
| 0038 | 07F7 | 001000111 | | 2005 | ADD0 | TCY | 14 |
| 0076 | 07ED | 000010101 | | 2006 | | AMAAC | |
| 006D | 07D4 | 100110110 | 2009 | 2007 | | BRANCH | GGEE |
| 005B | 07B6 | 101011001 | 2011 | 2008 | | BRANCH | HO |
| 0036 | 07EC | 010000110 | | 2009 | GGEE | CALLL | CARRY |
| 006C | 07D9 | 110111110 | 0790 | 2010 | | | |
| 0059 | 07B2 | 000101111 | | 2011 | HO | TAM | |
| 0032 | 07E4 | 001001111 | | 2012 | | TCY | 15 |
| 0064 | 07C9 | 000101001 | | 2013 | | TMA | |
| 0049 | 0792 | 011101000 | | 2014 | | ALEC | 1 |
| 0012 | 07A4 | 101011010 | 203B | 2015 | | BRANCH | ONEONE |
| 0025 | 07CB | 001000111 | | 2016 | | TCY | 14 |
| 004A | 0795 | 000101001 | | 2017 | | TMA | |
| 0014 | 07AB | 010001100 | | 2018 | | LDP | 3 |
| 0029 | 07D3 | 011100000 | | 2019 | | ALEC | 0 |
| 0052 | 07A5 | 100101101 | 0493 | 2020 | | BRANCH | GO |
| 0024 | 07CA | 010000111 | | 2021 | | LDP | 14 |
| 004B | 0791 | 011100100 | | 2022 | | ALEC | 2 |
| 0010 | 07A0 | 101101000 | 1911 | 2023 | | BRANCH | OFF |
| 0021 | 07C3 | 010001100 | | 2024 | | LDP | 3 |
| 0042 | 07B5 | 011101100 | | 2025 | | ALEC | 3 |
| 0004 | 07B8 | 100000000 | 0391 | 2026 | | BRANCH | REPLAY |
| 0009 | 0793 | 010000001 | | 2027 | | LDP | 8 |
| 0013 | 07A7 | 011100010 | | 2028 | | ALEC | 4 |
| 0027 | 07CF | 100000101 | 1091 | 2029 | | BRANCH | RESET |
| 004E | 079D | 010001110 | | 2030 | | LDP | 7 |
| 001C | 07BA | 011101010 | | 2031 | | ALEC | 5 |
| 0059 | 07F3 | 100000000 | 0904 | 2032 | | BRANCH | LG |
| 0072 | 07E5 | 010000001 | | 2033 | | LDP | 8 |
| 0065 | 07CA | 011100110 | | 2034 | | ALEC | 6 |
| 004B | 0796 | 100000000 | 1035 | 2035 | | BRANCH | USENT |
| 0016 | 07AC | 010001111 | | 2036 | | LDP | 15 |
| 0020 | 07DB | 100110111 | 1970 | 2037 | | BRANCH | ON |
| 005A | 07B5 | 010000011 | | 2038 | ONEONE | LDP | 12 |
| 0034 | 07EB | 011100000 | | 2039 | | ALEC | 0 |
| 006B | 07D1 | 100000000 | 1548 | 2040 | | BRANCH | ALPH |
| 0051 | 07A2 | 001000111 | | 2041 | | TCY | 14 |
| 0022 | 07C4 | 000101001 | | 2042 | | TMA | |
| 0044 | 07B9 | 011101001 | | 2043 | | ALEC | 9 |
| 0008 | 0790 | 100000000 | 1548 | 2044 | | BRANCH | ALPH |
| 0011 | 07A3 | 010001000 | | 2045 | | LDP | 1 |
| 0023 | 07C7 | 011100101 | | 2046 | | ALEC | 10 |
| 0046 | 07BD | 100000000 | 0133 | 2047 | | BRANCH | TPLYR |

```
000C  079A  011101101         2048          ALEC      11
0019  07B3  100000110  0165   2049          BRANCH    CLUF
0033  07E7  010000000         2050          LDP       0
0066  07C0  011100011         2051          ALEC      12
004D  079A  100101010  0126   2052          BRANCH    ERASE
001A  07B4  010001011         2053          LDP       13
0035  07EB  100000000  1677   2054          BRANCH    ANEXT
006A  0705  010000000         2055   USEG   CALLL     LOAD
0055  07AA  111010010  00B9   2056
002A  07D4  001100100         2057          TCMIY     ?
0054  07A9  001101001         2058          TCMIY     9
002B  07D0  001000011         2059   GAME   TCY       12
0050  07A1  001101010         2060          TCMIY     5
0020  07C0  010000000         2061          LDP       0
0040  07B1  100000000  0004   2062          BRANCH    MUSIC
                              2063          END
```

What is claimed is:

1. An electronic handheld learning aid comprising:
   memory means for storing digital data representative of the letters of the alphabet, the digital data being arranged so as to be representative of the correct spellings of a plurality of words in a human language;
   random access generating means for randomly selecting digital data representative of a selected one of said plurality of words stored in said memory means;
   presentation means for providing at least an indication as to the identity of said selected one of said plurality of words;
   operator input means for receiving an input from an operator of the learning aid representative of a plurality of letters of the alphabet as an attempt to spell said selected word chosen by said random access generating means;
   said memory means being operatively coupled to said operator input means for storing digital data representative of certain letters of the alphabet arranged so as to be representative of the spelling of a word in a human language corresponding to the input from an operator as received by said operator input means;
   means enabling alternatively said random access generating means or said memory means to store digital data representative of the spelling of a word corresponding to the input from an operator as received by said operator input means;
   digital logic means including comparator means coupled to said random access generating means, said operator input means, said memory means and said presentation means for alternatively comparing the input received by said operator input means from an operator with said selected word chosen by said random access generating means or the input received by said operator input means from another operator with the word represented by said digital data stored in said memory means corresponding to the input from a first operator as received by said operator input means and for providing a difference signal indicative of any difference therebetween; and
   said presentation means being responsive to the presence or absence of said difference signal for providing a presentation indicative of the appropriateness of the input received by said operator input means with respect to said selected word chosen by said random access generating means or the word represented by the digital data stored in said memory means depending upon which one of said random access generating means and said memory means is enabled.

2. A learning aid as set forth in claim 1, wherein said presentation means comprises visual display means for visually displaying an indication of the number of letters contained in the correct spelling of the selected one of said plurality of words as randomly chosen by said random access generating means or the word represented by the digital data stored in said memory means depending upon which one of said random access generating means and said memory means is enabled.

3. A learning aid as set forth in claim 1, wherein said digital logic means comprises data processing means in which a predetermined maximum number of individual inputs by an operator as received by said operator input means is permitted during a sequence of inputs received by said operator input means to achieve conformance with the selected one of said plurality of words chosen by said random access generating means or the word represented by the digital data stored in said memory means depending upon which one of said random access generating means and said memory means is enabled.

4. A learning aid as set forth in claim 1, wherein said operator input means comprises a keyboard including individual keys respectively representing all of the letters of the alphabet.

5. A learning aid as set forth in any of claims 1, 2, 3 and 4, wherein said memory means comprises first memory means for storing digital data representative of the letters of the alphabet, the digital data being arranged so as to be representative of the correct spellings of a plurality of words in a human language for random selection by said random access generating means; and
   second memory means coupled to said operator input means for temporarily storing digital data representative of certain letters of the alphabet arranged so as to be representative of the spelling of a word corresponding to the input from an operator as received by said operator input means and being independent of the digital data stored in said first memory means.

6. An electronic handheld learning aid comprising:
   memory means for storing digital data representative of the letters of the alphabet, the digital data being arranged so as to be representative of the correct spellings of a plurality of words in a human language;
   random access generating means for randomly selecting digital data representative of a selected one of said plurality of words stored in said memory means;
   a keyboard including individual keys respectively representing letters of the alphabet and being adapted to receive respective inputs from an operator via actuation of individual keys representative of letters of the alphabet as an attempt to spell a selected word;
   said memory means being operatively coupled to said keyboard for storing digital data representative of certain letters of the alphabet arranged so as to be representative of the spelling of a word in a human language corresponding to inputs from an operator via the actuation of individual keys of said keyboard;

means enabling alternatively said random access generating means of said memory means to store digital data representative of the spelling of a word corresponding to the inputs from an operator as received by said keyboard in determining said selected word;

visual display means operatively coupled to said random access generating means and said keyboard for visually displaying an indication of the number of letters contained in the correct spelling of the selected one of said plurality of words as randomly chosen by said random access generating means or the word represented by the digital data stored in said memory means depending upon which one of said random access generating means and said memory means is enabled;

digital logic means including comparator means coupled to said random access generating means, said keyboard, said memory means and said visual display means for alternatively comparing the inputs received by said keyboard from an operator with said selected word chosen by said random access generating means or the inputs received by said keyboard from another operator with the word represented by said digital data stored in said memory means corresponding to the inputs from a first operator as received by said keyboard and for providing a difference signal indicative of any difference therebetween;

said visual display means being responsive to the presence or absence of said difference signal for providing a display indicative of the appropriateness of the inputs received by said keyboard with respect to said selected word chosen by said random access generating means or the word represented by the digital data stored in said memory means depending upon which one of said random access generating means and said memory means is enabled; and said digital logic means comprising data processing means in which a predetermined maximum number of individual inputs by an operator as received by said keyboard is permitted during a sequence of inputs received by said keyboard to achieve conformance with the selected one of said plurality of words chosen by said random access generating means or the word represented by the digital data stored in said memory means depending upon which one of said random access generating means and said memory means is enabled.

7. A learning aid as set forth in claim 6, wherein said visual display means and said digital logic means are responsive to the absence of said difference signal from said comparator means indicative of a correct choice of a letter contained within said selected word as an operator input received by said keyboard to display said letter in its appropriate position in said selected word on said visual display means, and said visual display means and said digital logic means are responsive to the presence of said difference signal from said comparator means indicative of an incorrect choice of a letter contained within said selected word as an operator input received by said keyboard to record an incorrect choice decreasing the remaining number of individual inputs permitted to an operator via said keyboard by one.

8. A learning aid as set forth in claim 7, wherein said visual display means includes a plurality of character positions, said digital logic means being responsive to the selection of said selected word as randomly chosen by said random access generating means or the word represented by the digital data stored in said memory means depending upon which one of said random access generating means and said memory means is enabled for causing said visual display means to display an appropriate number of blank spaces in respective character positions thereof, said blank spaces being no greater in number than said plurality of character positions and corresponding to the number of letters contained in said selected word; and the correct choice of a letter contained within said selected word as an operator input actuating an individual key of said keyboard being operable to display said letter in place of the corresponding blank space of said visual display means appropriately locating the displayed letter in its position in said selected word.

* * * * *